(12) United States Patent
Kimura et al.

(10) Patent No.: US 6,195,196 B1
(45) Date of Patent: Feb. 27, 2001

(54) ARRAY-TYPE EXPOSING DEVICE AND FLAT TYPE DISPLAY INCORPORATING LIGHT MODULATOR AND DRIVING METHOD THEREOF

(75) Inventors: Koichi Kimura; Mitsuru Sawano, both of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/429,923

(22) Filed: Oct. 29, 1999

Related U.S. Application Data

(63) Continuation-in-part of application No. 09/265,416, filed on Mar. 10, 1999, now abandoned.

(30) Foreign Application Priority Data

| Mar. 13, 1998 | (JP) | 10-63265 |
| Mar. 13, 1998 | (JP) | 10-63266 |
| Mar. 24, 1998 | (JP) | 10-75849 |
| May 7, 1998 | (JP) | 10-124885 |
| Oct. 30, 1998 | (JP) | 10-310946 |

(51) Int. Cl.[7] ................................................. G02B 26/00
(52) U.S. Cl. ................ 359/295; 359/291; 359/619; 359/254; 359/230; 359/245; 362/31; 349/64; 385/146
(58) Field of Search .................................. 359/290, 291, 359/292, 295, 619, 254, 230, 231, 245; 362/31, 32; 349/64, 65; 385/146

(56) References Cited

U.S. PATENT DOCUMENTS

| 5,739,931 | * | 4/1998 | Zimmerman et al. | 359/619 |
| 5,748,828 | * | 5/1998 | Steiner et al. | 385/146 |
| 5,796,509 | * | 8/1998 | Doany et al. | 359/254 |
| 6,040,936 | * | 3/2000 | Kim et al. | 359/245 |

* cited by examiner

*Primary Examiner*—Loha Ben
(74) *Attorney, Agent, or Firm*—Sughrue, Mion, Zinn, Macpeak & Seas, PLLC

(57) ABSTRACT

An array-type exposing device, for exposing an image forming body incorporated in an image forming apparatus, includes a flat light source for emitting a UV rays and a light modulator unit disposed above the flat light source so as to be associated with at least one unit area derived by dividing each of pixels on the image, the light modulator unit modulating the UV ray by electromechanical operation to expose the image forming body.

90 Claims, 36 Drawing Sheets

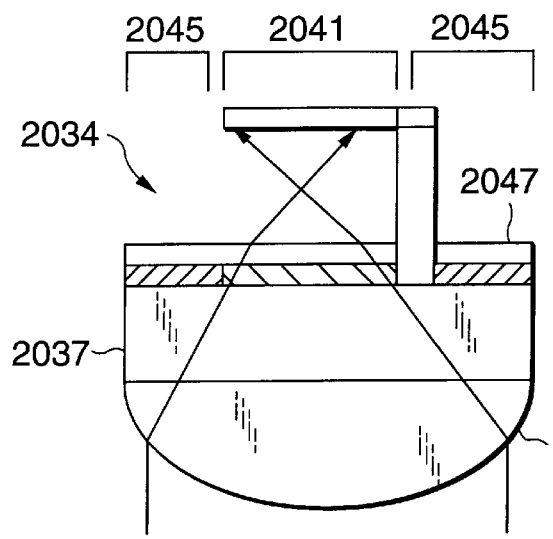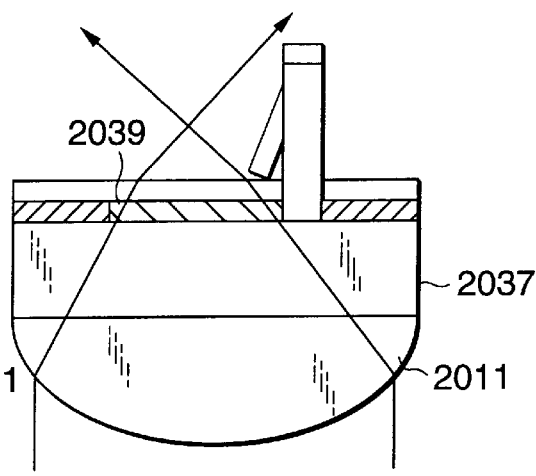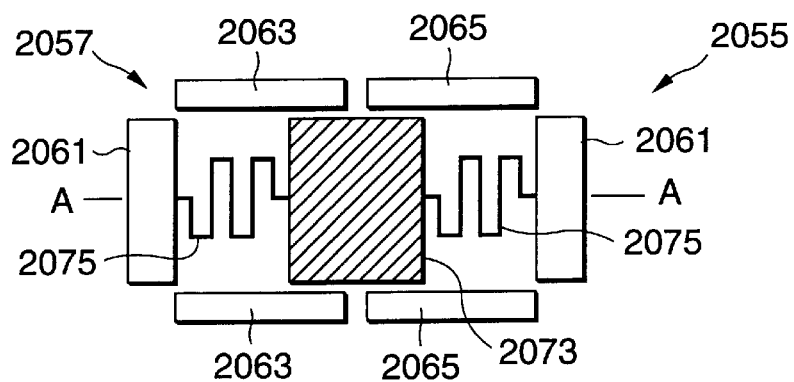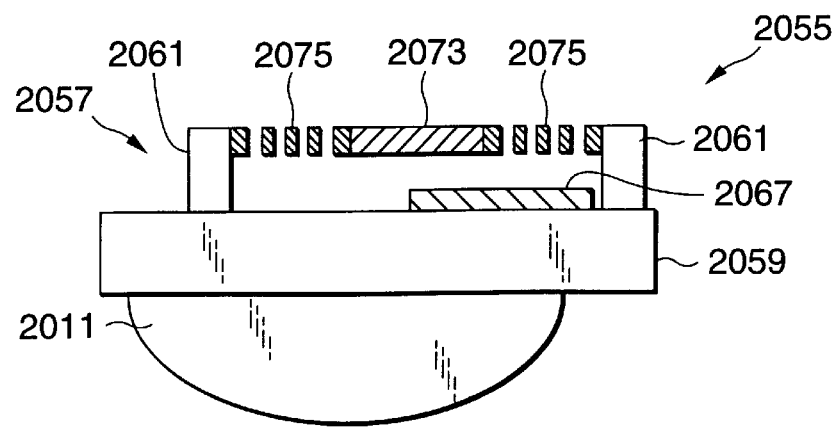

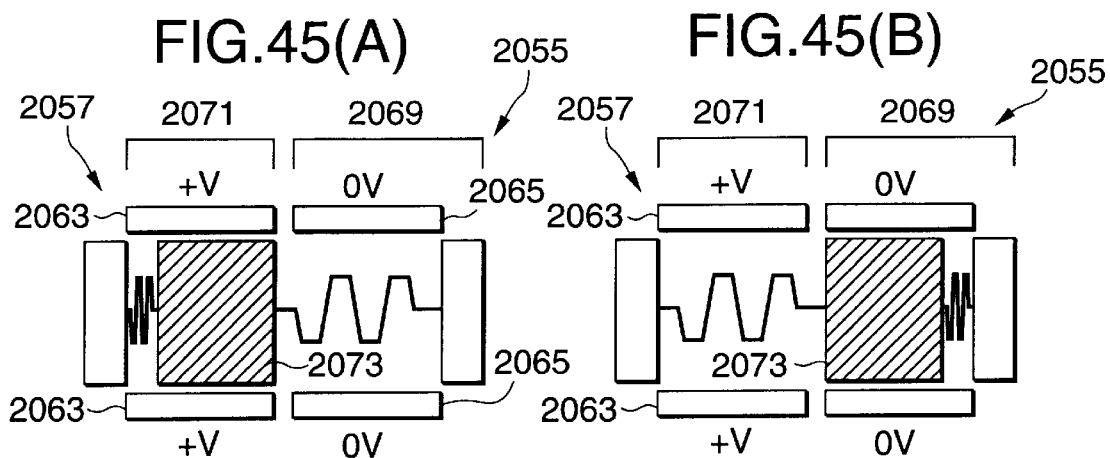
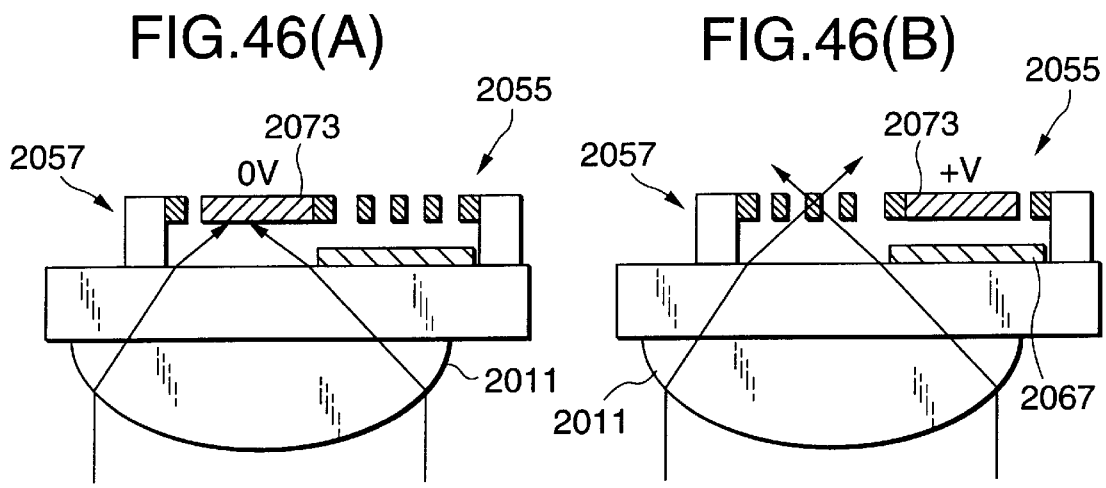
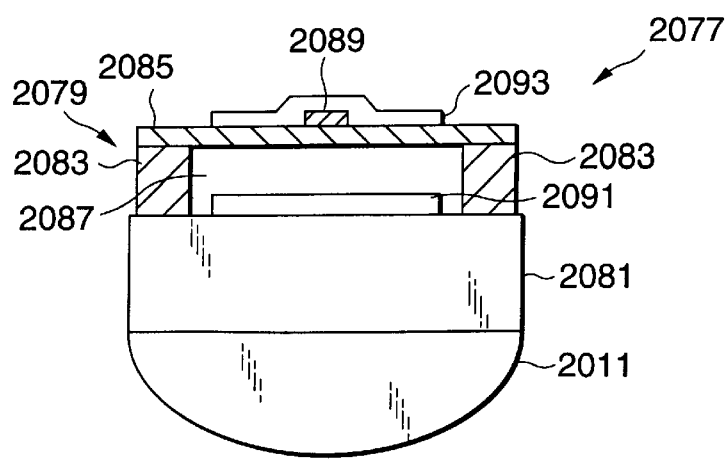

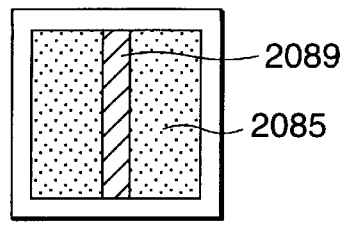
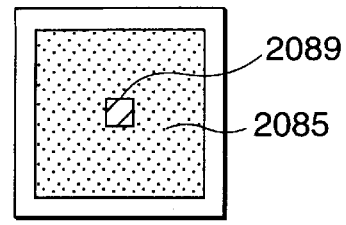
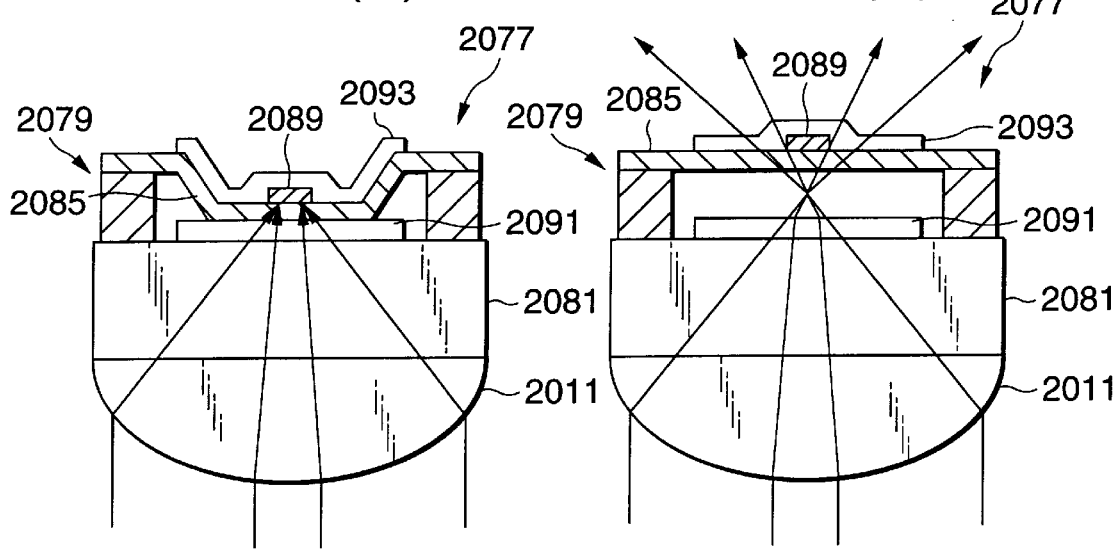
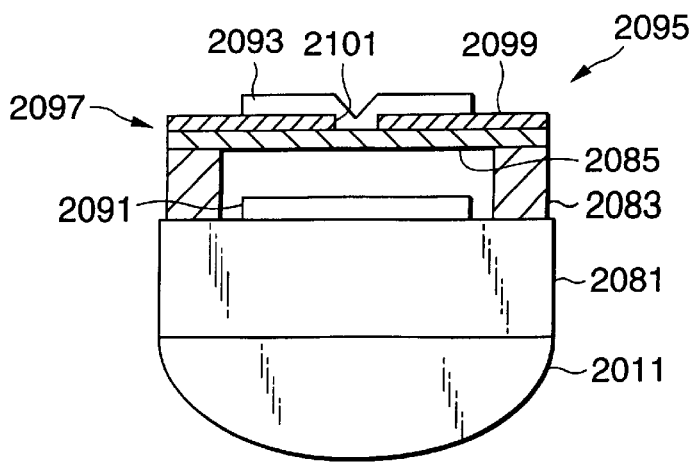

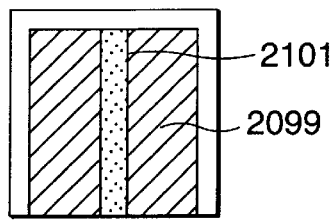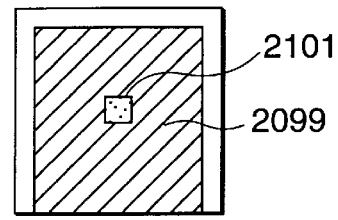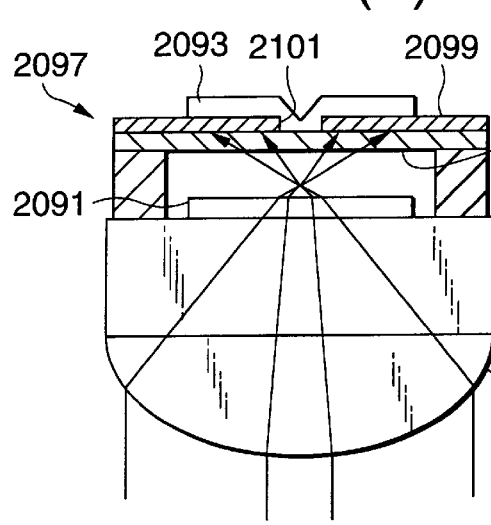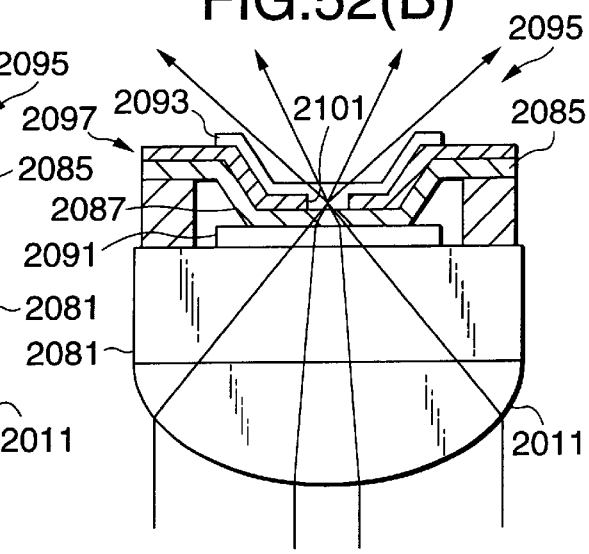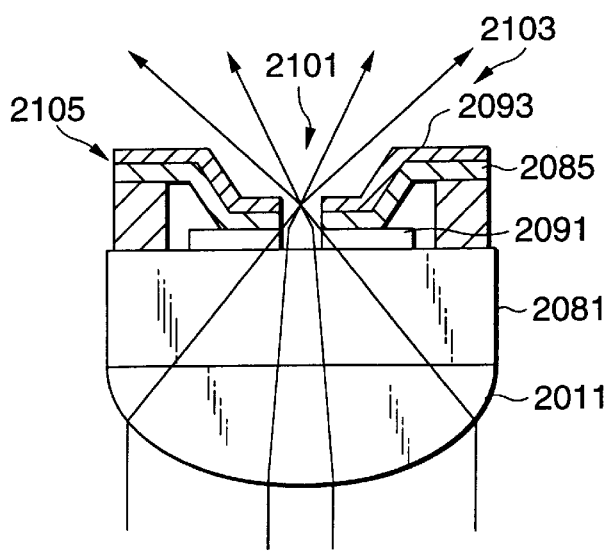

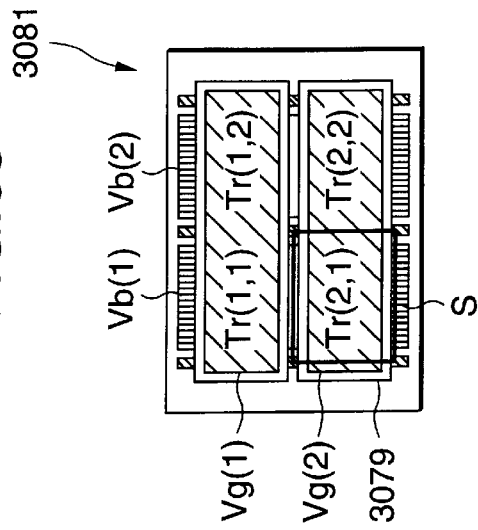

| m3 | m2 | m1 | RELATIVE QUANTITY OF TRANSMITTED LIGHT |
|---|---|---|---|
| OFF | OFF | OFF | 0 |
| OFF | OFF | ON | 1 |
| OFF | ON | OFF | 2 |
| OFF | ON | ON | 3 |
| ON | OFF | OFF | 4 |
| ON | OFF | ON | 5 |
| ON | ON | OFF | 6 |
| ON | ON | ON | 7 |

--- : PREVIOUS VOLTAGE

ARRAY-TYPE EXPOSING DEVICE AND FLAT TYPE DISPLAY INCORPORATING LIGHT MODULATOR AND DRIVING METHOD THEREOF

CROSS-REFERENCE TO RELATED APPLICATION

This is a continuation-in-part application of U.S. patent application Ser. No. 09/265,416 filed on Mar. 10, 1999, now abandoned.

BACKGROUND OF THE INVENTION

The present invention relates to an array-type light modulator incorporating flexible thin films to change transmittance of light, an array-type exposing device for use in a UV sensitive material, a visible light sensitive material or an IR sensitive material and a flat-type display unit incorporating the array-type light modulator to cause a phosphor to emit light to perform display.

Hitherto, digital exposing methods for use in a variety of image forming processes include a method using a laser beams, a method using a UV light source and an LCD shutter and a method using a UV light source and an electrooptic crystal shutter.

The method using a laser beam, for example, raster is a scan for relatively moving an image forming member and a laser beam so that successive exposing operations are performed. The foregoing method is able to form a fine image by an image generating function thereof.

The method using a UV light source and an LCD shutter uses change in the optical characteristic occurring when changes in the arrangement of molecules by dint of an electric field of the LCD shutter so as to selectively shield UV rays so that exposure is controlled.

The method using a UV light source and an electrooptic crystal shutter, such as Pockels cell, uses a linear electrooptic effect of electrooptic crystal, the refractive index of which is changed in proportion to the first power of an applied electric field. The Pockels cell is obtained by cutting a parallel and flat plate of electrooptic crystal vertically to an optical axis thereof. An electric field is applied in a direction of the optical axis. Then, birefringence which occurs when a UV ray is allowed to pass in the foregoing direction is used to control the exposure.

A variety of thin and flat display units have been disclosed which are represented by, for example, a liquid crystal display unit, a plasma display unit and a field emission display (FED).

The liquid crystal display unit has a structure that oriented liquid crystal is enclosed and sealed between a pair of substrates each having a conductive transparent film. Moreover, the foregoing structure is held between perpendicular deflection plates. The liquid crystal display unit performs display such that voltage is applied to the conductive transparent film so that liquid crystal is oriented perpendicular to the substrates so as to change transmittance of light emitted from a backlight. To perform full color display or to display a dynamic image, an active matrix liquid crystal panel incorporating TFT (a thin film transistor) is employed.

The plasma display unit has a structure that a multiplicity of electrodes corresponding to an anode and a cathode and arranged regularly are disposed between two glass plates between which a rare gas, such as neon, has been enclosed. Moreover, intersections of opposing electrodes serve as unit pixels. The plasma display unit performs display in accordance with image information to selectively apply voltage to opposing electrodes with which an intersection is specified. Thus, the intersection is caused to perform discharge and emit light so as to excite phosphor with a generated UV ray.

The FED has a structure formed into a flat display tube which covers a pair of panels disposed apart from each other for a short distance to be opposite to each other. A fluorescent film is formed on the inner surface of the displaying panel. Electric field emission cathodes for corresponding unit light emitting regions are disposed on the rear panel. The electric field emission cathode incorporates pointed electric field emission type micro-cathode called an emitter tip having a small size. Display performed by the FED is performed by causing the emitter tip to emit electrons which are then accelerated so that the phosphor is irradiated. As a result, the phosphor is excited.

However, the above-mentioned light modulator, the exposing device and the flat-type display unit have a variety of the following problems.

That is, the structure using a laser beam cannot reduce the size of the apparatus. What is worse, the cost of the apparatus is raised excessively. Since the laser beam is used to perform scanning so as to perform the exposure, exposure of the overall image forming member cannot be performed. Therefore, a multichannel structure cannot easily be constituted and high speed exposure cannot easily be performed.

The structure using the UV light source and the LCD shutter involves transmission of the UV ray to pass through a plurality of transmissive elements which constitute the LCD shutter. Therefore, the efficiency in using light deteriorates. Another problem arises in that the durability of the LCD shutter against the UV ray is unsatisfactory.

The structure using the UV light source and the electrooptic crystal shutter must be applied with a very high operating voltage. What is worse, a two-dimensional array structure cannot easily be constituted because the electrooptic crystal shutter is manufactured by cutting crystal, such as ADP ($NH_4H_2PO_4$) or KDP ($KH_2PO_4$).

SUMMARY OF THE INVENTION

In view of the foregoing, a first object of the present invention is to provide an array-type exposing device which does not use a laser beam which raises the cost of the apparatus, which is able to perform exposure at high speed, with which a satisfactory freedom can be permitted when a light modulating mechanism is designed, which permits bright exposure and which is able to lower the operation voltage.

A second object is to provide a flat display unit which does not require high vacuum, which is able to realize a large area structure with a low cost, which exhibits an excellent efficiency of using light and which does not require high voltage when the unit is operated.

A third object of the present invention is to provide an operating method for the above which permits multiplicity gradation levels to be controlled in each pixel unit even if each of the light modulating portions is in a binary mode.

A fourth aspect of the present invention is to provide an operating method for the above with which a stable operation can be performed even if the above device has a hysteresis characteristic in the light modulating.

In order to achieve the above object, there is provided an array-type exposing device for exposing an image forming body incorporated in an image forming apparatus, comprising: a flat light source for emitting a UV ray; and a light modulator unit disposed above the flat light source so as to be associated with at least one unit area derived by dividing each of pixels on the image, the light modulator unit modulating the UV ray by electro-mechanical operation to expose the image forming body.

The foregoing exposing device has the light modulator section which are electro-mechanically operated. Thus, for example, a Fabry-Perot effect is used to control the intensities of light beams emitted from the light modulator section so that modulation of light is permitted.

The light modulator unit includes: a first electrode disposed above the flat light source; a second electrode disposed opposite to the first electrode such that at least a gap is interposed; a flexible thin film, which is transparent with respect to UV rays, interposed between the first and second electrodes and to be elastically deflected by Coulomb force generated when an electric field is applied therebetween.

As a result, an exposing device having a laminated structure can be constituted. Since a light beam emitted from the light guide plate is allowed to pass through only the pair of the transparent electrodes interposing a gap, the efficiency of using light can be improved.

It may be constituted that: the first electrode includes a plurality of band-like electrodes arranged in parallel with each other, the second electrode includes a plurality of band-like electrodes arranged in parallel with each other so as to be perpendicular to the first electrode; and at least one of intersections of the first and second electrodes is associated with one pixel of the image.

As a result, the light modulator unit can be operated by digital multi-exposure. Thus, high speed exposure can be performed.

It may be constituted that: the light modulator unit includes at least one active device associated with one pixel of the image, in which the first electrode is connected to a drain (or source) electrode thereof, a second electrode is connected to a common electrode, an image signal line corresponding to each column of the image connected to a source (or drain) electrode thereof and an image signal line corresponding to each row of the image is connected to a gate electrode thereof.

When voltages for conducting the active devices are applied to the scan signal lines connected to the gates of the active devices and voltages of required image signals are applied to the image signal lines connected to the drains. As a result, voltages of image signals are applied to the pixel electrodes. Thus, the voltage of the potential of the common electrode and the potential of the pixel electrode cause electrostatic stress to act. As a result, required light modulation can be performed.

It may be constituted that: the flat light source includes a UV lamp and a light guide plate for guiding the UV ray emitted from the UV lamp; and the flexible thin film allows the guided UV ray to transmit when the flexible thin film is deflected and approached to the light guide plate sufficiently by the application of the electric field.

When the voltage between the electrodes of the foregoing exposing device is zero and a gap exists between the flexible thin film and the light guide plate, a UV ray totally reflects and travels in the light guide plate If a voltage is applied between the electrodes and the flexible thin film and the light guide plate are brought into contact with each other or moved sufficiently closer to each other, the UV ray is transmitted to the flexible thin film so as to be emitted to the surface of the flexible thin film. Therefore, position control of the flexible thin film by dint of application of the voltage is performed so that light modulation is performed.

In the device, the flexible thin film includes a light diffusion layer.

When the flexible thin film and the light guide plate of the above-mentioned exposing device are brought into contact with each other or when they are moved sufficiently closer, the UV ray is diffused by dint of a light diffusion effect of the flexible thin film so as to be emitted over the surface.

It may be constituted that: the electric field is applied to deflect the flexible thin film so that an optical interference effect of a multilayer film is generated so the UV ray is to be modulated.

The above-mentioned exposing device has the structure that the state in which the gap is formed between the light guide plate and the flexible thin film is maintained when no voltage is applied between the electrodes. Thus, the light intensity transmittance is limited to a low level, causing substantially no UV ray to pass through. If a voltage is applied between the electrodes, the length of the gap between the light guide plate and the flexible thin film is shortened. As a result, the light intensity transmittance is raised, causing a UV ray to pass through. As a result, modulation of light can be performed.

In the device, the light modulator unit includes a film member disposed opposite to the flexible thin film, both of the flexible thin film and the film member have a reflectivity with respect to UV rays, and the electric field is applied to change an optical length between the flexible thin film and the film portion so the UV ray is to be modulated.

When no voltage is applied between the electrode of the abovementioned exposing device, the optical length between the two films disposed opposite to each other and having the light reflectivity are not changed. If a voltage is applied between the electrodes, the flexible thin film is deflected. Thus, the optical length between the two films are changed. As a result, an optical influence effect of the multilayer film is generated. As a result, modulation of light can be performed.

In the device, a spacer having high relative dielectric constant may be disposed between the first and the second electrodes.

Accordingly, the displacement of the flexible thin film is made constant, and thereby the modulation control performance can be stabilized.

It may be constituted that the light modulator unit includes a transparent substrate provided on an emission face thereof, the transparent substrate having a black mask provided at that portion corresponding to a boundary of adjacent pixels.

The black mask shields light leakage from the boundary of the pixels to raise the contrast effect. in the device, the transparent substrate may be a fiber plate. Alternatively, the transparent substrate may include a distributed refractive index lens.

Since the foregoing exposing device incorporates the fiber plate as the transparent substrate, a UV optical image obtained by the exposing device can be projected and exposed to a sensitive material by a projecting lens. Moreover, contact exposure with the sensitive material can be performed. Since the distributed refractive index lens is employed as the transparent substrate, exposure can be performed such that the distance from the sensitive material can sufficiently be shortened.

It may be constituted that: the light modulator unit has a sealed structure, and rare gas is enclosed therein.

Accordingly, an influence of disturbance can be prevented and thereby a stable structure is realized.

It may be constituted that: the deflected amount of the flexible thin film is controlled continuously.

As a result of the amounts of light transmission being controlled continuously and arbitrary gradient control can be performed by controlling the applied voltage.

It may be constituted that: the light modulator unit includes: an opening formed on an emission face thereof, the opening having an area smaller than the unit area; and a light converging member for converging the UV ray emitted from the flat light source to the opening.

Accordingly, the numerical aperture of the opening in the light modulator unit can be reduced. Therefore, the size of the light modulator unit which is electromechanically operated so as to modulate light can be reduced. As a result, the size of the mechanism and that of the movable member are reduced. Thus, a high speed operation is permitted. Since light conversion is performed by the light converging member, efficient and bright exposure can be performed even if the area of the opening is very small.

In the device, the flexible thin film may include a shading member for shading the UV ray at a focal point of the light converging member when the electric field is applied.

Since the light shielding portion is moved with respect to the focal point, light can reliably be shielded.

Alternatively, the flexible thin film may include an opening for allowing the UV ray to pass through at a focal point of the light converging member when the electric field is applied.

Accordingly, deterioration in the intensity of light owning to a fact that the opening is brought to a position on the optical axis when shielding of light has been suspended can be prevented as compared with the structure in which the shading member is moved toward the focal point. That is, bright exposure and display can be performed as compared with the structure that the shading member is moved.

In the device, the opening may be a through hole and any other portion of the flexible thin film may be an opaque body.

Since the light is allowed to pass through the opening which is a through hole, deterioration in the intensity of light can be prevented. Moreover, the second electrode and the flexible thin film may be constituted by usual thin metal films. As a result, freedom to select materials can be enhanced.

Still alternatively, a shading member for shading only a component on the optical axis of the UV ray passing through the opening may be arranged at one of an incident face side and the emission face side of the light modulator unit.

Since the light traveling in the direction of the optical axis and allowed to pass through the opening is shielded by the shading member when the light shielding operation is performed contrast of the exposure can be raised.

It may be constituted that: a collimator member is disposed between the opening and the light converging member, the collimator member for collimating such that the UV ray has an area substantially equal to that of the opening.

Accordingly, interference type or diffraction type light modulation can effectively be performed.

It may be constituted that: a fiber plate is disposed between the opening and the light converging member.

Accordingly, the light emitted from the flat light source can be introduced into the modulator unit in a state in which the area of light incidence on the modulator unit is reduced.

It may be constituted that: the light modulator unit includes: a first electrode disposed above the flat light source; a second electrode disposed opposite to the first electrode such that at least a gap is interposed; a shading member, which is opaque with respect to UV rays, interposed between the first and second electrodes and to be moved to release the shading by Coulomb force generated when an electric field is applied therebetween.

When no voltage is applied between the electrodes of the above-mentioned exposing device, the flexible thin film absorbs or reflects the UV ray to intercept the path. If a voltage is applied between the electrodes, the flexible thin film is deflected. Thus, the flexible thin film is deviated from the path for the UV ray, causing the UV ray to travel forward. As a result, modulation of light can be performed.

In the device, the shading member may be moved in a direction substantially similar to an optical axis of the UV ray when the electric field is applied.

Since the shading member is operated in a direction of a straight line when light is shielded or shielding of light is suspended, a reliable mechanism can be obtained.

Alternatively, the shading member may be moved in a direction substantially perpendicular to an optical axis of the UV ray when the electric field is applied.

Accordingly, the distance from an adjacent light modulator unit can be shortened as compared with a structure in which the shading member is moved in a direction similar to the direction of the optical axis. it may be constituted that the flat light source includes a low-pressure mercury lamp for emitting a UV ray having 254 nm of the central wave length and a light guide plate for guiding the UV ray.

Since the main component of the UV ray is a line spectrum of 254 nm and the line spectrum has a considerably high energy efficiency, efficient modulation having high contrast can be performed.

It may be constituted that: the flat light source includes a low-pressure mercury lamp inside of which a fluorescent material emitting a 300–400 nm of UV ray is applied and a light guide plate for guiding the UV ray.

The above-mentioned exposing device uses a UV ray having a specific wavelength as light of a backlight. Therefore, the light reflectivity of a dielectric multilayer film mirror for a case in which a voltage is applied between the electrodes and that for a case in which no voltage is applied are previously set to correspond to a UV ray having a specific wavelength. As a result, when a voltage is applied, only the UV ray having the specific wavelength can be transmitted. Thus, modulation of light can be performed.

It may be constituted that: the UV ray emitted from the flat light source is collimated.

Accordingly, emission of UV rays having directivity can be performed.

It may be constituted that: the flat light source includes a UV lamp, a reflection plate provided around the UV lamp and a light guide plate for guiding the UV ray; and the reflection plate reflects the UV ray such that the incident UV ray is guided in the light guide plate with an angle higher than the total reflection angle.

Accordingly, emission of UV rays having no directivity can be performed.

It may be constituted that the flat light source is a light emitting device emitting the UV ray.

Accordingly, the size of the light source can be reduced.

It may be constituted that: the flat light source is a flat light source unit including a UV lamp and a light guide plate for guiding the UV ray; and the flat light source unit is separately provided from the light modulator unit.

Accordingly, the light source unit and the light modulator can individually be manufactured. As a result, freedom to select materials can be improved.

Alternatively, it may be constituted that: the flat light source is a flat light source unit including a UV lamp and a light guide plate for guiding the UV ray; and the first electrode is disposed on the light guide plate.

It may be constituted that: when one pixel is divided into plural unit areas, the light modulator units provided in the respective unit areas are connected to a common electrode for allowing the operations of the respective light modulator units to be the same with regard to each of the pixels.

Accordingly, the size of each of the light modulator units can be reduced. Moreover, a voltage required to be applied to the control exposure can be lowered. In addition, response time in the exposure control can be shortened and high speed exposure can be performed.

Alternatively, it may be constituted that: when one pixel is divided into plural unit areas, the light modulator units provided in the respective unit areas are connected to different electrodes for allowing the operations of the respective light modulator units to be different with each other with regard to each of the pixels.

Accordingly, one pixel can be operated in a plurality of gradation levels if a combination of the operations of the light modulating portions is changed.

It may be constituted that: one pixel is divided into plural unit areas having different areas with each other.

Accordingly, a larger number of gradation levels can be obtained when the number of divisions is the same as compared with the structure that divided regions have the same areas.

It may be constituted that: when one pixel is divided into plural unit areas, the light modulator units are arranged into a simple matrix structure and controlled by simple matrix driving.

Alternatively, the light modulator units provided in the respective unit areas are arranged into an active matrix structure together with active devices and controlled by active matrix driving.

Accordingly, the size of each light modulating portion of the simple or active matrix structure can be reduced and the operation speed thereof can be raised. Further, a multiplicity of gradation levels can be expressed by one pixel.

In the device, a predetermined voltage is applied to the respective light modulator units to select either performing the light modulation or maintaining the previous state thereof.

The array-type light modulator is arranged to perform the modulating operation with which required voltage is applied to the light modulator. Therefore, if the light modulator has no hysteresis characteristic and arranged to be operated linearly with respect to the applied voltage enables each light modulator to stably be operated without a resetting operation.

In the device, a reset operation for setting back the electro-mechanical operation may be performed before the state selecting operation.

Accordingly, exertion of an influence of the state before the modulating operation on the next operation owing to the hysteresis characteristic of the device can be prevented. Therefore, stable modulation can be performed. The hysteresis characteristic of the device enables the light modulator units to be operated without contradiction, that is, pixels on non-selected scanning lines to reliably maintain an ON/OFF state set when the modulation has been performed.

According to the present invention, there is also adopted a flat-type display comprising: a flat light source for emitting a UV ray; a light modulator unit disposed above the flat light source so as to be associated with at least one unit area derived by dividing each of pixels on the image, the light modulator unit modulating the UV ray by electromechanical operation to expose the image forming body; and a fluorescent member unit disposed opposite to the light modulator unit, the fluorescent member unit including a fluorescent member excited by the UV ray emitted from the light modulator unit.

Accordingly, for example, a Fabry-Perot effect is used to control the intensities of light beams emitted from the light modulator unit so as to excite the fluorescent members. Thus, an image formed by dint of emission of fluorescence can be obtained.

Also with respect to the above flat-type display, similar configuration described above can be applied to realize the present invention.

It may be constituted that the fluorescent member unit includes a black mask provided at that portion corresponding to a boundary of adjacent pixels.

Accordingly, the contrast ratio of the fluorescent members can be enhanced.

It may be constituted that: a fluorescent member includes a film member provided on a face thereof facing the light modulator unit, the film member being transparent with respect to UV rays and opaque with respect to visible rays.

Accordingly, a portion of light of the visible rays scattered to the light modulator unit is reflected to the surface by the film member. As a result, the displaying efficiency can be improved.

It may be constituted that a fluorescent member includes a film member provided on a face thereof emitting the excited rays, the film member is transparent with respect to visible rays and opaque with respect to UV rays.

Accordingly, the UV ray attempted to be emitted to the surface of the emission side of the fluorescent member unit is absorbed or reflected by the film member. As a result, no UV ray is emitted over the display surface. Since the UV ray is reflected by the light emission side of the fluorescent member unit, the UV ray can again be used. Thus, the displaying efficiency can be improved.

BRIEF DESCRIPTION OF THE DRAWINGS

In the accompanying drawings:

FIGS. 42(A) and 42(B) are cross sectional views showing states in which the array-type exposing device shown in FIG. 40 is being operated;

FIG. 43 is a cross sectional view showing a first modification of the fourteenth embodiment;

FIG. 44 is a cross sectional view taken along line A—A shown in FIG. 43;

FIGS. 45(A) and 45(B) are plan views showing states in which the array-type exposing device shown in FIG. 43 is being operated;

FIGS. 46(A) and 46(B) are cross sectional views of FIGS. 45(A) and 45(B) respectively;

FIG. 47 is a cross sectional view showing an array-type exposing device according to a fifteenth embodiment of the present invention;

FIGS. 48(A) and 48(B) are plan views showing examples of a light shielding film of the array-type exposing device shown in FIG. 47;

FIGS. 49(A) and 49(B) are cross sectional views showing states in which the array-type exposing device shown in FIG. 47 is being operated;

FIG. 50 is a cross sectional view showing an array-type exposing device according to a sixteenth embodiment of the present invention;

FIGS. 51(A) and 51(B) are plan views showing examples of an opening of the array-type exposing device shown in FIG. 50;

FIGS. 52(A) and 52(B) are cross sectional views showing states in which the array-type exposing device shown in FIG. 50 is being operated;

FIG. 53 is a cross sectional view showing a first modification of the sixteenth embodiment;

FIG. 63 is a plan view showing an array-type light modulator having light modulator units arranged in a matrix configuration;

FIG. 64 is a table showing voltages between electrodes of the light modulator units derived from combinations of voltages of scan electrodes and voltages of signal electrodes;

DETAILED DESCRIPTION OF THE PREFERRED EMBODIMENTS

Figure 1:
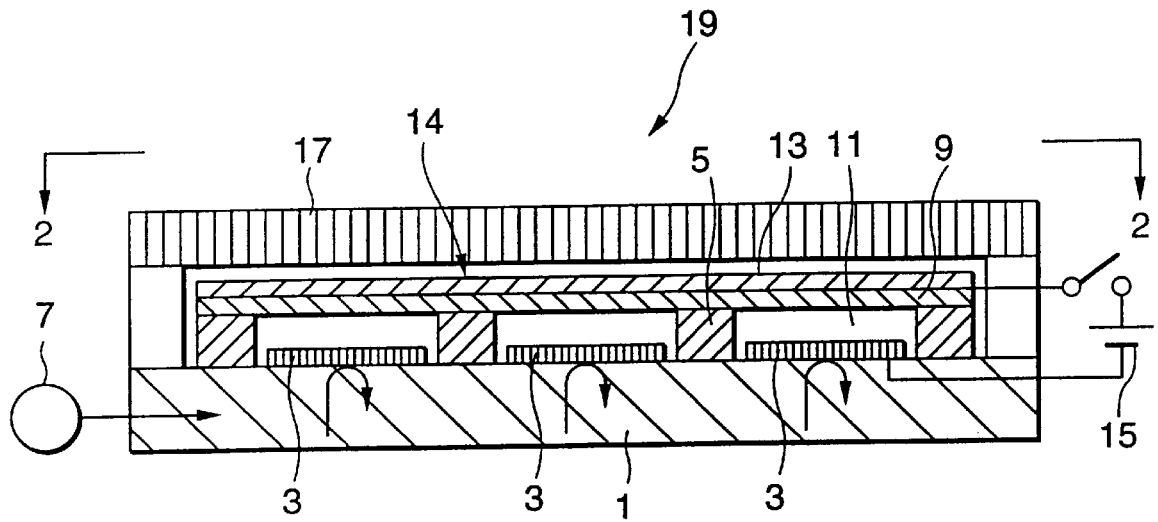
FIG. 1 is a cross sectional view showing an exposing device according to a first embodiment of the present invention.
Figure 2:
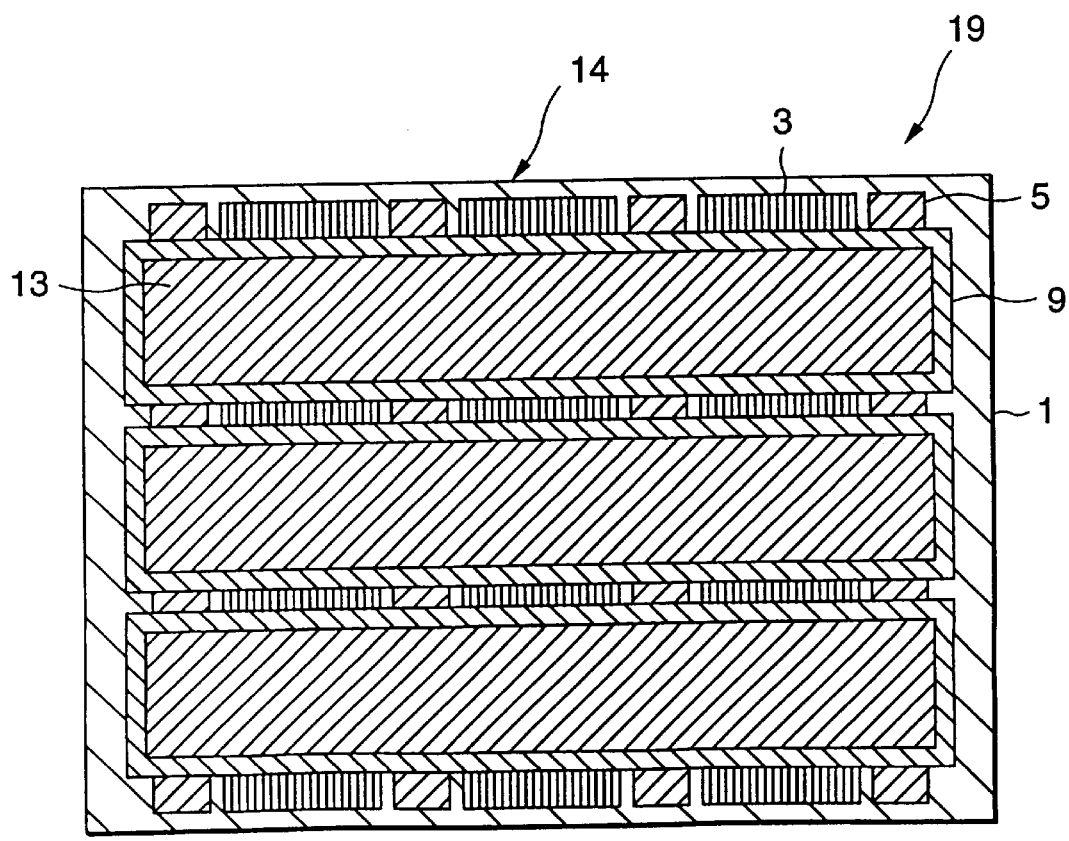
FIG. 2 is a cross sectional view taken along line A—A shown in FIG. 1.

Preferred embodiments of an exposing device according to the present invention will now be described with reference to the accompanying drawings. FIG. 1 is a cross sectional view showing an exposing device according to a first embodiment of the present invention. FIG. 2 is a cross sectional view taken along line A—A shown in FIG. 1.

A plurality of parallel and transparent electrodes (signal electrodes) 3 formed into elongated shapes are formed on a light guide plate 1 such that the signal electrodes 3 are positioned apart from one another. Supporters 5 for separating the adjacent signal electrodes 3 are formed on the light guide plate 1. The supporters 5 can be formed by, for example, etching a material which is the same as that for forming the light guide plate 1. A UV ray lamp (a low-pressure mercury lamp) 7 serving as a light source is disposed on the side of the light guide plate 1. A light beam emitted from the UV ray lamp 7 is transmitted to the surface (the upper surface in FIG. 1) of the light guide plate 1.

A transparent flexible thin film 9 is formed on the upper surface of the supporters 5 at a position apart from the signal electrodes 3. Therefore, gaps 11 are formed between the signal electrodes 3 and the flexible thin film 9. A plurality of other electrodes (scan electrodes) 13 formed into transparent and elongated shapes are formed on the upper surface of the flexible thin film 9 in a direction perpendicular to the signal electrodes 3. The plural scan electrodes 13 are formed in parallel with one another and apart from one another. That is, the signal electrodes 3 and the scan electrodes 13 are arranged in perpendicular directions so that a lattice configuration is formed, as shown in FIG. 2. When the signal electrodes 3 and the scan electrodes 13 having predetermined structures are selected, matrix electrodes are realized with which a specific opposing electrode portion can be instructed. The light guide plate 1, the signal electrodes 3, the flexible thin film 9 and the scan electrodes 13 constitute a light modulator unit 14.

A power source 15 is connected to the signal electrodes 3 and the scan electrodes 13. The power source 15 is able to selectively apply a voltage to a predetermined electrode in accordance with image information. A transparent front plate 17 is disposed above the light modulator unit 14.

An exposing device 19 structured as described above incorporates the light guide plate 1 which is constituted by a resin film made of polyethylene terephthalate or polycarbonate as well as transparent glass.

The signal electrodes 3 and the scan electrodes 13 are made of transparent and conductive materials. The transparent electrodes are made of materials which permit transmission of UV rays or the same have an optical characteristic which permits the transmission. In general, the transparent electrodes are made of a metal material made to be transparent by a particulating process or a metal compound having conductivity. The metal material may be gold, silver, palladium, zinc or aluminum. The metal compound may be indium oxide, zinc oxide or aluminum-added zinc oxide (popularly called "AZO"). Specifically, a $SnO_2$ film (a Nesa film) or an ITO film may be employed.

The signal electrodes 3 and the scan electrodes 13 can be formed by laminating a thin film of the above-mentioned conductive material on the surface of the light guide plate 1 or the flexible thin film 9 by a sputtering method or a vacuum evaporation method. Then, the surface of the thin film is coated with resist, and then exposure and development are conducted. The exposure is performed such that a photomask is disposed on the photoresist Then, a UV ray is applied from a position above the photomask. The development is conducted by using development solution which is able to remove soluble portion of the photoresist.

Also a power supply circuit which is connected to the signal electrodes 3 and the scan electrodes 13 can be formed by using a pattern simultaneously with the process for forming the signal electrodes 3 and the scan electrodes 13.

Figures 3, 4A, 4B:
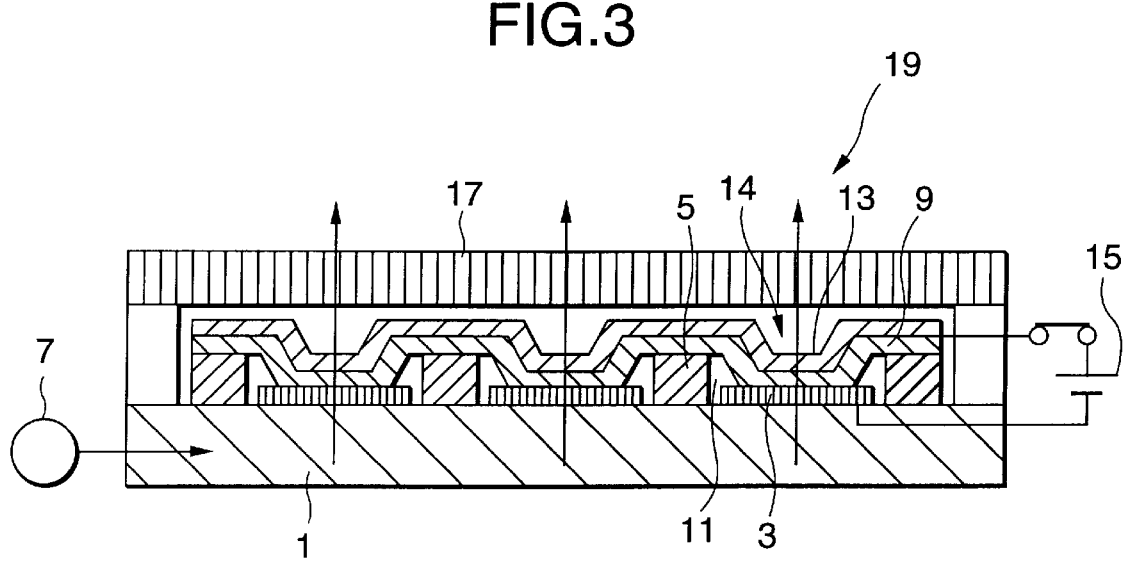
FIG. 3 is a cross sectional view showing a state in which the exposing device shown in FIG. 1 is being operated.
FIGS. 4(A) and 4(B) are diagrams for making a comparison between surface exposure using a related exposing device and digital multi-exposure using the exposing device shown in FIG. 1.

FIG. 3 is a cross sectional view showing a state in which the exposing device shown in FIG. 1 is being operated.

When a voltage is applied between the signal electrodes 3 and the scan electrodes 13 by the power source 15, Coulomb force generated in the exposing device 19 attracts the flexible thin film 9 so that the flexible thin film 9 is deflected toward the gaps 11. The deflection of the flexible thin film 9 by dint of the Coulomb force is hereinafter called an electromechanical operation. As a result, a light beam allowed to pass through the flexible thin film 9 from the light guide plate 1 and emitted as described above is modulated. Therefore, when the voltage of the power source 15 is selectively applied to the signal electrodes 3 and the scan electrodes 13 in accordance with image information, required control of the exposure can be performed.

Since the exposing device 19 is able to perform digital multi-exposure, high-speed recording (typing or printing) can be performed when it is employed in an image recording apparatus (a printer, a duplicator or the like) which forms an image by exposing.

That is, a printer incorporating a related exposing device has a structure that a predetermined area is exposed to light in a predetermined time, as shown in FIG. 4 (A). Therefore, the relative movement between the exposing device and the image forming member is interrupted.

On the other hand, a printer incorporating the exposing device 19 has a structure that the flexible thin films 9 corresponding to each matrix electrode are selectively operated so that the digital multi-exposure is permitted. Therefore, line control is performed while the exposing device 19 and the image forming member are being relatively moved, as shown in FIG. 4 (B). Thus, high speed exposure can be performed, causing the recording speed to considerably be raised.

When the digital multi-exposure is used, the exposing device 19 may be employed in DDCP (Digital Direct Color Proof) which is combination of an electrophotographic technique and an offset printing technique or CTP (Computer-To-Plate) for performing transference by directly forming an image on a plate.

The above-mentioned exposing device 19 does not use a laser beam which raises the cost of the apparatus but uses a low cost UV ray lamp 7. A high speed digital multi-exposure can be performed.

The light guide plate 1, the signal electrodes 3 and the supporters 5 can be formed into an array structure by etching. Thus, the manufacturing cost can be reduced.

Since light transmitted from the light guide plate 1 is allowed to pass through only the pair of the transparent electrodes interposing the gap, the efficiency of using light can be improved.

Moreover, required operation voltage can be lowered as compared with the exposure using a laser beam.

The exposing device 19 may be provided with color filters and interference filters for selecting wavelengths in anywhere of the optical paths.

The light modulator unit 14 of the exposing device 19 may be formed integrally such that the light guide plate 1 is used as the substrate or may be formed individually.

The light modulator unit 14 of the exposing device 19 may be structured such that the overall body is sealed by enclosing a rare gas after deaeration so as to prevent an influence of disturbance so that a stable structure is formed.

An exposing device according to a second embodiment of the present invention will now be described.

Figure 5:
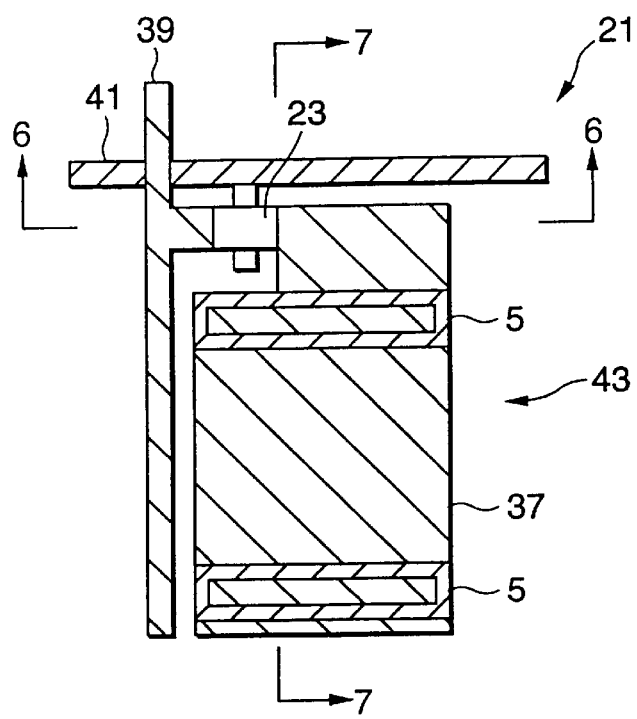
FIG. 5 is a plan view showing a light modulator unit according to the second embodiment of the present invention.
Figure 6:
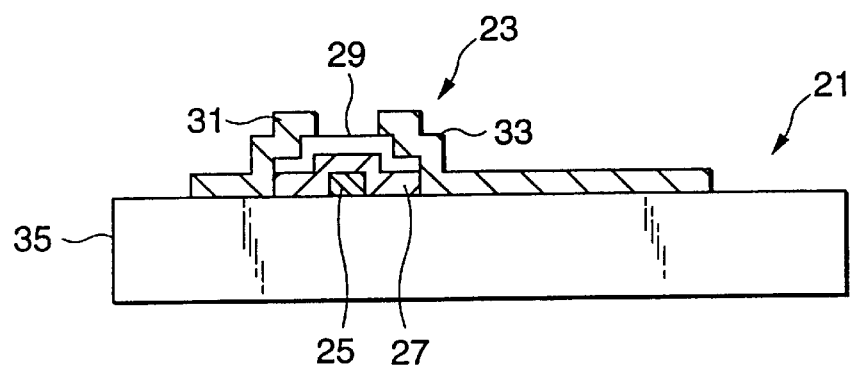
FIG. 6 is a cross sectional view taken along line A—A shown in FIG. 5.
Figure 7:
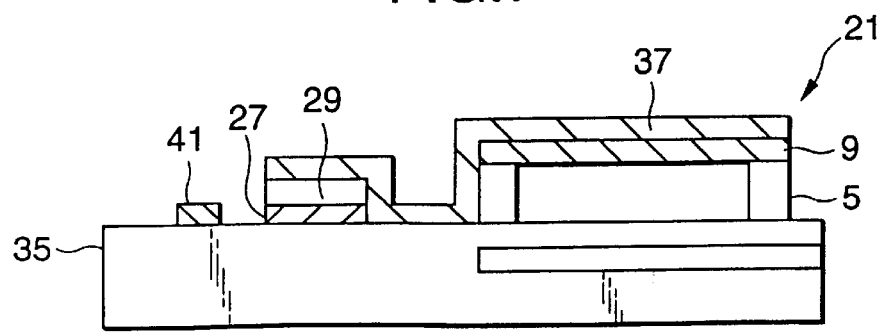
FIG. 7 is a cross sectional view taken along line B—B shown in FIG. 5.
Figure 8:
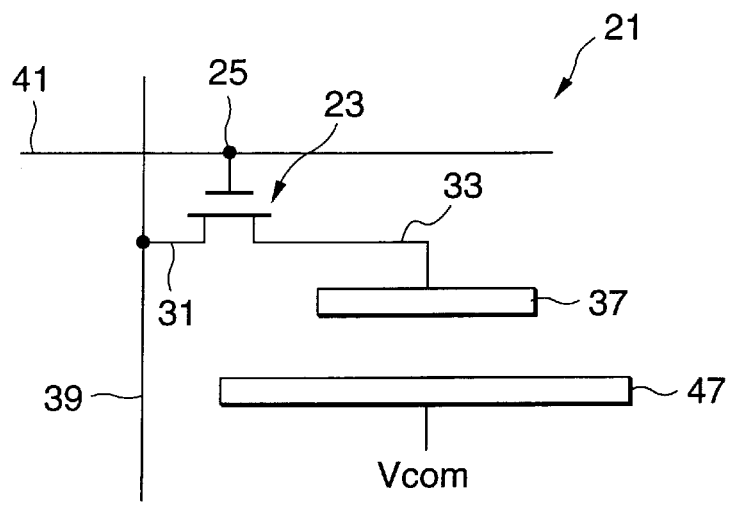
FIG. 8 is circuit diagram equivalent to the pixel portion shown in FIG. 5.

FIG. 5 is a plan view showing a light modulator unit according to the second embodiment. FIG. 6 is a cross sectional view taken along line A—A shown in FIG. 5. FIG. 7 is a cross sectional view taken along line B—B shown in FIG. 5. FIG. 8 is a diagram showing an equivalent circuit of a pixel portion shown in FIG. 5.

An exposing device according to the first embodiment is able to perform the simple matrix operation. The exposing device may be performed by an active operation.

That is, the exposing device 21 incorporates an active device (for example, TFT) 23 for each pixel. The TFT 23 is composed of a gate electrode 25, an insulating film 27, an a-Si:H layer 29, an electrode (a drain electrode) 31 and another electrode (a source electrode) 33. The TFT 23 is formed on a substrate 35.

A pixel electrode 37 is connected to the source electrode 33 of the TFT 23. An image signal line 39 for each column is connected to the drain electrode 31. A scan signal line 41 for each row is connected to the gate electrode 25.

The pixel electrode 37 is laminated on the flexible thin film 9 in the light modulator unit 43. The flexible thin film 9 is bridged between the supporters 5. Moreover, another electrode (a common electrode) 47 which is applied with potential $V_{com}$ is provided for the substrate 35 to be opposite to the pixel electrode 37.

In the light modulator unit 43 of the exposing device 21 structured as described above, a voltage for electrically conducting the TFT 23 is applied to the scan signal line 41 connected to the gate electrode 25. When a voltage for a required image signal is applied to an image signal line 39 connected to the drain electrode 31, the drain electrode 31 and the source electrode 33 are conducted to each other. Therefore, the voltage of the image signal is applied to the pixel electrode 37. As a result, the voltage of the potential $V_{com}$ of the common electrode 47 and the potential of the pixel electrode 37 causes electrostatic stress to act. As a result, required modulation of light can be performed.

Even if the TFT 23 is brought to a non-conductive state for the purpose of scanning another row, the above-mentioned light modulation state can be maintained. Thus, matrix modulation of a plurality of rows can be performed.

An exposing device according to a third embodiment of the present invention will now be described.

Figure 9:
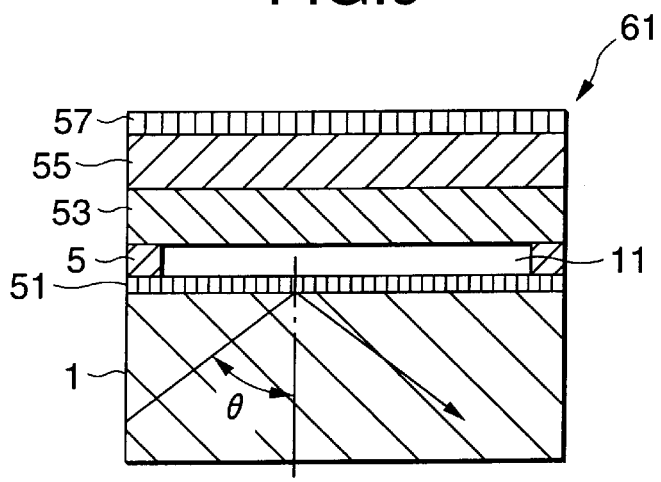
FIG. 9 is a cross sectional view showing a light modulator unit of an exposing device according to a third embodiment of the present invention.
Figure 10:
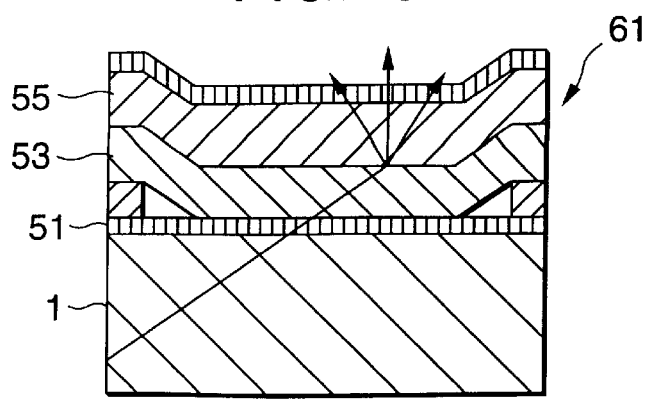
FIG. 10 is a cross sectional view showing a state in which the exposing device shown in FIG. 9 is being operated.

FIG. 9 is a cross sectional view showing a light modulator unit of the exposing device according to the third embodiment. FIG. 10 is a cross sectional view showing a state in which the exposing device shown in FIG. 9 is being operated.

The principle for modulating light by the electromechanical operation of the flexible thin film may use a light guide diffusion effect (hereinafter called "light guide diffusion") by separating the flexible thin film and the transparent signal electrode from each other or bringing the same into contact with each other. The light guide diffusion uses the gap as a transmission resistance for light. When a gap is formed, light emitted from the signal electrode is intercepted or attenuated. Only when the flexible thin film is brought into contact with the signal electrode, light emitted from the signal electrode is transmitted (mode coupling) to the flexible thin film. The transmitted light beam is diffused by the flexible thin film so that the intensity of light emitted from the flexible thin film is controlled (light is modulated).

As shown in FIG. 9, an electrode 51 which is transparent with respect to a UV ray is formed on a light guide plate 1. In this embodiment, it is preferable that a metal oxide, such as ITO, having a high electron density, a very thin metal film (made of aluminum), a thin film in which metal particles are dispersed in a transparent insulating member or a wide band gap semiconductor in which high concentration doping has been performed is employed.

Insulating supporters 5 are formed on the electrode 51. The supporters 5 may be made of, for example, a silicon oxide, a silicon nitride, ceramic or resin. A diaphragm 53 is formed on the upper surface of the supporters 5. Gaps (cavities) 11 are formed between the electrode 51 and the diaphragm 53. The diaphragm 53 may be made of a semiconductor, such as polysilicon, an insulating silicon oxide, a silicon nitride, ceramic or resin. It is preferable that the refractive index of the diaphragm 53 is the same as that of the light guide plate 1 or superior to that of the light guide plate 1.

A light diffusion layer 55 is formed on the diaphragm 53, the light diffusion layer 55 being formed into a structure in which irregularities are formed on the surface of an inorganic or organic transparent material, a structure having a microprism or a microlens or a structure in which an inorganic or organic porous material or particles having different refractive indexes are dispersed in a transparent base.

Another electrode 57 which is transparent with respect to a UV ray is formed on the light diffusion layer 55. For example, the material for making the electrode 51 may be employed. The diaphragm 53, the light diffusion layer 55 and the electrode 57 constitute the flexible thin film.

The gaps 11 exist between the light guide plate 1 and the diaphragm 53. The gaps 11 is substantially determined by the height of the supporters 5. It is preferable that the height of the gaps 11 is about 0.1 μm to about 10 μm. The gaps 11 are usually formed by etching a sacrifice layer.

Another structure may be employed in which the diaphragm 53 and the light diffusion layer 55 are made of the same material. For example, the diaphragm 53 is constituted by a silicon nitride film and irregularities are formed on the upper surface. In this case, the diffusing function can be realized.

The principle of the light modulating operation of the exposing device 61 will now be described.

A case will be considered in which the voltage of the two electrodes 51 and 57 is zero and the gaps 11 (for example, air) exist between the diaphragm 53 and the light guide plate 1 when supply of the voltage is interrupted.

Assuming that the refractive index of the light guide plate 1 is nw, the critical angle $\theta_c$ of the total reflection is as follows:

$$\theta_c = \sin^{-1}(nw)$$

Therefore, the UV ray travels forwards in the light guide plate 1 while the same is being totally reflected as shown in FIG. 9 when an incidence angle $\theta_c$ on the interface satisfies $\theta > \theta_C$.

When a voltage is applied to the two electrodes 51 and 57 when the supply of the voltage is being performed to bring the diaphragm 53 and the surface of the light guide plate 1 into contact with each other or move sufficiently closer to each other, the UV ray transmits to the diaphragm 53, as shown in FIG. 10. Then, the UV ray is diffused by the light diffusion layer 55 so as to be emitted over the surface.

The exposing device 61 according to this embodiment is able to modulate light by controlling the position of the diaphragm 53 by applying voltage.

Although the electrode 51 which is transparent with respect to a UV ray is disposed between the light guide plate 1 and the diaphragm 53, no problem for the operation arises if the electrode 51 has a thickness (2000 Å) of a usual thin film.

The exposing device 61 according to this embodiment is able to change the distance between the diaphragm 53 and the light guide plate 1 and area of contact between the same by changing the voltage level. As a result, the amount of light transmission can be controlled. By using the above-mentioned effect, gradient control can be performed by changing the applied voltage.

An exposing device according to a fourth embodiment of the present invention will now be described.

As the basic principle for modulating light by causing the flexible thin film to perform the electro-mechanical operation, Fabry-Perot interference may be used. With the Fabry-Perot interference, an incident ray repeats reflection and transmission so that the ray is divided into a multiplicity of light beams in a state in which two flat surfaces oppose each other. Thus, the light beams are made to be parallel beams. Transmitted light beams superimpose and interfere with one another at infinity. Assuming that the perpendicular of the surface and an angle made by the incident light is i, the difference between optical paths for two adjacent light beams is given by $$x = nt \cdot \cos i,$$

where n is the refractive index between the two surfaces and t is an interval. If the difference x in the optical paths is an integer multiple of wavelength λ, the transmitted beams intensify one another. If x is an odd number multiple of half of the wavelength, transmitted beams negate one another. That is, a case will now be considered in which the phase is not changed when reflection has been performed when 2nt·cos i=m λ, the amount of light transmission is made to be maximum.

When 2nt·cos i=(2m+1)λ/2, the amount of light transmission is made to be minimum, where m is a positive integer.

That is, the flexible thin film is moved to make the difference x in the optical path so that light emitted from the signal electrode portion is modulated so as to be emitted from the flexible thin film.

A specific example of an exposing device using the Fabry-Perot interference will now be described with reference to FIGS. 11 to 18.

Figure 11:
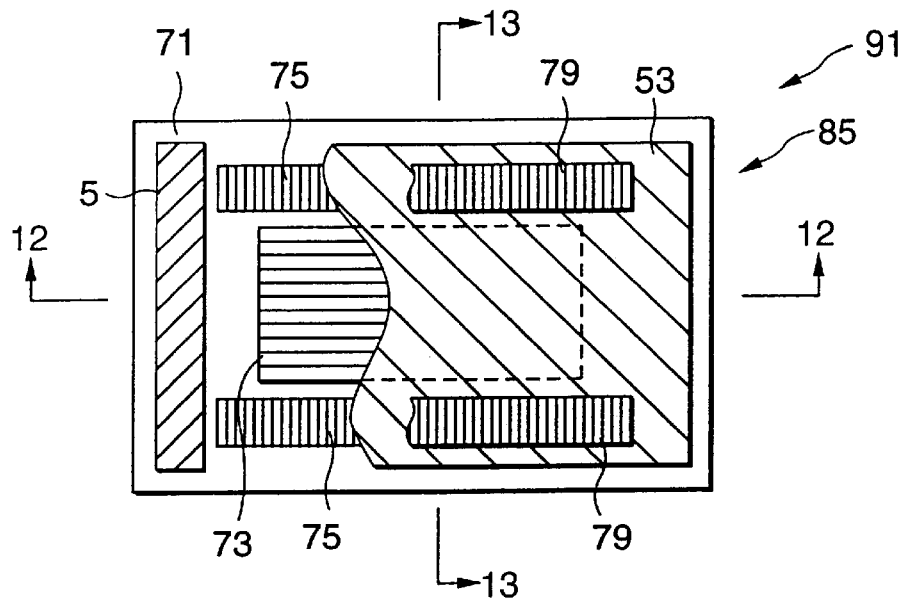
FIG. 11 is a plan view showing a light modulator unit of an exposing device according to a fourth embodiment of the present invention.
Figure 12:
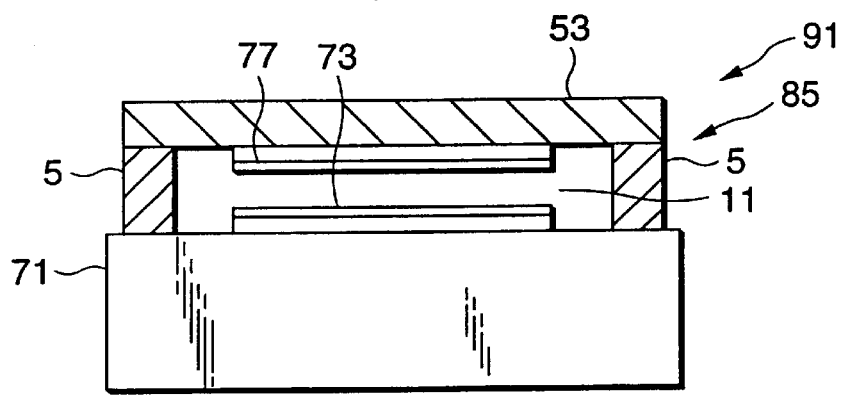
FIG. 12 is a cross sectional view taken along line A—A shown in FIG. 11.
Figure 13:
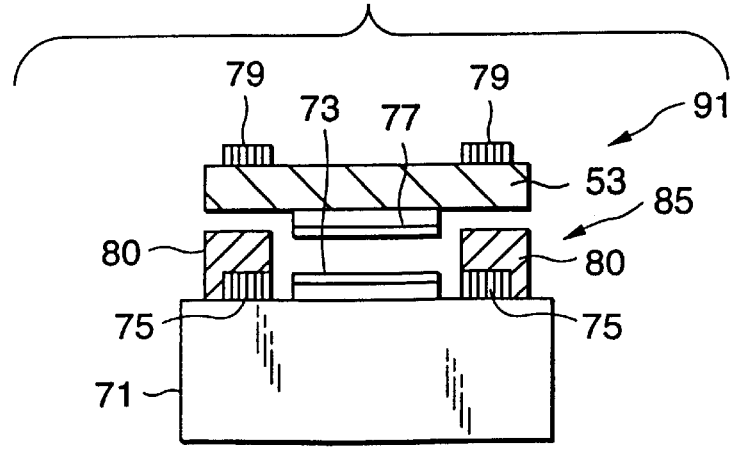
FIG. 13 is a cross sectional view taken along line B—B shown in FIG. 11.
Figure 14:
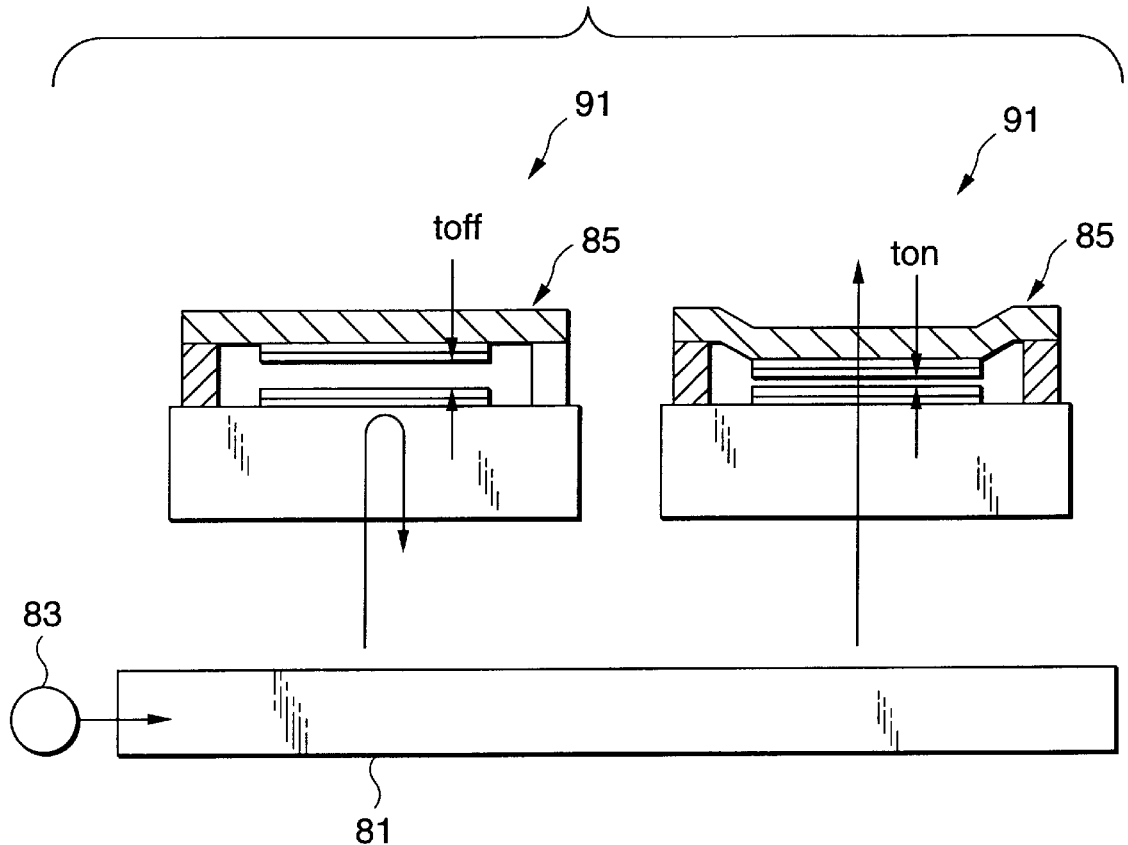
FIG. 14 is a cross sectional view showing a state in which the exposing device shown in FIG. 11 is being operated.
Figure 15:
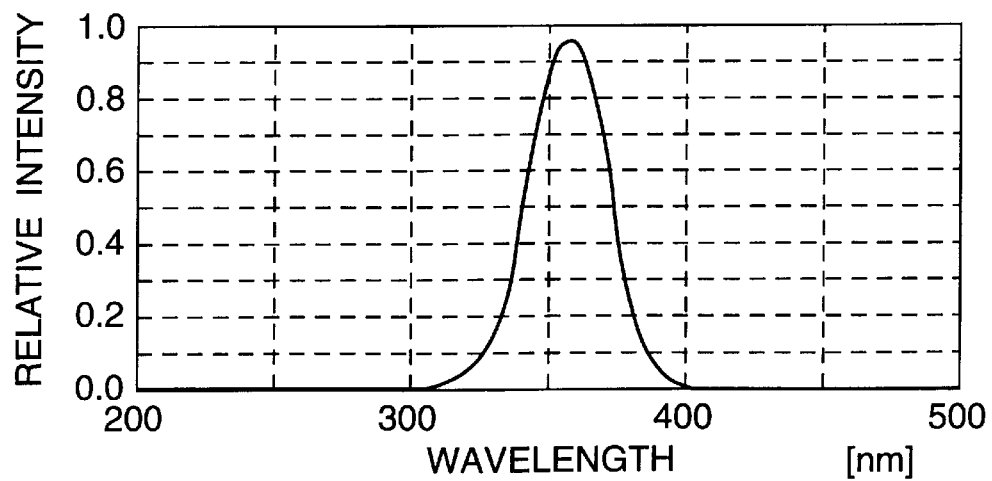
FIG. 15 shows a spectral characteristic of a low-pressure mercury lamp for black light.
Figure 16:
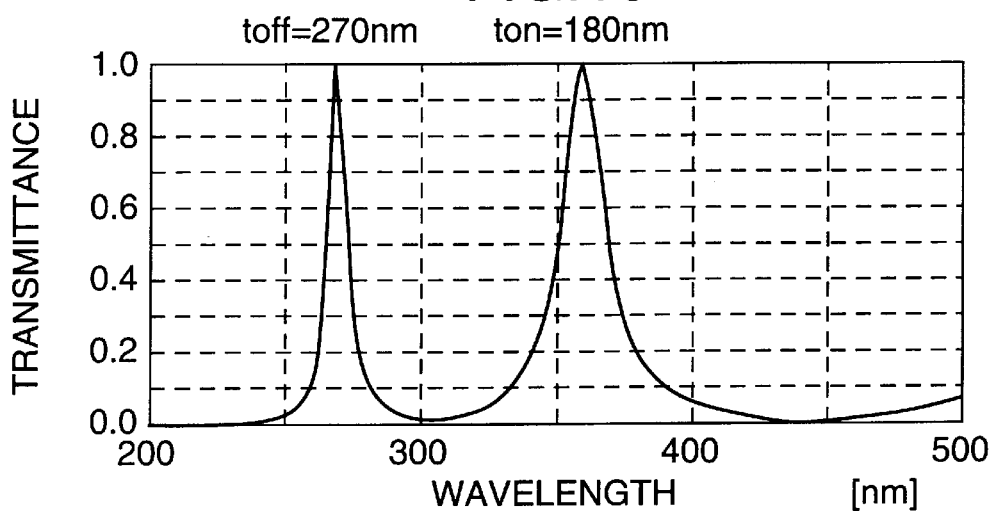
FIG. 16 shows a spectral characteristic of transmittance of a light modulator incorporating the low-pressure mercury lamp shown in FIG. 15.
Figure 17:
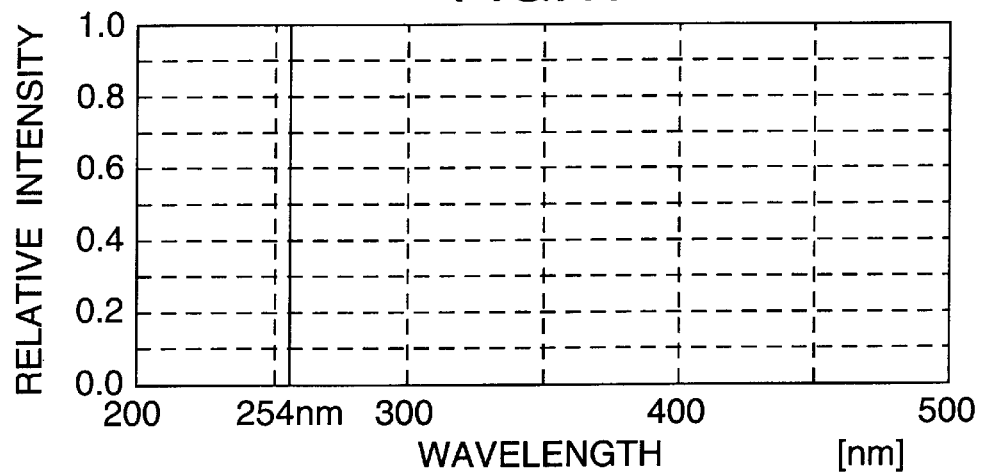
FIG. 17 shows a spectral characteristic of a backlight incorporating a low-pressure mercury lamp.
Figure 18:
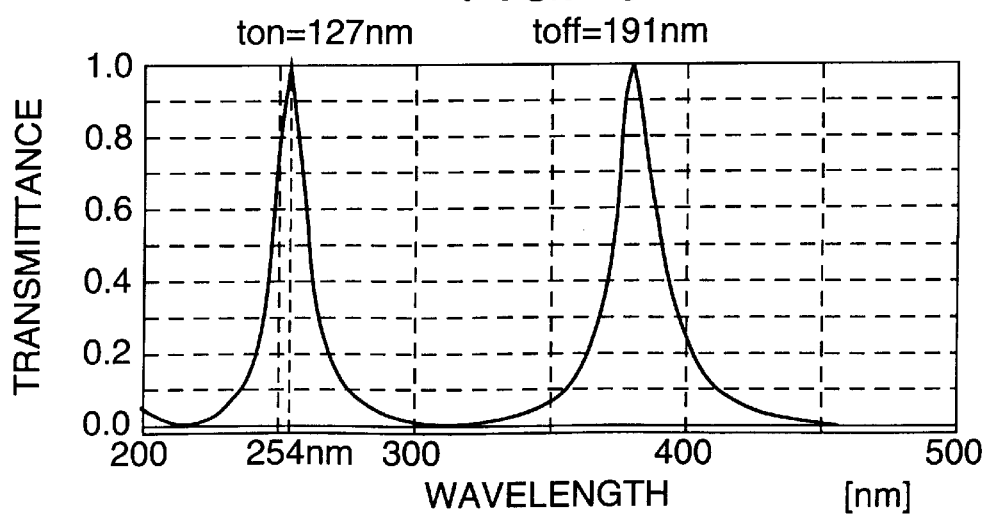
FIG. 18 shows a spectral characteristic of transmittance of the light modulator incorporating the low-pressure mercury lamp shown in FIG. 17.

FIG. 11 is a plan view showing a light modulator unit of the exposing device according to the fourth embodiment. FIG. 12 is a cross sectional view taken along line A–A shown in FIG. 11. FIG. 13 is a cross sectional view taken along line B–B shown in FIG. 11. FIG. 14 is a cross sectional view showing a state in which the exposing device shown in FIG. 11 is being operated. FIG. 15 is shows the spectral characteristic of a low-pressure mercury lamp for black light. FIG. 16 shows a spectral characteristic of transmittance of a light modulator incorporating the low-pressure mercury lamp shown in FIG. 15. FIG. 17 shows is a spectral characteristic of a backlight incorporating a low-pressure mercury lamp. FIG. 18 shows a spectral characteristic of transmittance of a light modulator incorporating the low-pressure mercury lamp shown in FIG. 17.

A dielectric multilayer-film mirror 73 is disposed on a substrate 71 which is transparent with respect to a UV ray. A pair of electrodes 75 are formed on the two sides of the substrate 71 such that the dielectric multilayer-film mirror 73 is interposed. Supporters 5 are disposed at the right and left (right and left portions in FIG. 11) portions of the electrodes 75. A diaphragm 53 is disposed on the upper surfaces of the supporters 5. A dielectric multilayer-film mirror 77 is formed on the lower surface of the diaphragm 53 opposing the dielectric multilayer-film mirror 73. Gaps 11 are formed between the dielectric multilayer-film mirror 73 and the dielectric multilayer-film mirror 77. Another pair of electrodes 79 are formed on the diaphragm 53 to oppose the electrodes 75. In the drawing, reference numeral 80 denotes a spacer.

As shown in FIG. 14, a UV ray lamp (a low-pressure mercury lamp) 83 for black light is disposed on the side of the plate-like flat light source 81. A flat light source unit 81 receives the UV ray emitted from the low-pressure mercury lamp 83 for black light through the side surface thereof to emit the same to the surface thereof.

When a fluorescent material (for example, $BaSi_2O_5:Pb_2^+$) for black light is applied to the inner wall of the low-pressure mercury lamp 83, the spectral characteristic of the emitted UV ray is as shoen in FIG. 15. That is, central wavelength $\lambda_0$ exists in the vicinity of 360 nm. The foregoing UV ray is used as a backlight beam.

In the light modulator unit 85 structured as described above, an assumption is make that the height of the gaps 11 when no voltage is supplied is $t_{off}$ (in the left-hand state shown in FIG. 14). The height can be controlled when the device is manufactured. The height of the gaps 11 is shortened by dint of the electrostatic force when voltage has been applied. The short height is made to be $t_{on}$ (in the right-hand state shown in FIG. 14). Control of $t_{on}$ can be performed by adjusting the balance between the applied electrostatic stress and the restoring force which is generated when the diaphragm 53 has been deformed. To further stably perform the control, the spacer 80 according to this embodiment may be formed on the electrode to make constant the displacement. If the spacer is made of an insulating material, the dielectric constant (1 or greater) of the insulating material attains an effect of lowering the applied voltage. If the spacer is made of a conductive material, the foregoing effect can furthermore be enhanced. The electrodes and the spacer may be made of the same material.

In this embodiment, $t_{on}$ and $t_{off}$ are determined as follows (m=1):

$t_{on}=\lambda_0/2=180$ nm ($\lambda_0$: central wavelength of UV ray)
$t_{off}=3\lambda_0/4=270$ nm.

The light intensity reflectance R of each of the dielectric multilayerfilm mirrors 73 and 77 are 0.85. The gaps 11 is formed by air or a rare gas having a refractive index n=1. Since the UV ray is collimated, incident angle i on the light modulator unit 85 is substantially zero. The light intensity transmittance of the light modulator unit 85 is as shown in FIG. 16. Therefore, $t_{off}=270$ nm when no voltage is applied, causing substantially no UV ray to be allowed to pass through. If voltage is applied and thus $t_{on}=180$ nm, UV ray is allowed to pass through.

The exposing device 91 having the light modulator unit 85 is able to deflect the diaphragm 53 to obtain a multilayer film interference effect. Thus, the UV ray can be modulated. If the interference conditions are satisfied, an arbitrary combination may be employed among the height t and refractive index n of the gaps 11 and light intensity reflectance R of the dielectric multilayer-film mirrors 73 and 77.

If the height t is continuously changed by changing the level of the voltage, the central wavelength of the transmissive spectrum can arbitrarily be changed. Thus, the amount of light transmittance can continuously be controlled. That is, gradient control by changing the applied voltage can be performed.

As a modification of the light modulator unit 85 according to this embodiment, a backlight comprising a low-pressure mercury lamp may be employed in place of the abovementioned low-pressure mercury lamp 83 for black light.

That is, a main component of the spectral characteristic of direct light of the low-pressure mercury lamp is a line spectrum of 254 nm. By using the foregoing lamp as the light source and a light guide plate made of quartz glass is combined with the light source, a backlight unit is constituted. The other wavelengths are cut by a filter or the like. At this time, the spectral characteristic of the UV ray backlight is as shown in FIG. 17.

The light modulator unit has an effective pixel area which is made of materials (the diaphragm, the dielectric multilayer film mirror and the substrate) which permit transmission of UV ray having a wavelength of 254 nm.

In this embodiment, ton and toff are determined as follows (m=1).

$t_{on}=\lambda_0/2=127$ nm ($\lambda_0$: central wavelength of UV ray)
$t_{off}=3\lambda_0/4=191$ nm.

The other conditions are made to be the same as those of the above-mentioned embodiment such that R=0.85, n=1 and i=0. The light transmittance of the light modulator is as shown in FIG. 18. Therefore, when no voltage is applied, $t_{off}=191$ nm. Substantially no UV ray is allowed to pass through. When voltage is applied and thus $t_{on}=127$ nm, UV ray is allowed to pass through. Thus, modulation of light can be performed.

Since the UV ray has a line spectral characteristic in this modification, a very high energy transmittance is realized. Thus, efficient modulation exhibiting high contrast can be performed.

If the interference conditions are satisfied, an arbitrary combination may be employed among the height t and refractive index n of the gaps 11 and light intensity reflectance R of the dielectric multilayer-film mirrors 73 and 77.

Also this modification is able to arbitrarily change the central wavelength of the transmissive spectrum when the height t is continuously changed by changing the voltage. As a result, the amount of light transmittance can continuously be controlled. That is, gradient control can be performed by changing the applied voltage.

An exposing device according to a fifth embodiment of the present invention will now be described.

Figure 19:
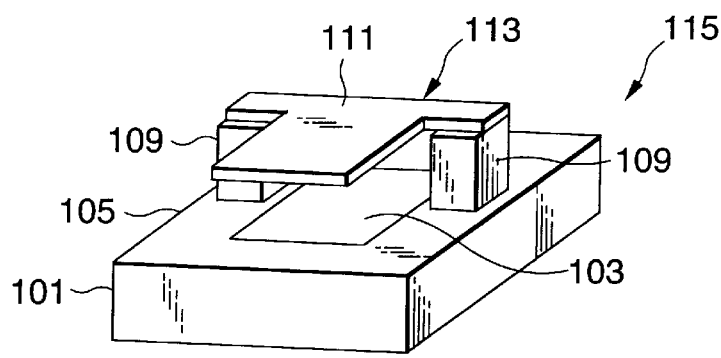
FIG. 19 is a perspective view showing a light modulator unit of an exposing device according to a fifth embodiment of the present invention.
Figure 20:
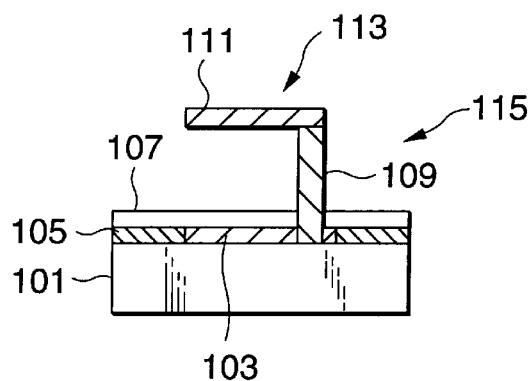
FIG. 20 is a cross sectional view showing the light modulator unit shown in FIG. 19.
Figure 21:
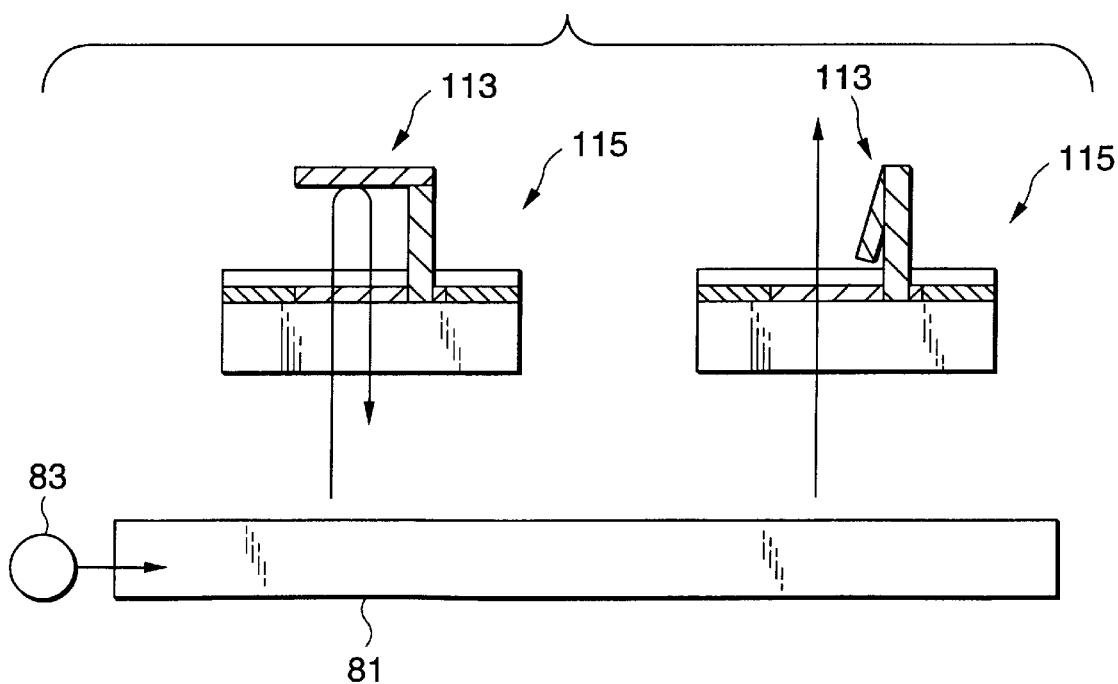
FIG. 21 is a cross sectional view showing a state in which the exposing device shown in FIG. 19 is being operated.

FIG. 19 is a perspective view showing a light modulator unit of the exposing device according to the fifth embodiment. FIG. 20 is a cross sectional view showing the light modulator unit shown in FIG. 19. FIG. 21 is a cross sectional view showing a state in which the exposing device shown in FIG. 19 is being operated.

A transparent electrode 103 which is transparent with respect to a UV ray is formed on a substrate 101 which is transparent with respect to the UV ray. The substrate 101 is covered with an insulating light shielding film 105 except for an opening through which light is allowed to pass so that light is shielded. An insulating film 107 is formed on the surfaces of the transparent electrode 103 and the light shielding film 105.

Insulating supporters 109 are disposed on the two sides of an opening formed in the substrate 101. A light shielding plate 111 which is a flexible thin film is disposed at the top ends of the supporters 109. The light shielding plate 111 is formed into a cantilever structure and made of a conductive material which absorbs or reflects UV rays. The cantilever and conductive light shielding plate 111 may be formed by a single thin film or a plurality of thin films.

Specifically, a single structure in the form of a thin metal film made of aluminum or chrome which reflects UV rays or a semiconductor, such as polysilicon which absorbs UV rays, a structure formed by evaporating a metal material on an insulating film made of a silicon oxide or a silicon nitride or a thin semiconductor film such as polysilicon or a composite structure formed by evaporating a filter, such as a dielectric multilayer film. The shape of the light shielding plate 111 corresponds to the shape of the opening. The light shielding plate 111 is somewhat larger than the opening.

The exposing device 115 having a light modulator unit 113 structured as described above is disposed on the flat light source unit 81. When no voltage is applied between the conductive light shielding plate 111 and the transparent electrode 103, the light shielding plate 111 opposes the opening. Thus, a UV ray allowed to pass through the opening is absorbed or reflected by the light shielding plate 111 (in a left-hand state in FIG. 21).

When voltage is applied between the light shielding plate 111 and the transparent electrode 103, electrostatic stress acting between the two elements inclines the light shielding plate 111 toward the transparent electrode 103 while the light shielding plate 111 is being twisted (in a right-hand state in FIG. 21). That is, shielding by the light shielding plate 111 is not performed. As a result, the UV ray allowed to pass through the opening is able to travel forwards. When the applied voltage is again made to be zero, elasticity of the cantilever structure causes the light shielding plate 111 to be restored to the original position.

When the voltage is changed, the degree of inclination of the light shielding plate 111, that is, the amount of light transmission can continuously be changed. By using the above-mentioned fact, the gradient can be controlled by changing the applied voltage.

As described above, the above-mentioned exposing device 115 has the structure that the light shielding plate 111 can be deflected to change the path for UV rays. As a result, UV rays can be modulated.

An exposing device according to a sixth embodiment of the present invention will now be described.

Figure 22:
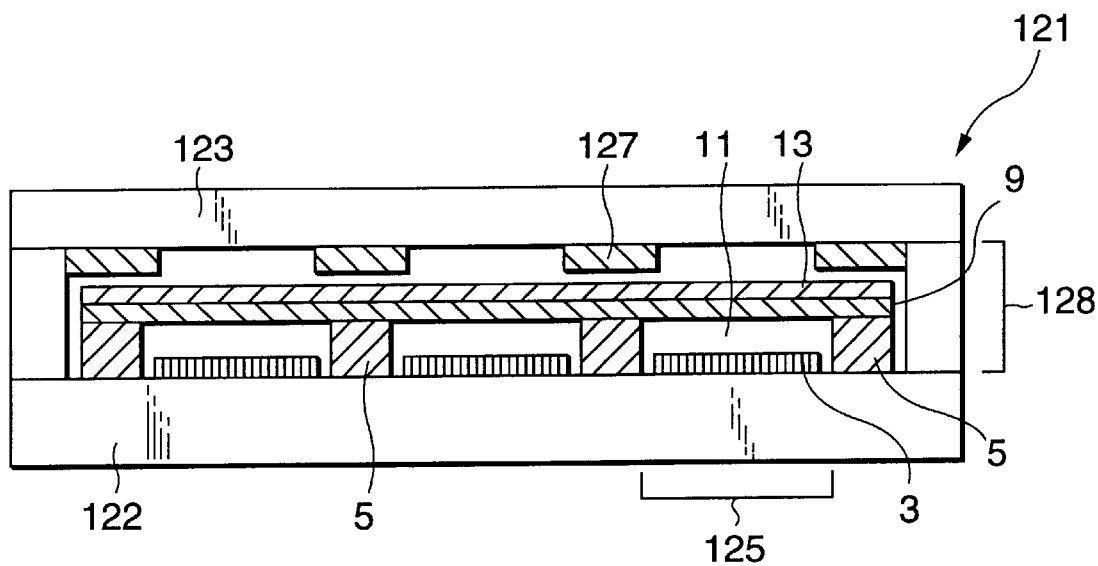
FIG. 22 is a cross sectional view showing an exposing device according to a sixth embodiment of the present invention.
Figure 23:
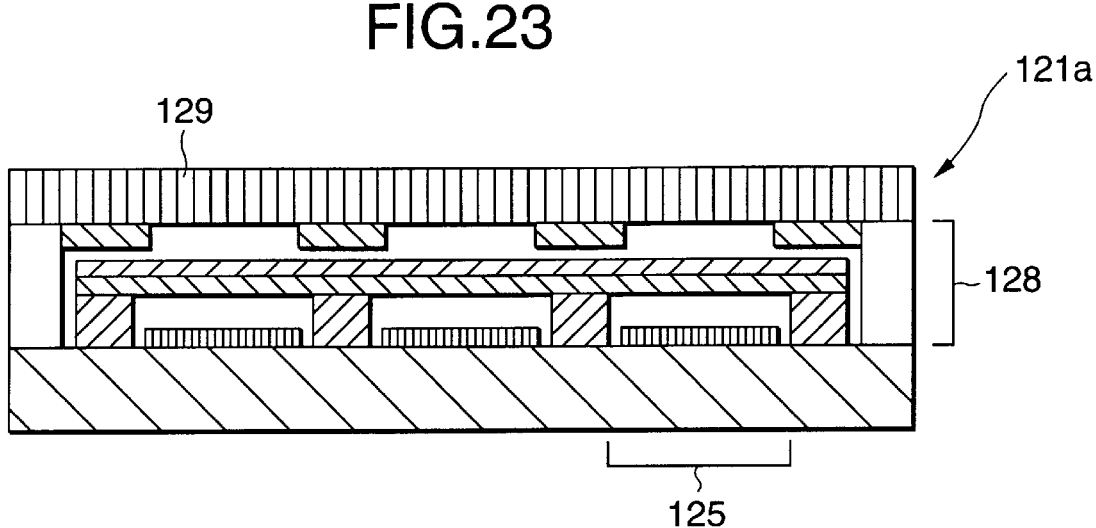
FIG. 23 is a cross sectional view showing a first modification of the sixth embodiment.
Figure 24:
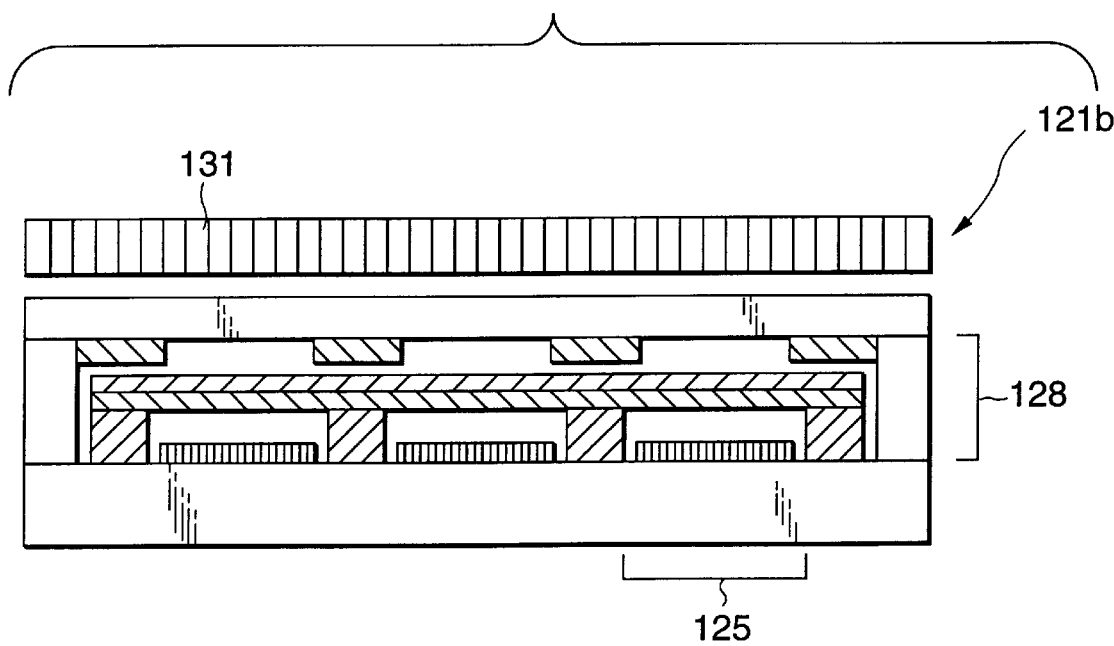
FIG. 24 is a cross sectional view showing a second modification of the sixth embodiment.

FIG. 22 is a cross sectional view showing an exposing device according to the sixth embodiment. FIG. 23 is a cross sectional view showing a first modification of the sixth embodiment. FIG. 24 is a cross sectional view showing a second modification of the sixth embodiment.

The exposing device 121 according to this embodiment is, as shown in FIG. 22, provided with a plurality of signal electrodes 3 disposed on the surface of a transparent substrate 122 adjacent to the UV source. Supporters 5 are disposed between adjacent signal electrodes 3. A flexible thin film 9 is bridged between upper surfaces of the supporters 5. Gaps 11 are formed between the signal electrodes 3 and the flexible thin film 9. Scan electrodes 13 are formed on the surface of the flexible thin film 9. A front transparent substrate 123 is formed on the front surface of the emission side of each of the scan electrodes 13.

A black mask 127 is formed in a boundary between adjacent pixels 125 on a surface of the filter 123 opposing the scan electrodes 13. The black mask 127 shields light leakage from the boundary of the pixels to raise the contrast effect. The exposing device 121 has a light modulator unit 128 composed of the signal electrodes 3, the gaps 11, the flexible thin film 9, the scan electrodes 13 and the black mask 127.

Since the exposing device 121 incorporates the transparent substrate 123 on the front surface thereof, an UV ray image obtained by the light modulator unit 128 of the exposing device 121 can be projected and exposed to a sensitive material by a projecting lens.

The exposing device may be provided with a fiber face plate 129 as shown in FIG. 23 in place of the front transparent substrate 123.

An exposing device 121a having the above-mentioned structure is able to perform contact exposure with a sensitive material in addition to the above-mentioned exposure.

The exposing device may be provided with a distributed refractive index lens (for example, "SELFOC lens" which is trade name). The SELFOC lens 131 serves as a lens because its refractive index is continuously changed.

An exposing device 121b of the foregoing type is able to perform exposure such that the distance from the sensitive material is sufficiently shortened in addition to the above-mentioned exposure.

An exposing device according to a seventh embodiment of the present invention will now be described.

Figure 25:
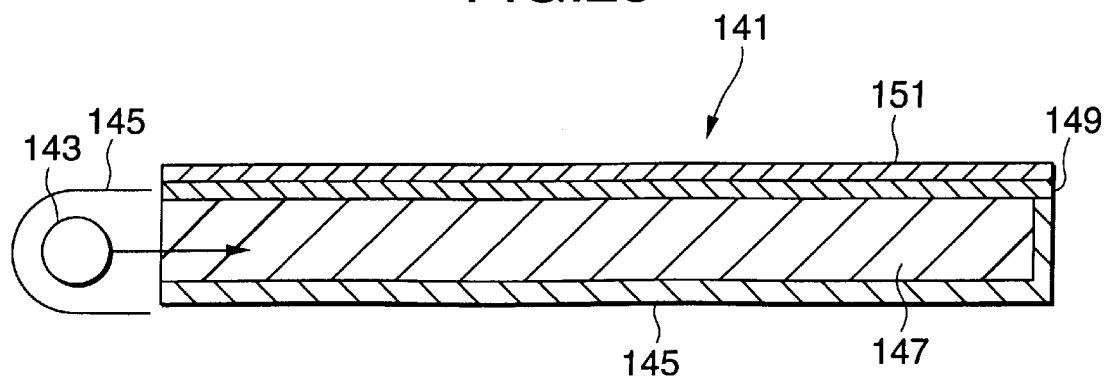
FIG. 25 is a cross sectional view showing a flat light source for use in an exposing device according to a seventh embodiment of the present invention.
Figure 26:
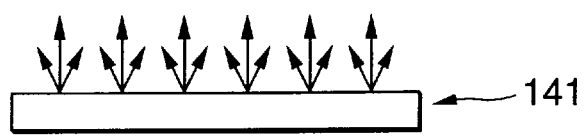
FIG. 26 is a diagram showing light emitted from the flat light source shown in FIG. 25.
Figure 27:
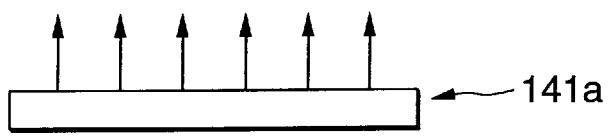
FIG. 27 is a cross sectional view showing a first modification of the seventh embodiment.
Figure 28:
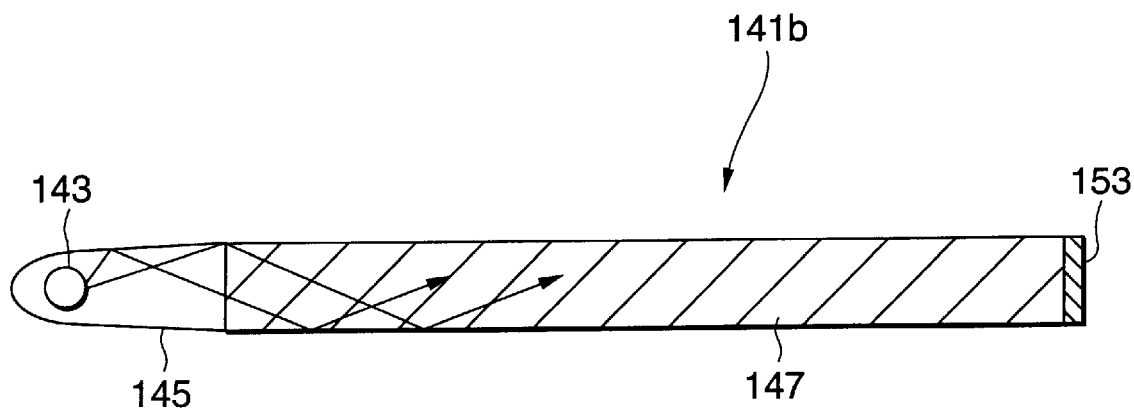
FIG. 28 is a cross sectional view showing a second modification of the seventh embodiment.

FIG. 25 is a cross sectional view showing a flat light source for use in the exposing device according to the seventh embodiment. FIG. 26 is a diagram showing light emitted from the flat light source shown in FIG. 25. FIG. 27 is a cross sectional view showing a first modification of the seventh embodiment. FIG. 28 is a cross sectional view showing a second modification of the seventh embodiment.

A flat light source unit for the exposing device may be formed into any one of a variety of structures.

As shown in FIG. 25, a flat light source unit 141 may be composed of a UV ray lamp (a low-pressure mercury lamp) 143, a UV ray reflecting plate 145, a light conducting plate 147, a diffusing plate 149 and a light collecting plate 151.

The low-pressure mercury lamp 143 is disposed adjacent to an end of the light conducting plate 147. A UV ray emitted from the low-pressure mercury lamp 143 is made incident on the end of the light conducting plate 147 by the UV-ray reflecting plate 145. The diffusing plate 149 is disposed on the surface of the light conducting plate 147. Moreover, the light collecting plate 151 is disposed on the surface of the diffusing plate 149. A UV ray made incident on the end of the light conducting plate 147 is allowed to pass through the diffusing plate 149 and the light collecting plate 151, and then emitted.

The above-mentioned flat light source unit 141 is able to emit diffused light having directivity in a direction of a normal line of the plane, as shown in FIG. 26. The flat light source unit 141 may be suitably employed in the exposing devices 91 and 115 according to the fourth embodiment and the fifth embodiment, respectively.

The flat light source unit may be a collimated light source which emits to light in a direction substantially perpendicular to the light emitting surface, as shown in FIG. 27. Collimated light can be emitted by a well-known technique. When the shape of the UV ray reflecting plate 145 disposed around the lamp, the structure of the UV ray reflecting plate 145 disposed on the rear of the light conducting plate and the structure of the light collecting plate 151 are devised, collimated light can be emitted.

A flat light source unit 141a for emitting collimated light is able to convert light emitted from the light conducting plate 147 into parallel beams to give directivity. The flat light source unit 141a may be suitably employed in the exposing devices 91 and 115 according to the fourth embodiment and the fifth embodiment, respectively.

As shown in FIG. 28, the flat light source unit may be structured such that the UV-ray reflecting plate 145 around the lamp is inclined in order to make the optical path in the light conducting plate 147 to be higher than the critical angle for the total reflection so as to make incident a UV ray on the inside portion of the light conducting plate 147.

In the flat light source unit 141b, incident UV rays travel to an end while the UV rays are totally reflected by the light conducting plate 147. Then, UV rays are reflected by a reflecting plate 153. Then, UV rays are returned to the low-pressure mercury lamp 143 while UV rays are being totally reflected.

The flat light source unit 141b enables a flat light source having no directivity to be obtained. The flat light source unit 141b may be employed in the exposing device 61 according to the third embodiment.

The flat light source unit may incorporate a light emitting device for emitting UV rays, for example, a dispersion-type inorganic EL (Electroluminescence), a thin film type inorganic EL, a low-molecule type organic EL, a high-molecule type organic EL, an inorganic semiconductor LED (Light Emitting Diode) or a FED (which causes a fluorescent member for emitting UV rays to emit light by discharged electrons).

When the light modulator unit are provided for the light emitting surfaces of the light emitting devices, light emitted from the light emitting device can directly be introduced into the light modulator unit.

The flat light source unit incorporating the light emitting devices enables uniform light emitting intensity to be realized with a compact structure. In particular, the required voltage can be lowered in a case of the organic EL and the inorganic LED. Moreover, the lifetime of the light source incorporating the inorganic LED can significantly be elongated. Also the lifetime of each the thin film inorganic EL, the organic EL and the FED can be elongated.

An exposing devices according to an eighth embodiment of the present invention will now be described.

Figure 29:
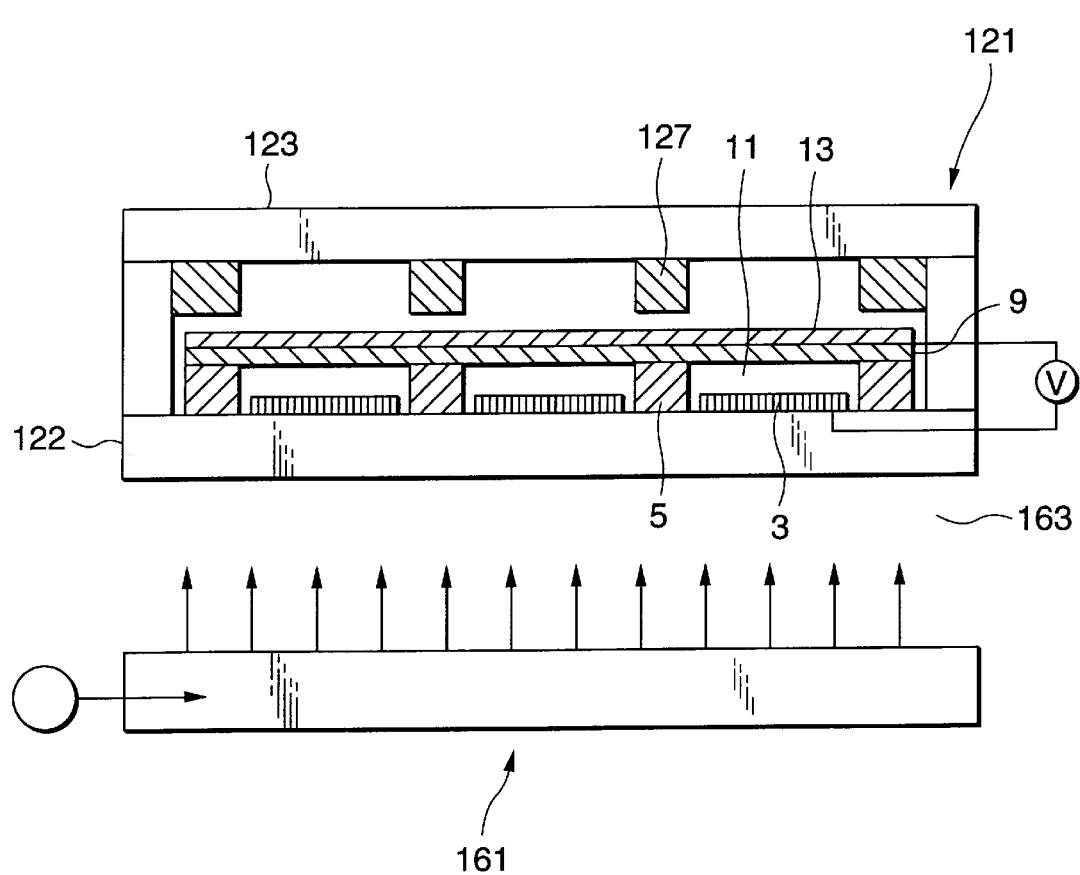
FIG. 29 is a cross sectional view showing an exposing device according to an eighth embodiment of the present invention.

FIG. 29 is a cross sectional view showing the exposing device according to the eighth embodiment.

The exposing device according to this embodiment has a structure which is substantially similar to the exposing device 121 according to the sixth embodiment shown in FIG. 22. Therefore, the same elements are given the same reference numerals and the same elements are omitted from description. As shown in FIG. 29, the exposing device 121 has a gap 163 from a black light unit 161 so that the exposing device 121 is separated from the black light unit 161.

Transparent substrates 122 and 123 are substrates which permit transmission of at least UV rays. If the wavelength of the UV ray is 365 nm, it is preferable that the transparent substrate 122 and 123 are made of glass, acrylic resin or the like. When the wavelength of the UV ray is 245 nm, it is preferable that the transparent substrates 122 and 123 are made of molten quartz.

The exposing device 121 has the structure that the gap 163 is formed between the transparent substrate 122 and the backlight unit 161 so that the light modulator unit and the light emitting portion are separated from each other. Therefore, the transparent substrate 122 and the backlight unit 161 can individually be manufactured. As compared with the exposing device 19 according to the first embodiment and having a structure that the signal electrodes 3 are directly provided for the light guide plate 1, appropriate materials can be employed to manufacture the transparent substrate 122 and the light guide plate for the backlight unit, respectively. As a result, freedom to select materials can be improved.

A flat display unit according to a ninth embodiment of the present invention will now be described with reference to the drawings.

Figure 30:
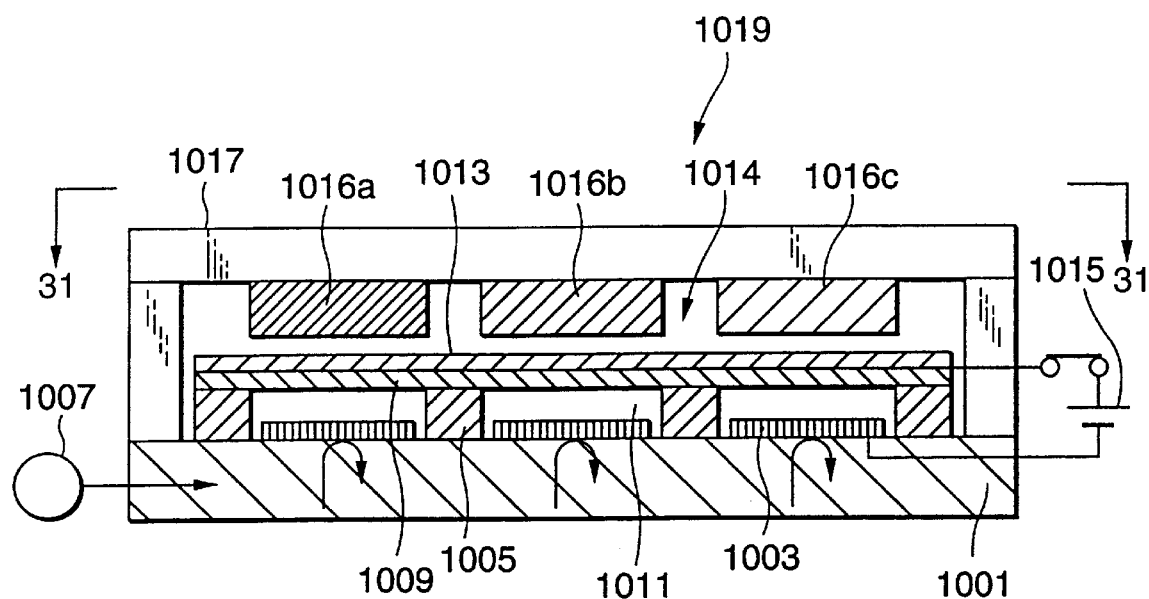
FIG. 30 is a cross sectional view showing a flat display unit according to a ninth embodiment of the present invention.
Figure 31:
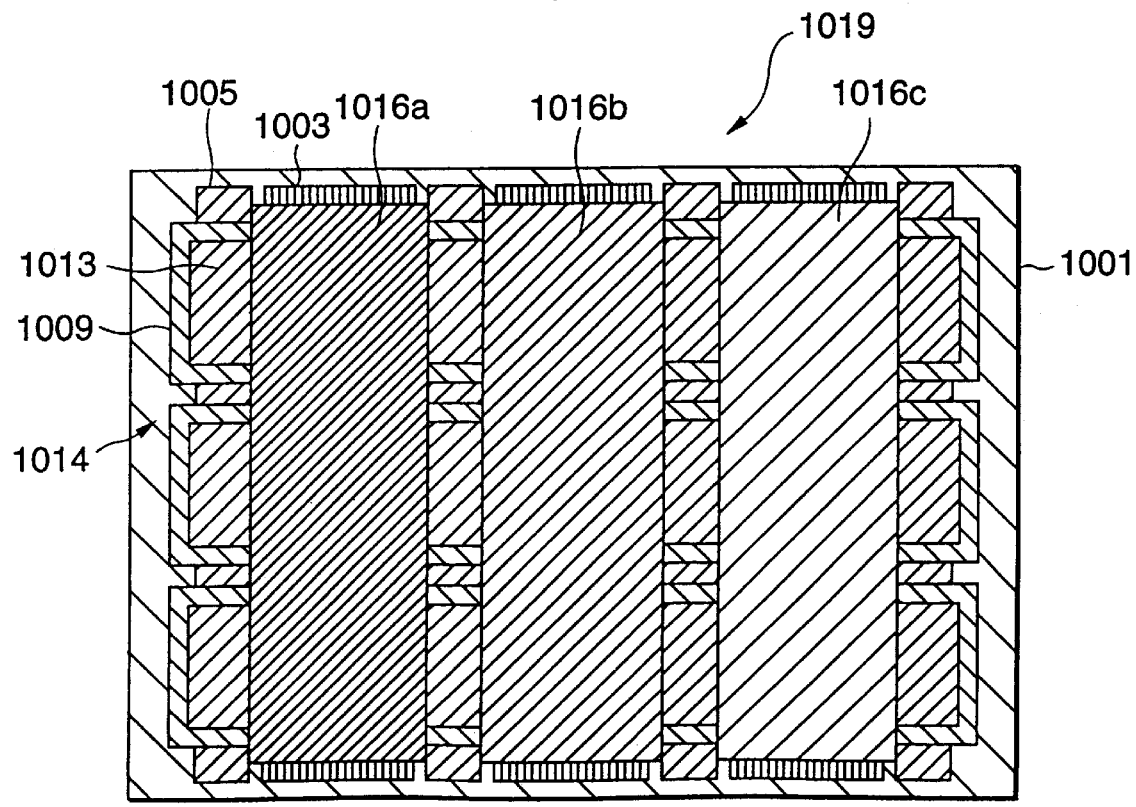
FIG. 31 is a cross sectional view taken along line A—A shown in FIG. 31.

FIG. 30 is a cross sectional view showing the flat display unit according to the ninth embodiment of the present invention. FIG. 31 is a cross sectional view taken along line A—A shown in FIG. 30.

A plurality of parallel and transparent electrodes (signal electrodes) 1003 formed into elongated shapes are formed on a light guide plate 1001 such that the signal electrodes 1003 are positioned apart from one another. Supporters 1005 for separating the adjacent signal electrodes 1003 are formed on the light guide plate 1001. The supporters 1005 can be formed by, for example, etching a material which is the same as that for forming the light guide plate 1001. An ultraviolet-ray lamp (a low-pressure mercury lamp) 1007 serving as a light source is disposed on the side of the light guide plate 1001. A light beam emitted from the UV ray lamp 1 is transmitted to the surface (the upper surface in FIG. 30) of the light guide plate 1001.

A transparent flexible thin film 1009 is formed on the upper surface of the supporters 1005 at a position apart from the signal electrodes 1003. Therefore, gaps 11 are formed between the signal electrodes 1003 and the flexible thin film 1009. A plurality of other electrodes (scan electrodes) 1013 formed into transparent and elongated shapes are formed on the upper surface of the flexible thin film 1009 in a direction perpendicular to the signal electrodes 1003. The plural scan electrodes 1013 are formed in parallel with one another and apart from one another. That is, the signal electrodes 1003 and the scan electrodes 1013 are arranged in perpendicular directions so that a lattice configuration is formed, as shown in FIG. 31. When the signal electrodes 1003 and the scan electrodes 1013 having predetermined structures are selected, matrix electrodes are realized with which a specific opposing electrode portion can be instructed. The light guide plate 1001 the signal electrodes 1003, the flexible thin film 1009 and the scan electrodes 1013 constitute a light modulator unit 1014.

A power source 1015 is connected to the signal electrodes 1003 and the scan electrodes 1013. The power source 1015 is able to selectively apply a voltage to a predetermined electrode in accordance with image information.

Elongated fluorescent members 1016a, 1016b and 1016c in three primary colors (R, G, B) are disposed above the scan electrodes 1013 to be opposite to the signal electrodes 1003. A black matrix (not shown) for raising the contrast ratio of the fluorescent members may be disposed among the fluorescent members 1016a, 1016b and 1016c.

A transparent front plate 1017 is disposed above the fluorescent members 1016a, 1016b and 1016c. The front plate 1017 may be a color filter in a color which is the same as the color of the emitted fluorescence.

A flat display unit 1019 structured as described above incorporates the light guide plate 1001 which is constituted by a resin film made of polyethylene terephthalate or polycarbonate as well as transparent glass.

The signal electrodes 1003 and the scan electrodes 1013 are made of transparent and conductive materials. It is preferable that the signal electrodes 1003 adjacent to the light guide plate 1001 are made of a material which permits transmission of an exciting UV ray or which has such an optical characteristic. It is preferable that the scan electrodes 1013 adjacent to the fluorescent members 1016a, 1016b and 1016c is made of a material which permits transmission of the exciting UV ray. More effectively, the scan electrodes 1013 are made of a material which reflects the wavelength of the emitted fluorescence or which has such an optical characteristic.

In general, the transparent electrodes are made of a metal material made to be transparent by a particulating process or a metal compound having conductivity. The metal material may be gold, silver, palladium, zinc or aluminum. The metal compound may be indium oxide, zinc oxide or aluminum-added zinc oxide (popularly called "AZO"). Specifically, a $SnO_2$ film (a Nesa film) or an ITO film may be employed.

The signal electrodes 1003 and the scan electrodes 1013 can be formed by laminating a thin film of the abovementioned conductive material on the surface of the light guide plate 1001 or the flexible thin film 1009 by a sputtering method or a vacuum evaporation method. Then, the surface of the thin film is coated with resist, and then exposure and development are conducted. The exposure is performed such that a photomask is disposed on the photoresist. Then, a UV ray is applied from a position above the photomask. The development is conducted by using development solution which is able to remove a soluble portion of the photoresist.

Figure 32:
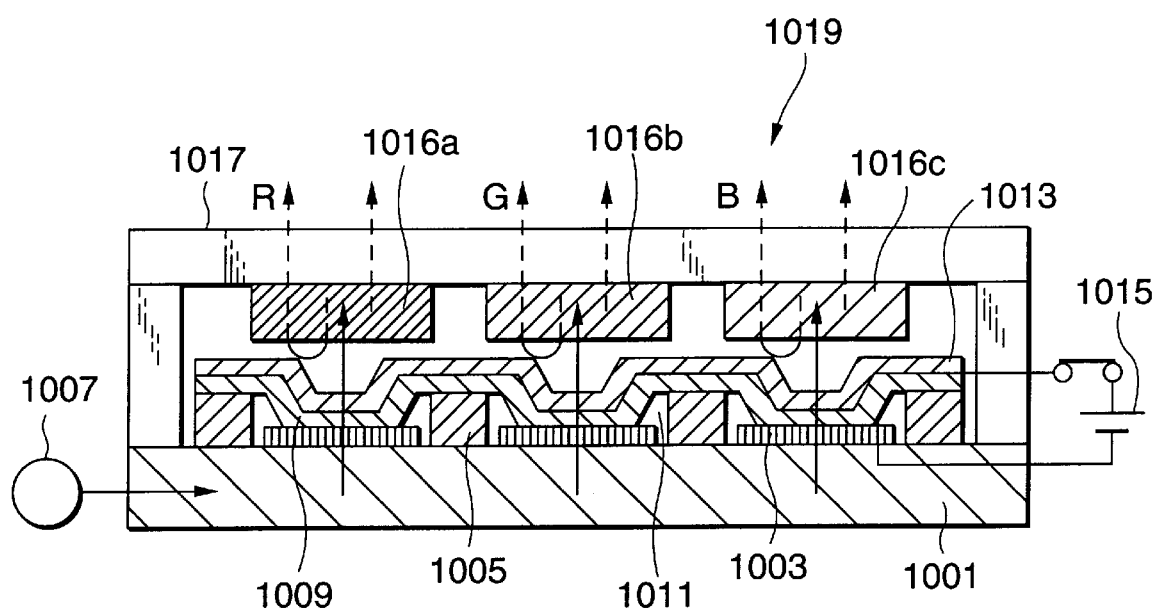
FIG. 32 is a cross sectional view showing a state in which the flat display unit shown in FIG. 31 is being operated.

FIG. 32 is a cross sectional view showing a state in which the flat display unit according to the present invention is being operated.

When a voltage is applied between the signal electrodes 1003 and the scan electrodes 1013 by the power source 1015, Coulomb force generated in the flat display unit 1019 attracts the flexible thin film 1009 so that the flexible thin film 1009 is deflected toward the gaps 1011. As a result, a light beam allowed to pass through the flexible thin film 1009 from the light guide plate 1001 and emitted as described above is modulated. Therefore, when the voltage of the power source 1015 is selectively applied to the signal electrodes 1003 and the scan electrodes 1013 in accordance with image information, required control of the exposure can be performed. The light beam, with the exposure being controlled, excites the fluorescent members 1016*a*, 1016*b* and 1016*c* so that an image is formed.

As described above, the flat display unit 1019 has the structure that a light beam transmitted from the light guide plate 1001 is allowed to pass through only the pair of the transparent electrodes interposing the gaps 1011. Thus, the fluorescent members 1016*a*, 1016*b* and 1016*c* are excited. As a result, the efficiency of using light can be improved. Moreover, the angle of the field of view can be enlarged as compared with a liquid crystal display unit which permits transmission of light by dint of excitation of liquid crystal molecules.

Since a light beam transmitted from the light guide plate 1001 is modulated by dint of the electro-mechanical operation of the flexible thin film 1009, the quality of an image does not depend on the regular arrangement of the multiple electrodes. As a result, an image having a high quality can easily be obtained. Moreover, the necessity of forming insulation wall for the plasma display unit for the purpose of generating plasma for each pixel and realizing high vacuum can be eliminated. Therefore, weight reduction and enlargement of the area can easily be performed. Thus, the manufacturing cost can be reduced.

The light guide plate 1001, the signal electrodes 1003 and the supporters 1005 can be formed into an array structure by etching. Thus, the manufacturing cost can be reduced.

Since the flexible thin film 1009 can preform electromechanical operation using the Coulomb force, the voltage required to operate the unit can be lowered as compared with the plasma display unit which generates plasma and the FED which accelerates emitted electrons and applies the same to the fluorescent members.

The light modulator unit 1014 of the flat display unit 1019 may be formed integrally such that the light guide plate 1001 is used as a substrate or the same may be formed individually.

The light modulator unit 1014 of the flat display unit 1019 may be structured such that the overall body is sealed by enclosing a rare gas after a deaeration operation so as to prevent an influence of disturbance so that a stable structure is formed.

A flat display unit according to a tenth embodiment of the present invention will now be described.

Figure 33:
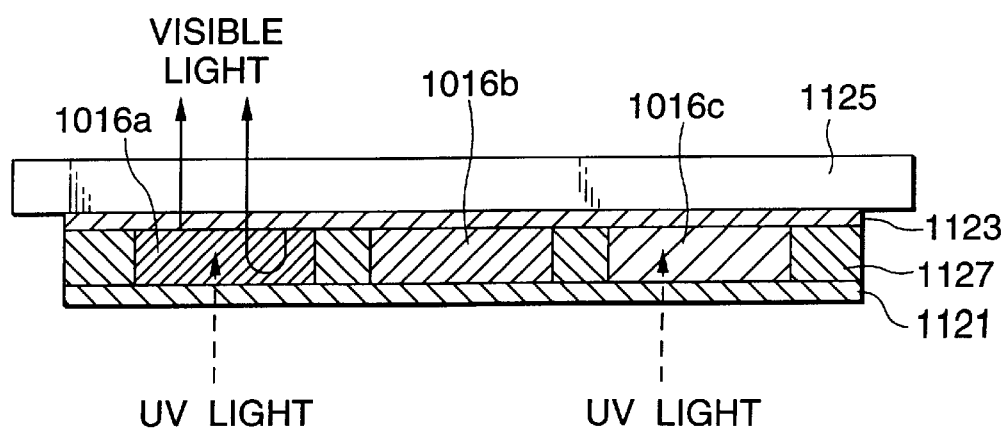
FIG. 33 is a cross sectional view showing a filter section for use in a flat display unit according to a tenth embodiment of the present invention.

FIG. 33 is a cross sectional view showing a filter portion for use in the flat display unit according to the tenth embodiment.

The flat display unit may be provided with a variety of filters. For example, a film (a filter) 1121 is provided between the light modulator unit and fluorescent members 1016*a*, 1016*b* and 1016*c*. The filter 1121 is in the form of a film which permits transmission of UV rays and reflects visible rays. Specifically, the film may be an interference film (a dielectric multilayer film or a metal dielectric multilayer film) which reflects UV rays, a film made of a single material (α-alumina or β-alumina) or a composite film of the foregoing materials. Reference numeral 1127 in the drawing represents a black matrix formed in the boundaries among the adjacent fluorescent members 1016*a*, 1016*b* and 1016*c*.

In the flat display unit incorporating the filter 1121, the fluorescent members 1016*a*, 1016*b* and 1016*c* are irradiated with UV rays. On the other hand, visible rays are scattered and caused to emit light. Light rays of the visible rays scattered toward the light modulator unit is reflected by the filter 1121 toward the surface so that a high displaying efficiency is realized.

A film (a filter) 1123 is formed on the surfaces of the fluorescent members 1016*a*, 1016*b* and 1016*c*. The filter 1123 is in the form of a film which reflects or absorbs UV rays and permits transmission of visible rays. Specifically, the filter may be a sharp cut filter which absorbs UV rays or an interference film (a dielectric multilayer film or a metal dielectric multilayer film) which reflects UV rays.

The flat display unit incorporating the filter 1123 is able to prevent emission of harmful UV rays over the display surface. In addition, the UV rays reflected by the filter 1121 can be reflected again and thereby the UV rays are reused for the excitation of the fluorescent members so that a high displaying efficiency is realized.

The positions of the filters 1121 and 1123 are not limited to the above-mentioned positions. For example, the filter 1121 may be disposed in the light modulator unit. The filter 1123 may be disposed adjacent to the surface of the front transparent substrate 1125 which is transparent with respect to visible rays.

A flat display unit according to an eleventh embodiment of the present invention will now be described.

Figure 34:
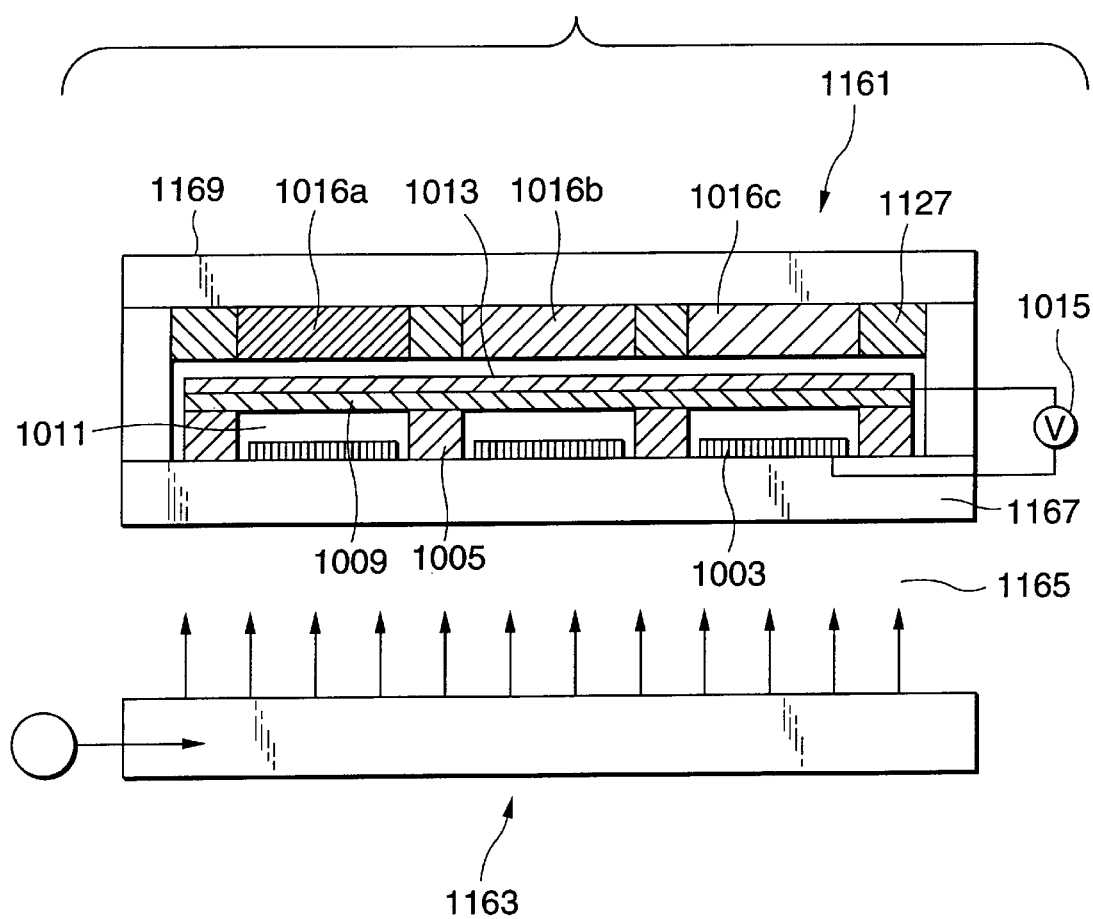
FIG. 34 is a cross sectional view showing a flat display unit according to an eleventh embodiment of the present invention.

FIG. 34 is a cross sectional view showing the flat display unit according to the eleventh embodiment.

The flat display unit according to this embodiment has a structure which is substantially similar to the flat display unit 1019 according to the ninth embodiment shown in FIG. 30. Therefore, the same elements are given the same reference numerals and the same elements are omitted from description. In the drawing, reference numeral 1127 represents a black matrix formed in the boundaries among adjacent fluorescent members 1016*a*, 1016*b* and 1016*c*. The flat display unit 1161 has a gap 1165 from the backlight unit 1163 so that the separate configuration is employed.

A substrate 1167 in the light modulator unit must be a substrate which permits transmission of at least UV rays. If the wavelength of the UV ray is 365 nm, it is preferable that the substrate 1167 is made of glass, acrylic resin or the like. When the wavelength of the UV ray is 245 nm, it is preferable that the substrate 1167 is made of molten quartz. It is preferable that a substrate 1169 adjacent to the front fluorescent member is a substrate (made of usual glass) which permits transmission of visible rays.

The flat display unit 1161 has the structure that the gap 1165 is formed between the substrate 1167 and the backlight unit 1163 so that the light modulator unit and the light emitting portion are separated from each other. Therefore, the substrate 1167 and the backlight unit 1163 can individually be manufactured. As compared with the flat display unit 1019 according to the ninth embodiment and having a structure that the signal electrodes 1003 are directly provided for the light guide plate 1001, appropriate materials can be employed to manufacture the substrate 1167 and the light conducting plate for the backlight unit, respectively. As a result, freedom to select materials can be improved.

Combining the above structure incorporating the fluorescent members with each of the light modulator units described in the second to fifth, and seventh embodiments, it is possible to realize flat displays utilizing features of the respective light modulator units.

An array-type exposing device according to a twelfth embodiment of the present invention will now be described.

Figure 35:
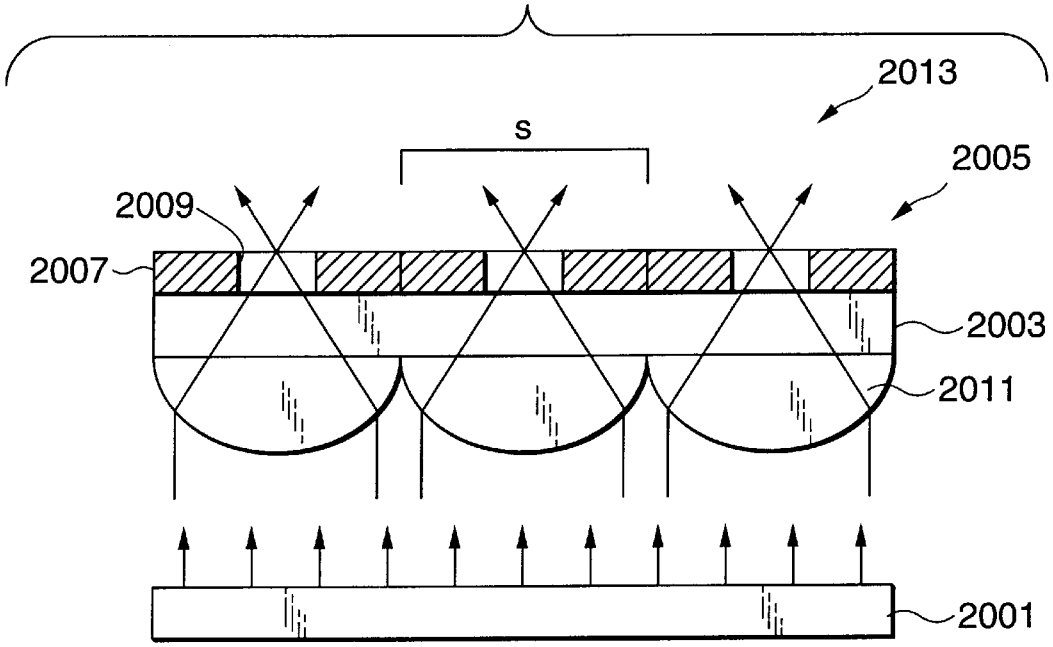
FIG. 35 is a cross sectional view showing an array-type exposing device according to a twelfth embodiment of the present invention.

FIG. 35 is a cross sectional view showing the array-type exposing device according to the twelfth embodiment.

A transparent substrate 2003 which is transparent with respect to a UV ray is disposed adjacent to the emission side of a flat light source 2001 which emits UV rays, the transparent substrate 2003 being distant from the flat light source 2001 for a predetermined distance and in parallel with the flat light source 2001. The flat light source 2001 comprises a UV ray lamp (not shown) disposed on the side surface of a light guide plate (not shown). In the flat light source 2001, light emitted from the ultraviolet-ray lamp is guided upwards in FIG. 35 and emitted.

A light modulator unit 2005 is formed on the surface of the transparent substrate 2003 opposite to the flat light source 2001. The light modulator unit 2005 is disposed one-dimensionally or two-dimensionally. The light modulator unit 2005 has a non-opened portion 2007. The non-opened portion 2007 is divided into regions S each having an area corresponding to one pixel.

Each non-opened portion 2007 has an opening 2009 having an area which is smaller than that of one pixel. In this embodiment, the openings 2009 are formed in the central portion of the each non-opened portion 2007. The non-opened portion 2007 shields light allowed to pass through the transparent substrate 2003. Therefore, light emitted from the flat light source 2001 is allowed to pass through only the openings 2009, and then emitted from the light modulator unit 2005.

Microlenses 2011 as a light converging member are so formed on the surface of the transparent substrate 2003 adjacent to the flat light source 2001 as to correspond to the non-opened portions 2007, that is, to pixels. The microlenses 2011 according to this embodiment are formed into convex shapes facing the flat light source 2001. The microlenses 2011 converge light made incident from the flat light source 2001 to the openings 2009 of the light modulator unit 2005.

The microlenses 2011 may be lenses which use refraction of a transparent member at an end surface of refraction, lenses which use refraction of continuously distributed refractive indexes on the inside (distributed refractive index lenses) or lenses (grating lenses) which uses diffraction of light occurring by dint of a periodical structure.

Moreover, the microlenses 2011 may be a one-dimensional lens array constituted by one-dimensionally arranging a plurality of distributed refractive index lenses in the form of semi-spheres at the same intervals or a flat micro-lenses constituted by arranging the same two-dimensionally at the same intervals.

The flat micro-lens is a device from which a function as a lens can be obtained by realizing distribution of refractive indexes in the vicinity of the surface of a glass plate. A film made of a metal material or the like is deposited on the surface of a multi-component glass. Then, circular openings are formed by lithography so that a mask is obtained. Then, ion exchange is performed to raise the refractive indexes of semi-spherical regions below the circular openings. Thus, an action of the lens can be realized for light perpendicularly made incident on the substrate. The foregoing lens has an advantage in that a one-dimensional or two-dimensional lens array can easily be mass-produced.

In the array-type exposing device 2013 structured as described above, light emitted from the flat light source 2001 is converged by the microlenses 2011 for each pixel. Light converged by the microlenses 2011 is emitted from the openings 2009 of the light modulator unit 2005.

Since the array-type exposing device 2013 has the structure that the non-opened portion 2007 corresponding to one pixel has the openings 2009 each having an area smaller than that of the nor-opened portion 2007, the numeric aperture can be reduced.

As a result, the light modulating mechanism of the light modulator unit 2005 for modulating light by a deflecting operation (an electro-mechanical operation) of the flexible thin film by dint of the electrostatic stress can be reduced. Thus, the mass of a movable member (the flexible thin film) can be reduced. As a result, the operation speed can be raised.

Since the size of the mechanism can be reduced, the position of the mechanism cannot considerably be limited. As a result, design freedom of the light modulator unit 2005 can be enhanced.

Since light is converged by the microlenses 201 1, efficient and bright exposure can be performed even if the area of the opening is very small.

Although the above-mentioned embodiment has the structure that the microlenses 2011 are integrally disposed with the light modulator unit 2005, the array-type exposing device according to the present invention may have a structure that the microlenses 2011 are disposed individually from the light modulator unit 2005. The microlenses 2011 may be provided for a position adjacent to the flat light source 2001.

Although it is preferable that parallel light beams are emitted from the flat light source 2001, the light beam may be diffused light having directivity in a direction of a normal line of the surface.

The front surface of the light modulator unit 2005 may be provided with an image forming lens or a distributed refractive index lens (for example, the SELFOC lens).

Figure 36:
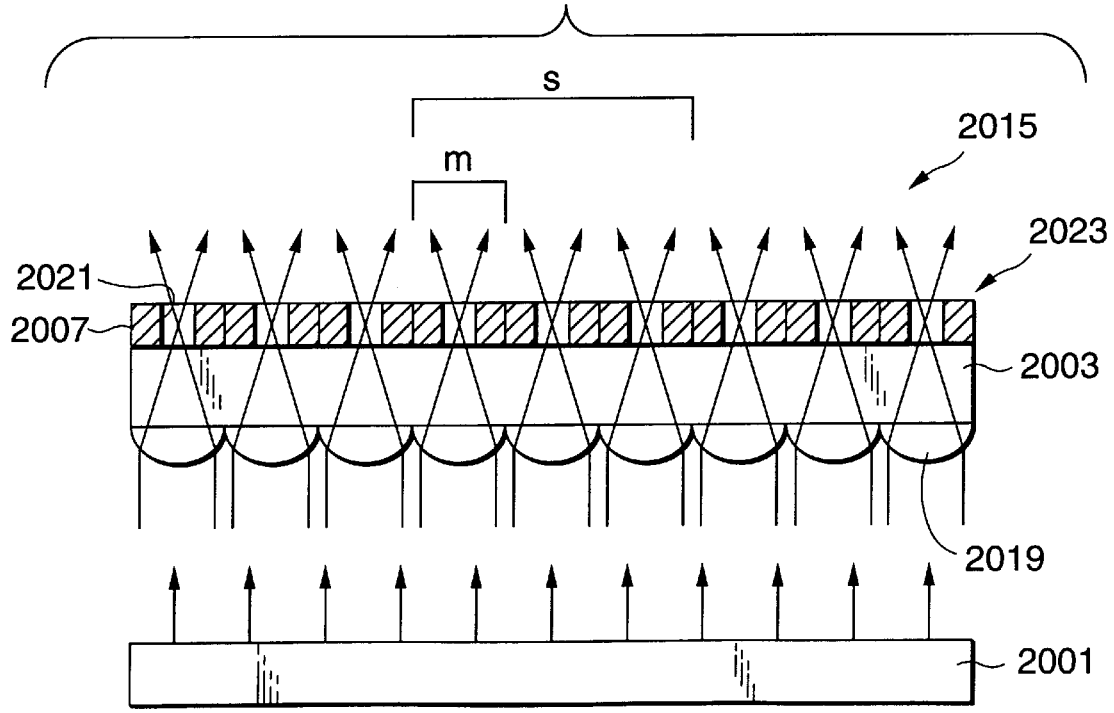
FIG. 36 is a cross sectional view showing a first modification of the twelfth embodiment.

FIG. 36 is a cross sectional view showing a first modification of the twelfth embodiment.

An array-type exposing device 2015 according to the first modification has a structure that region S having an area corresponding to one pixel is divided into a plurality of regions m. Therefore, non-opened portions 2017 and microlenses 2019 are formed to correspond to the regions m. The non-opened portions 2017 incorporate openings 2021 having areas smaller than those of the non-opened portions 2017. The other structures are the same as those of the array-type exposing device 2013 according to the twelfth embodiment.

Since the size of the light modulator unit 2023 of the array-type exposing device 2015 can furthermore be reduced, the operation speed can be raised. Since the size of the mechanism can be reduced, the design freedom of the light modulator unit 2023 can be enhanced. Since the microlenses 2019 converge light, efficient and bright exposure can be performed even if the area of the opening is very small.

Moreover, the first modification has the structure that the region S having the area corresponding to one pixel is furthermore divided into the plural regions m. Therefore, area gradient exposure can be performed with a small area obtained by dividing one pixel.

Figure 37:
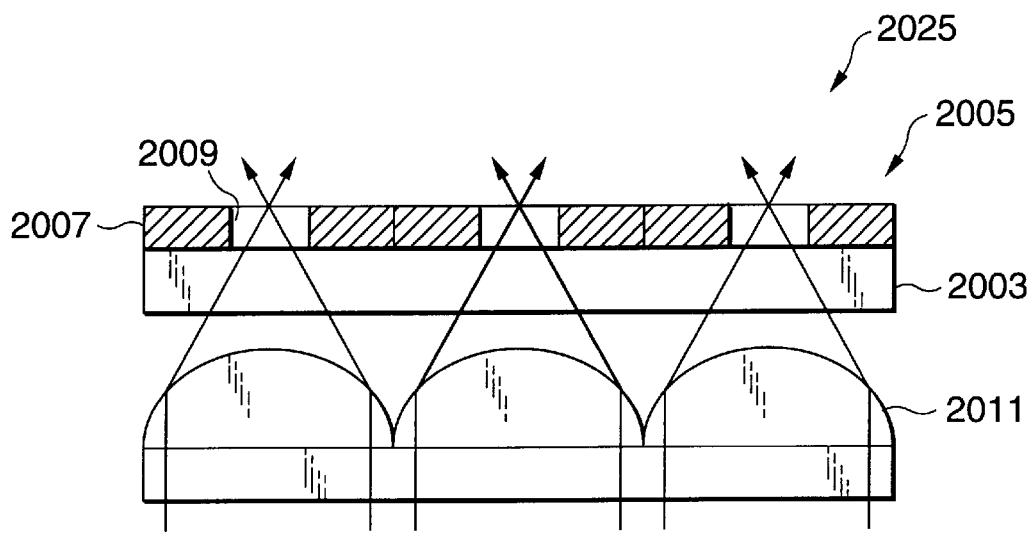
FIG. 37 is a cross sectional view showing a second modification of the twelfth embodiment.

FIG. 37 is a cross sectional view showing a second modification of the twelfth embodiment.

An array-type exposing device 2025 according to the second modification has a structure that the microlenses 2011 are disposed individually from the light modulator unit 2005. The microlenses 2011 disposed individually may be disposed on the emission surface of the flat light source. Each of the microlenses 2011 is disposed such that the optical axis coincides with the center of each of the openings 2009, similarly to the array-type exposing device 2013.

Since the array-type exposing device 25 has the structure that the light modulator unit 2005 and the microlenses 2011 are separated from each other, the transparent substrate 2003 and the microlenses 2011 can individually be manufactured. Therefore, freedom to select materials of the transparent substrate 2003 and the microlenses 2011 can be enhanced. That is, optimum materials can be selected to manufacture the transparent substrate 2003 and the microlenses 2011.

Figure 38:
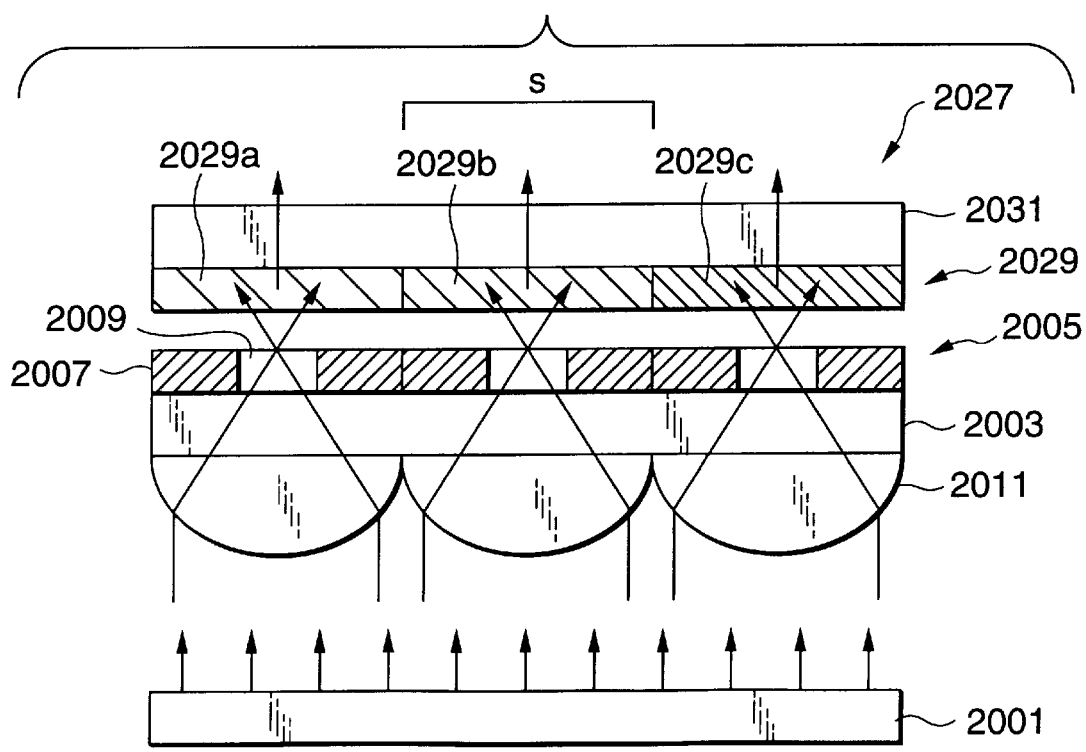
FIG. 38 is a cross sectional view showing an array-type exposing device according to a thirteenth embodiment of the present invention.

FIG. 38 is a cross sectional view showing an array-type exposing device according to a thirteenth embodiment of the present invention.

An array-type exposing device 2027 according to the thirteenth embodiment has a structure that a transparent substrate 2031 having a fluorescent member 2029 is disposed opposite to the emission side of the light modulator unit 2005 of the array-type exposing device 2013 shown in FIG. 35.

The fluorescent member 2029 has three primary color (R, G and B) portions 2029a, 2029b and 2029c which correspond to the light modulator units 2005. The transparent substrate 2031 is made of a material which is transparent with respect to the wavelength of a fluorescence emitted from the fluorescent member 2029. For example, it can be constituted by a resin film made of polyethylene terephthalate or polycarbonate, as well as a transparent glass plate.

The array-type exposing device 2027 constituted as described above has the structure that light converged by the microlenses 2011 is introduced into the openings 2009 of the light modulator unit 2005. Light introduced into the openings 2009 is exposed and controlled by the light modulator unit 2005, and then allowed to collide with the fluorescent member 2029. As a result, the array-type exposing device 2027 exposes a visible ray or an infrared ray one-dimensionally or two-dimensionally.

Therefore, the array-type exposing device 2027 is able to constitute a flat display unit which incorporates the light modulator unit 2005 which modulates light emitted from the flat light source 2001. Then, modulated light is used to cause the fluorescent member 2029 to perform a display with light.

Since the array-type exposing device 2027 has the structure that converged light is used to cause the fluorescent member 2029 to emit light, a satisfactory efficiency of using light can be obtained. The flat display unit incorporating the array-type exposing device 2027 has the structure that the fluorescent member 2029 is caused to emit light from the surface thereof. Therefore, the angle of the field of view can be enlarged as compared with a structure that light is allowed to pass through oriented liquid crystal molecules. Moreover, the necessity for the plasma display unit that an insulation wall is formed and a high vacuum is realized for the purpose of generating plasma can be eliminated. Therefore, weight reduction and enlargement of a displaying area can easily be performed.

Figure 39:
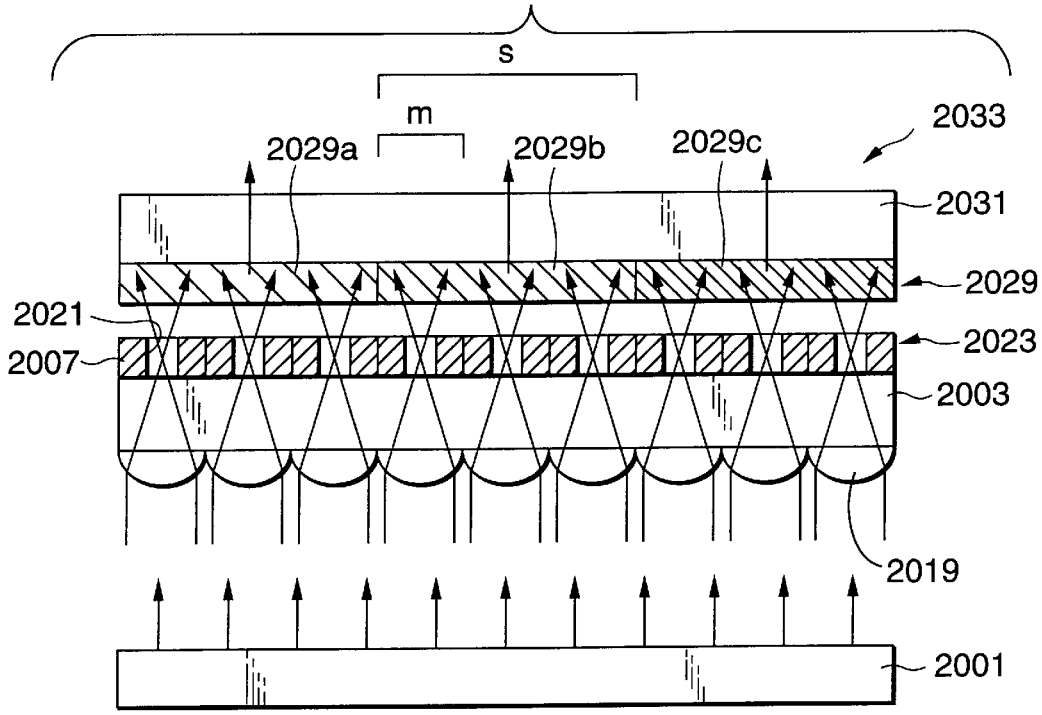
FIG. 39 is a cross sectional view showing a first modification of the thirteenth embodiment.

FIG. 39 is a cross sectional view showing a first modification of the thirteenth embodiment.

An array-type exposing device 2033 according to the first modification has a structure that a transparent substrate 2031 having a fluorescent member 2029 is added to the array-type exposing device 2015 according to the first modification of the twelfth embodiment shown in FIG. 36.

That is, the array-type exposing device 2033 has the structure that the region S having an area corresponding to one pixel is furthermore divided into a plurality of regions m. Each of fluorescent members 2029a, 2029b and 2029c provided for the transparent substrate 2031 has an area corresponding to one pixel. Therefore, the fluorescent members 2029a, 2029b and 2029c in R, G and B correspond to one pixel composed of the plural regions m.

The array-type exposing device 2033 has the structure that the light modulator units 2023 corresponding to the regions m are controlled to set the brightness of each of the fluorescent members 2029a, 2029b and 2029c corresponding to one pixel. Thus, gradient control can be performed.

Figure 40:
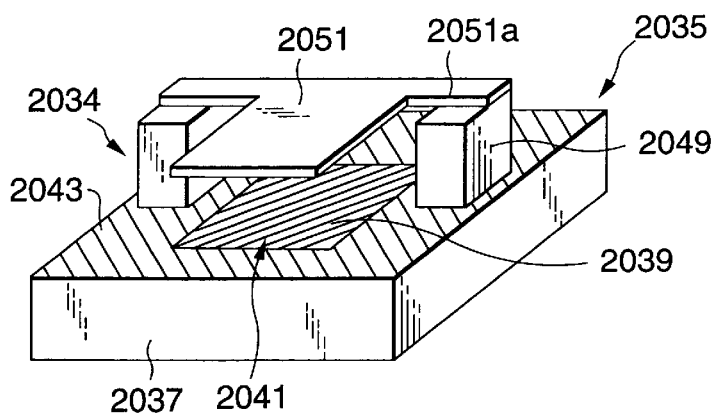
FIG. 40 is a perspective view showing an array-type exposing device according to a fourteenth embodiment of the present invention.
Figure 41:
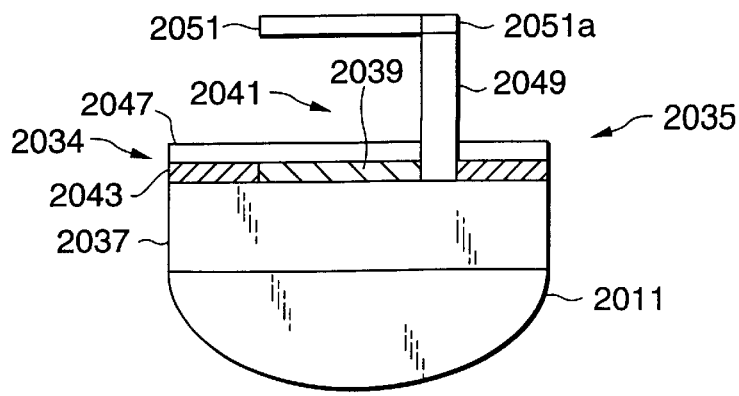
FIG. 41 is a cross sectional view showing the array-type exposing device shown in FIG. 40.

FIG. 40 is a perspective view showing an array-type exposing device according to a fourteenth embodiment of the present invention. FIG. 41 is a cross sectional view showing the array-type exposing device 2027 shown in FIG. 40. FIGS. 42 (A) and (B) are cross sectional views showing states in which the array-type exposing device shown in FIG. 40 is being operated.

A light modulator unit 2034 of an array-type exposing device 2035 according to this embodiment may be employed as the light modulator unit 2005 or 2023 of the array-type exposing devices 2013, 2015, 2025, 2027 or 2033 according to the twelfth and thirteenth embodiments.

A transparent electrode 2039 which is transparent with respect to a UV ray is disposed on a transparent substrate 2037 which is transparent with respect to a UV ray. The transparent electrode 2039 is shielded by an insulating light shielding film 2043 except for an opening 2041 through which light is allowed to pass through. Therefore, the surface of the light shielding film 2043 except for the opening 2041 is made to be a non-opened portion 2045. An insulating film 2047 is formed on the surfaces of the transparent electrode 2039 and the opening 2041.

A pair of insulating supporters 2049 are disposed on the two sides of the opening 2041. A light shielding portion (a light shielding plate) 2051 which is a flexible thin film is bridged between the two top ends of the supporters 2049. The two ends of a beam 2051a of the light shielding portion 2051 are secured to the supporters 2049. The light shielding portion 2051 projects over the side end of the beam 51 a to cover the opening 2041. That is, the light shielding portion 2051 is formed into a cantilever structure. The shape of the light shielding portion 2051 is similar to the shape of the opening 2041. The light shielding portion 2051 is somewhat larger than the opening 2041.

The light shielding portion 2051 is made of a conductive material which absorbs or reflects a UV ray. The light shielding portion 2051 may be constituted by a single thin film or a plurality of thin films. Specifically, any one of the following structures may be employed: a single structure composed of a thin metal film made of aluminum or chrome which reflects UV rays or a semiconductor, such as polysilicon which absorbs UV rays; a structure constituted by evaporating a material to an insulating film made of a silicon oxide or a silicon nitride or a thin semiconductor film made of polysilicon; or a composite structure constituted by evaporating a filter in the form of, for example, a dielectric multi-layer film.

A microlens 2011 corresponding to the opening 2041 is formed on the transparent substrate 2037 facing a flat light source (not shown).

The array-type exposing device 2035 having the light modulator unit 2034 structured as described above is disposed on a flat light source (not shown). When no voltage is applied between the conductive light shielding portion 2051 and the transparent electrode 2039, the light shielding portion 2051 is opposite to the opening 2041. Therefore, a UV ray allowed to pass through the opening 2041 is absorbed or reflected by the light shielding portion 2051, as shown in FIG. 42 (A).

When voltage is applied between the light shielding portion 2051 and the transparent electrode 2039, the electrostatic stress acting between the two elements causes the light shielding portion 2051 to be moved substantially perpendicularly with respect to the transparent substrate 2037, as shown in FIG. 42 (B). Thus, the light shielding portion 2051 is inclined toward the transparent electrode 2039 while it is being twisted. That is, the light shielding portion 2051 does not shield light. As a result, the UV ray allowed to pass through the opening 2041 is able to further forward travel. When the voltage is again made to be zero, the elasticity of the cantilever restores the light shielding portion 2051 to the original position.

In the light modulator unit 2034, the light shielding portion 2051 is deflected to change the path for the UV ray. As a result, UV rays can be modulated. When the level of the voltage is changed, the degree of inclination of the light shielding portion 2051, that is, the amount of light transmission can continuously be changed. By using the above-mentioned fact, gradient control can be performed by changing the applied voltage.

The array-type exposing device 2035 incorporating the microlens 2011 is able to converge light emitted from the flat light source. Therefore, also the light modulator unit 2034 having the non-opened portion 2045 is able to improve the efficiency of using light.

Since the size of the opening 2041 can be reduced because the microlens 2011 converges light, the size of the light shielding portion 2051 can be reduced. Therefore, a light modulator unit requiring low voltage and exhibiting a high speed response can be obtained. Since the size of the light shielding portion 2051 can be reduced, the amount of displacement occurring when the operation is performed can be reduced. As a result, fatigue of the material of the light shielding portion 2051 can be prevented. Thus, the durability and reliability of the light modulator unit can be improved.

FIG. 43 is a cross sectional view showing a first modification of the fourteenth embodiment. FIG. 44 is a cross sectional view taken along line A—A shown in FIG. 43. FIGS. 45 (A) and (B) are plan views showing states of the operation of the array-type exposing device shown in FIG. 43. FIGS. 46 (A) and (B) are cross sectional views of FIGS. 45 (A) and (B), respectively.

A light modulator unit 2057 of an array-type exposing device 2055 according to this modification may be employed as the light modulator unit 2005 and 2023 of the array-type exposing devices 2013, 2015, 2025, 2027 and 2033 according to the twelfth and thirteenth embodiments.

A pair of parallel supporters 2061 are disposed on a substrate 2059 which is transparent with respect to UV rays. Two pairs of opposite electrodes 2063 and 2065 having a length which is substantially half of the distance between the supporters 2061 are arranged in the direction of the right and left supporters 2061. A light insulating film 2067 covering the substrate 2059 is formed between the opposite electrodes 2065. That is, the portion of the substrate 2059 on which the light insulating film 2067 has been formed is a non-opened portion 2069. A portion in which the light insulating film 2067 is not formed is an opened portion 2071. Therefore, light allowed to pass through the substrate 2059 is emitted from only the opened portion 2071 between the opposite electrodes 2063.

A light shielding portion (an electrode light shielding plate) 2073 having a length which is substantially half the distance between the supporters 2061 is formed in the opposite space between the two pairs of the opposite electrodes 2063 and 2065. The electrode light shielding plate 2073 has two sides which are supported by the right and left supporters 2061 through a flexible member (for example, a folded spring) 2075. When the folded spring 2075 is elastically deformed, the electrode light shielding plate 2073 is moved in parallel to either of the right or left opposite electrodes 2063 and 2065.

A microlens 2011 corresponding to the opened portion 2071 is formed on the surface of the substrate 2059 adjacent to the flat light source.

The array-type exposing device 2055 having the above-mentioned light modulator unit 2057 is disposed on a flat light source (not shown). When no voltage is applied to the electrode light shielding plate 2073 and voltage is applied to only the opposite electrodes 2063 adjacent to the opened portion 2071, the electrostatic stress causes the electrode light shielding plate 2073 to be moved toward the opened portion 2071, as shown in FIGS. 45(A) and 46(A). As a result light converged by the microlens 2011 and attempted to pass through the opened portion 2071 is shielded by the electrode light shielding plate 2073.

When voltage is applied to the electrode light shielding plate 2073 and voltage is applied to only the opposite electrodes 2063 adjacent to the opened portion 2071, the electrostatic stress causes the electrode light shielding plate 2073 to be moved toward the light insulating film 2067, as shown in FIGS. 45 (B) and 46 (B). As a result, light converged by the microlenses 2011 and attempted to pass through the opened portion 2071 is emitted from the opened portion 2071.

The light modulator unit 2057 has the structure that the electrostatic stress generated when voltage is applied to the opposite electrodes 2063 and 2065 and the electrode light shielding plate 2073 causes the electrode light shielding plate 2073 to horizontally be moved along the surface of the substrate 2059. Since the substrate 2059 has the opened portion 2071 formed only half portion of the movable range for the electrode light shielding plate 2073, the horizontal movement of the electrode light shielding plate 2073 enables shielding and transmission of light emitted from the flat light source to be controlled.

The area of the non-opened portion 2069 of the light modulator unit 2057 having the electrode light shielding plate 2073 which is moved horizontally is enlarged. Also in the foregoing case, the microlens 2011 is able to converge light emitted from the flat light source. Therefore, also the light modulator unit 2057 having the relatively large non-opened portion 2069 is able to improve the light using efficiency.

FIG. 47 is a cross sectional view showing an array-type exposing device according to a fifteenth embodiment of the present invention. FIGS. 48 (A) and (B) are plan views showing examples of a light shielding film of the array-type exposing device shown in FIG. 47. FIGS. 49 (A) and (B) are cross sectional views showing states in which the array-type exposing device shown in FIG. 47 is being operated.

A light modulator unit 2079 of an array-type exposing device 2077 according to this embodiment may be employed as the light modulator unit 2005 and 2023 of the array-type exposing devices 2013, 2015, 2025, 2027 and 2033 according to the twelfth and thirteenth embodiments.

A pair of parallel supporters 2083 are disposed on a substrate 2081 which is transparent with respect to UV rays. A transparent flexible thin film 2085 apart from the substrate 2081 is formed on the upper surfaces of the pair of the supporters 2083. Therefore, a gap 2087 is formed between the substrate 2081 and the flexible thin film 2085. A light shielding portion (a light shielding film) 2089 is formed on the flexible thin film 2085.

A microlens 2011 corresponding to one light modulator unit 2079 is disposed on the surface of the substrate 2081 adjacent to a flat display unit (not shown).

The shape of the light shielding portion 2089 is changed to correspond to the shape of the microlens 2011. That is, when the microlens 2011 is a one-dimensional (a cylindrical) lens, the light shielding portion 2089 is formed into a straight shape, as shown in FIG. 48 (A). When the microlens 2011 is a two-dimensional lens, the light shielding portion 2089 is formed into an island shape, as shown in FIG. 48 (B).

A substrate-side transparent electrode 2091 is formed on the substrate 2081 at a position between the pair of the supporters 2083. A film-side transparent electrode 2093 is formed on the flexible thin film 2085 to oppose the substrate-side transparent electrode 2091. The film-side transparent electrode 2093 according to this embodiment is formed on the flexible thin film 2085 to cover the light shielding portion 2089.

The supporters 2083 may be made of an opaque material. A conductive material or a non-conductive material may be employed.

The flexible thin film 2085 may be made of a transparent material, such as an insulating material (a silicon oxide, a silicon nitride, glass or a polymer).

The light shielding portion 2089 may be made of an opaque material, such as carbon-dispersed resin, pigment-mixed resin, a metal material or a metal nitride. A light absorbing material or a light reflecting material may be employed. A conductive material or a non-conductive material may be employed.

The substrate-side transparent electrode 2091 may be made of a conductive material (ITO or the like) which permits transmission of UV rays. The film-side transparent electrode 2093 may be constituted by a thin metal film.

The substrate-side transparent electrode 2091 and the film-side transparent electrode 2093 are disposed in a lattice configuration in which they are arranged perpendicularly. Therefore, when the substrate-side transparent electrode 2091 and the film-side transparent electrode 2093 having predetermined structures are selected, specific opposite electrode portions disposed two-dimensionally can be instructed. The opposite electrode portions are selectively applied with voltage in accordance with image information.

When voltage is applied between the substrate-side transparent electrode 2091 and the film-side transparent electrode 2093 of the light modulator unit 2079, the electrostatic stress causes the flexible thin film 2085 to be attracted so as to be deflected toward the gap 2087. Thus, as shown in FIG. 49 (A), the light shielding portion 2089 is moved to the focal position of the microlens 2011. As a result, light allowed to pass through the substrate 2081 and the substrate-side transparent electrode 2091 is intercepted by the light shielding portion 2089.

When a supply of voltage between the substrate-side transparent electrode 2091 and the film-side transparent electrode 2093 is interrupted, the flexible thin film 2085 is restored to the original position by dint of the elastic restoring force. As a result, the position of the focal point of the microlens 2011 and the position of the light shielding portion 2089 are deviated from each other. Thus, light allowed to pass through the substrate 2081 and the substrate-side transparent electrode 2091 is allowed to pass through the flexible thin film 2085 and the film-side transparent electrode 2093. Then, light is emitted.

Therefore, when voltage is selectively applied between the substrate-side transparent electrode 2091 and the film-side transparent electrode 2093 in accordance with image information, the electro-mechanical operation causes the light modulator unit 2079 to be operated. As a result, required exposure control can be performed.

The array-type exposing device 2077 incorporates the microlens 2011 which forms a focal point. With respect to the focal point, the light shielding portion 2089 is moved to shield light or permits transmission of light. Therefore, shielding or transmission can be controlled by a smaller amount of movement of the light shielding portion as compared with a light modulator unit structured to perform the control by opening/closing the opening. As a result, the operation speed can be raised.

Therefore, a laser beam which raises the cost of the apparatus is not used. By using a low-cost flat light source, high speed digital multi-exposure can be performed. Since the substrate 2081, the substrate-side transparent electrode 2091 and the supporters 2083 can easily be formed into array structures by etching, the manufacturing cost can be reduced. Moreover, the operation voltage can be lowered as compared with exposure using a laser beam.

The light modulator unit 2079 of the array-type exposing device 2077 may have a structure that the substrate-side transparent electrode 2091 is covered with an insulating member. In the foregoing case, the flexible thin film 2085 may be made of a transparent and conductive material. The stacking order of the flexible thin film 2085, the light shielding portion 2089 and the film-side transparent electrode 2093 is not limited particularly. A structure also serving any one of the foregoing element may be employed.

Control of the deflection of the flexible thin film 2085 and shielding and transmission of light may be performed reversely to the above-mentioned structure. In the foregoing case, when the flexible thin film 2085 is deflected, the focal point and the light shielding portion 2089 are deviated from each other. Thus, light is emitted.

The light modulator unit 2079 may be deaerated, and then a rare gas is enclosed into the same so that the overall body is sealed. Thus, an influence of disturbance is prevented so that stabilization is realized.

FIG. 50 is a cross sectional view showing an array-type exposing device according to a sixteenth embodiment of the present invention. FIGS. 51 (A) and (B) are plan views showing examples of an opening of the array-type exposing device shown in FIG. 50. FIGS. 52 (A) and (B) are cross sectional views showing states in which the array-type exposing device shown in FIG. 50 is being operated. The same elements as those shown in FIG. 47 are given the same reference numerals, and the same elements are omitted from description.

The light modulator unit 2097 of the array-type exposing device 2095 according to this embodiment may be employed as the light modulator units 2005 and 2023 of the array-type exposing devices 2013, 2015, 2025, 2027 and 2033 according to the twelfth and thirteenth embodiments.

A light shielding film 2099 is formed on the flexible thin film 2085. An opening 2101 is formed in the central portion of the light shielding film 2099. When the microlens 2011 is a one-dimensional (a cylindrical) lens, the opening 2101 is formed into a straight shape, as shown in FIG. 51 (A). When the microlens 2011 is a two-dimensional lens, the opening 2101 is formed into an island shape, as shown in FIG. 51 (B).

The other structures, that is, the substrate 2081, the supporters 2083, the microlens 2011, the flexible thin film 2085, the substrate-side transparent electrode 2091 and the film-side transparent electrode 2093 are similar to those of the array-type exposing device 2077 shown in FIG. 47.

When no voltage is applied between the substrate-side transparent electrode 2091 and the film-side transparent electrode 2093 of the light modulator unit 2097, the flexible thin film 2085 is formed into a flat shape which parallels the substrate 2081. As a result, as shown in FIG. 52 (A), the position of the focal point of the microlens 2011 and the position of the opening 2101 are deviated from each other. As a result, light allowed to pass through the substrate 2081, the substrate-side transparent electrode 2091 and the flexible thin film 2085 is shielded by the light shielding film 2099.

When voltage is applied between the substrate-side transparent electrode 2091 and the film-side transparent electrode 2093, the electrostatic stress causes the flexible thin film 2085 to be absorbed so as to be deflected toward the gap 2087. As a result, as shown in FIG. 52 (B), the opening 2101 is moved to the position of the focal point of the microlens 2011. As a result, light allowed to pass through the substrate 2081, the substrate-side transparent electrode 2091 and the flexible thin film 2085 is furthermore allowed to pass through the opening 2101 and the film-side transparent electrode 2093. Then, light is emitted.

Similarly to the array-type exposing device 2077 shown in FIG. 47, when voltage is selectively applied between the substrate-side transparent electrode 2091 and the film-side transparent electrode 2093 in accordance with image information, the electro-mechanical operation causes the light modulator unit 2097 to be operated. Thus, required control of the exposure can be performed.

The array-type exposing device 2095 has the structure that the microlens 2011 forms a focal point. Then, the opening 2101 is moved to the focal point so as to shield light or permits transmission of light. Similarly to the array-type exposing device 2077, shielding of light or transmission can be controlled with a small amount of movement of the light shielding film 2099. As a result, the operation speed can be raised.

Similarly to the array-type exposing device 2077, an array structure can easily be constituted. Thus, the manufacturing cost can be reduced and the operation voltage can be lowered.

The control of the deflection of the flexible thin film 2085 and shielding and transmission of light may be performed in a reversed order to that of the above-mentioned structure.

The light modulator unit 2097 may be degassed, and then a rare gas is enclosed so that the overall body is sealed. Thus, an influence of disturbance is prevented so as to constitute a stable structure.

FIG. 53 is a cross sectional view showing a first modification of the sixteenth embodiment.

A light modulator unit 2105 of an array-type exposing device 2103 according to this modification has a structure that the substrate-side transparent electrode 2091, the flexible thin film 2085 and the film-side transparent electrode 2093 corresponding to the opening 2101 are omitted. The film-side transparent electrode 2093 also serves as a light shielding film. That is, the opening 2101 is in the form of a through hole.

In the light modulator unit 2105, light allowed to pass through the substrate 2081 and the substrate-side transparent electrode 2091 is not allowed to pass through another substance. In this case, light is allowed to pass through the opening 2101. As a result, deterioration in the intensity of light can be prevented.

Since the opening 2101 according to this modification is formed into the through hole, the substrate-side transparent electrode 2091, the flexible thin film 2085 and the film-side transparent electrode 2093 may be made of opaque materials. Therefore, the substrate-side transparent electrode 2091 and the film-side transparent electrode 2093 may be constituted by usual thin metal films. As a result, freedom to select materials can be enhanced.

Figure 54:
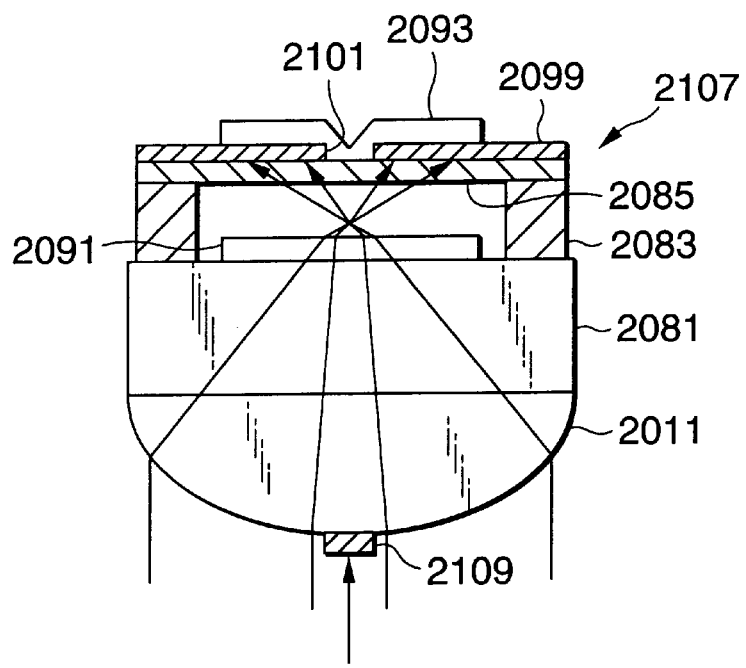
FIG. 54 is a cross sectional view showing a second modification of the sixteenth embodiment.

FIG. 54 is a cross sectional view showing a second modification of the sixteenth embodiment.

An array-type exposing device 2107 according to this modification has a structure that a light shielding member 2109 is provided for the surface of the microlens 2011 of the array-type exposing device 2095 shown in FIG. 50. The position and the shape of the light shielding member 2109 are determined to be capable of shielding light which is allowed to pass through the opening 2101 in the direction of the optical axis. The position and the shape of the light shielding member 2109 are optimized so as to minimize transmission through the opening 2101 when light is shielded. When transmission of light is permitted, light in a maximum quantity can be transmitted. The other structures are similar to those of the array-type exposing device 2095 according to the sixteenth embodiment.

In the array-type exposing device 2095 shown in FIG. 50, light traveling in the direction of the optical axis is allowed to pass through the opening 2101 in a slight quantity when light is shielded. On the other hand, the array-type exposing device 2107 is able to intercept light traveling in the direction of the optical axis by the light shielding member 2109. Therefore, contrast can be raised when exposure and display is performed.

Figure 55:
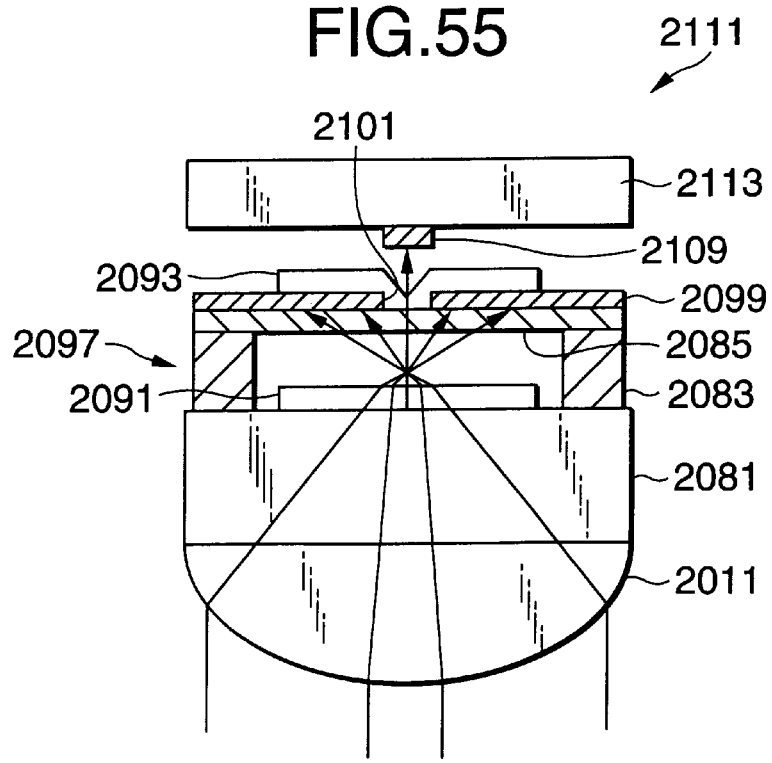
FIG. 55 is a cross sectional view showing a third modification of the sixteenth embodiment.

FIG. 55 is a cross sectional view showing a third modification of the sixteenth embodiment.

An array-type exposing device 2111 according to this modification has a structure that a transparent substrate 2113 having a light shielding member 2109 is disposed on the emission side of the light modulator unit 2097 of the array-type exposing device 2095 shown in FIG. 50. The position and the shape of the light shielding member 2109 are determined in such a manner that light traveling in the direction of the optical axis and allowed to pass through the opening 2101 is intercepted. Similarly to the array-type exposing device 2107, the position and the shape of the light shielding member 2109 are optimized in such a manner that transmission through the opening 2101 is minimized when light is shielded. When transmission of light is permitted, light is allowed to pass through the opening 2101 in a maximum quantity. The other structures are similar to those of the array-type exposing device 2095 according to the sixteenth embodiment.

The array-type exposing device 2111 according to this modification is able to raise contrast in the exposure and display similarly to the array-type exposing device 2107.

Moreover, the array-type exposing device 2111 has the structure that the light shielding member 2109 is provided for a transparent substrate 2113 which is individually constituted from the light modulator unit 2097. Therefore, the light shielding member 2109 for shielding light traveling in the direction of the optical axis can accurately be aligned (positioned) by using light traveling straight.

Figure 56:
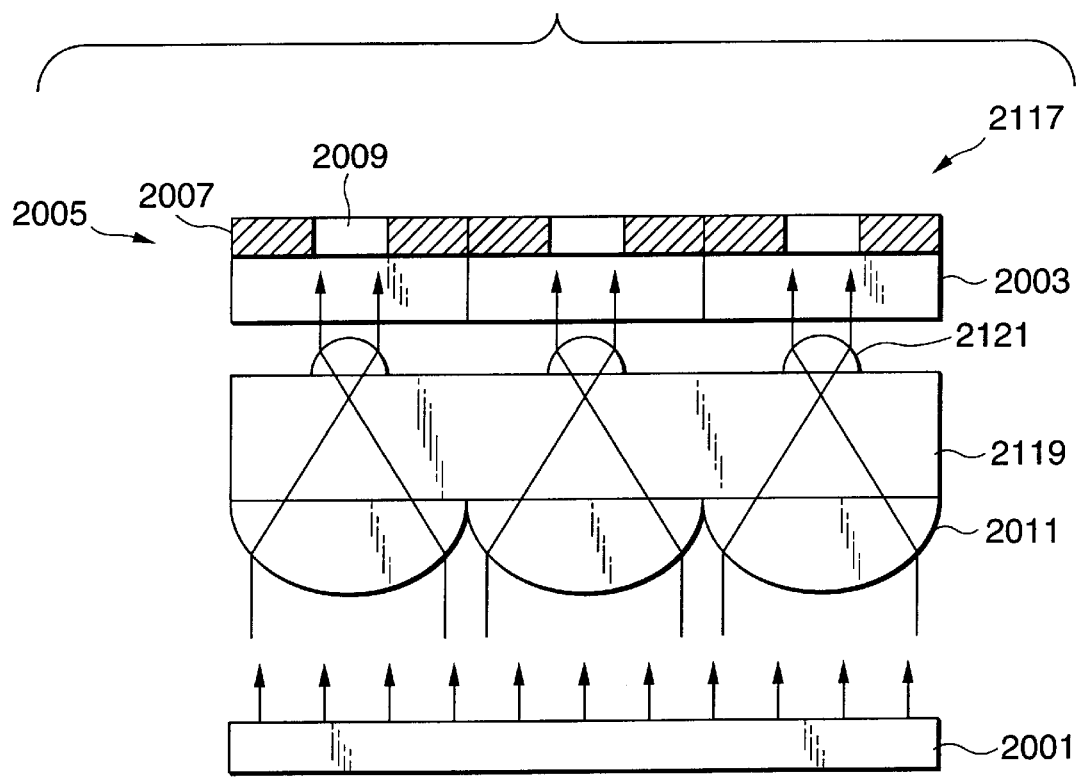
FIG. 56 is a cross sectional view showing an array-type exposing device according to a seventeenth embodiment of the present invention.

FIG. 56 is a cross sectional view showing an array-type exposing device according to a seventeenth embodiment of the present invention.

An array-type exposing device 2117 according to this modification has an intermediate transparent substrate 2119 disposed between the flat light source 2001 and the transparent substrate 2003 having the light modulator unit 2005 formed thereon. The microlenses 2011 corresponding to the light modulator unit 2005 are formed on the surface of the intermediate transparent substrate 2119 adjacent to the flat light source 2001. On the other hand, a collimator 2121 formed into a convex lens and having an optical axis made to coincide with that of the microlens 2011 is formed on the surface of the intermediate transparent substrate 2119 adjacent to the light modulator unit 2005. That is, this embodiment has a structure that the microlens 2011 and the collimator 2121 are integrated on the right and reverse sides of the intermediate transparent substrate 2119.

Similarly to the array-type exposing device 2013 according to the twelfth embodiment shown in FIG. 35, the light modulator unit 2005 has the non-opened portion 2007 and the openings 2009.

The collimator 2121 collimates light converged by the microlens 2011 into an emission area which is substantially the same as the area of the openings 2009. That is, parallel light beams in an area substantially the same as that of the openings 2009 are made incident on the light modulator unit 2005.

The array-type exposing device 2117 incorporating the collimator 2121 has a structure that light emitted from the flat light source 2001 is converged by the microlens 2011. Then, light substantially collimated by the collimator 2121 is made incident on the light modulator unit 2005. Therefore, the arraytype exposing device 2117 may be employed in interference type or diffraction type light modulation, for example, a light modulating mechanism using Fabry-Perot interference.

Figure 57:
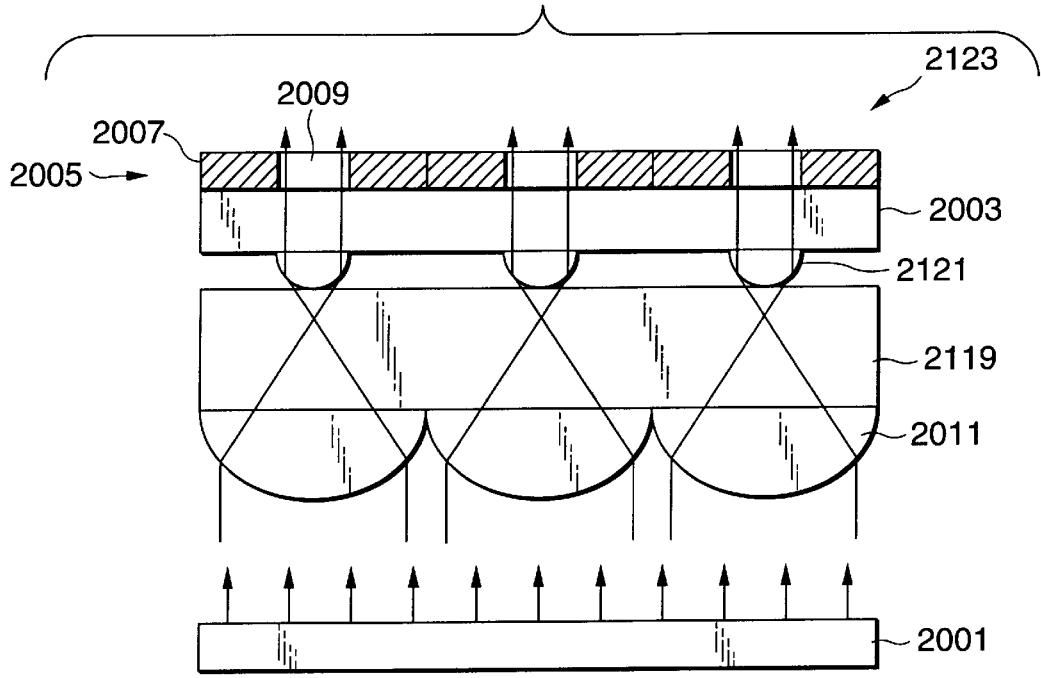
FIG. 57 is a cross sectional view showing a first modification of the seventeenth embodiment.

FIG. 57 is a cross sectional view showing a first modification of the seventeenth embodiment.

An array-type exposing device 2123 according to this modification incorporates the collimator 2121 provided for the transparent substrate 2003 adjacent to the light modulator unit 2005. On the other hand, the microlens 2011 is provided for the intermediate transparent substrate 2119. The collimator 2121 and the intermediate transparent substrate 2119 are adhered to each other.

Similarly to the array-type exposing device 2117, the array-type exposing device 2123 may be used in light modulation of the interference type or the diffraction type. Since the microlens 2011, the collimator 2121 and the light modulator unit 2005 are integrated, deviation of the optical axis or the like caused from external force acting after the device has been manufactured can be prevented. As a result, reliability can be improved.

Figure 58:
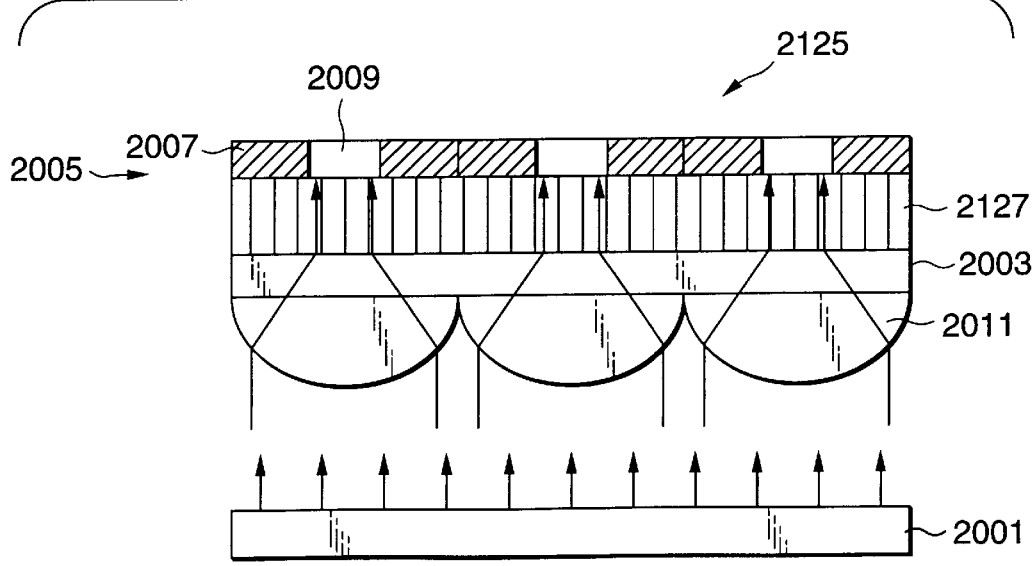
FIG. 58 is a cross sectional view showing an array-type exposing device according to an eighteenth embodiment of the present invention.

FIG. 58 is a cross sectional view showing an array-type exposing device according to an eighteenth embodiment of the present invention.

An array-type exposing device 125 according to this modification has the light modulator unit 2005 in which a fiber plate 2127 is disposed on the emission side of the transparent substrate 2003 having the microlens 2011 formed thereon. The fiber plate 2127 may also serve as the substrate of the light modulator unit 2005 or the same may be constituted by bonding single structures.

The fiber plate 2127 has a structure that a plurality of parallel light guide paths are gathered and end surfaces of the incidental light guide paths and those of the emission light guide paths are made coincide with each other. That is, the fiber plate 2127 is disposed in parallel with the transparent substrate 2003. Thus, light converged by the microlens 2011 is formed into parallel beams which are transmitted to the openings 2009.

The array-type exposing device 125 is able to parallel light even if the optical axis of the collimator 2121 is not made to coincide with that of the microlens 2011. Therefore, light emitted from the flat light source 2001 can be transmitted to the light modulator unit 2005 in a state in which an incidental area on the light modulator unit 2005 is reduced.

An array-type light modulator according to a nineteenth embodiment of the present invention will now be described.

Figure 59:
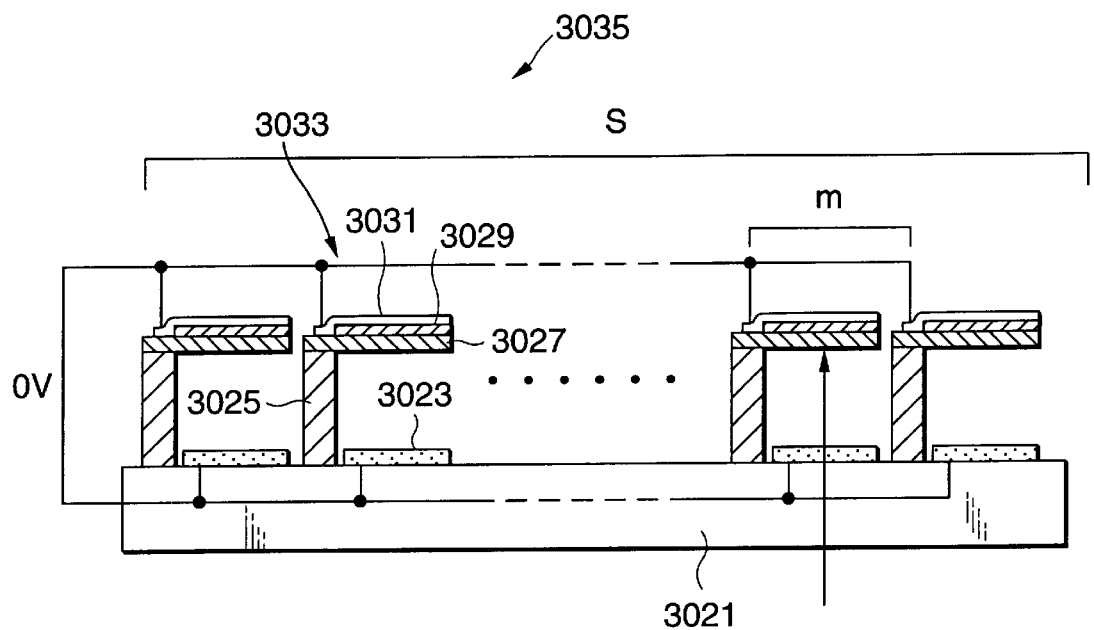
FIG. 59 is a cross sectional view showing an array-type light modulator according to a nineteenth embodiment of the present invention.
Figure 60:
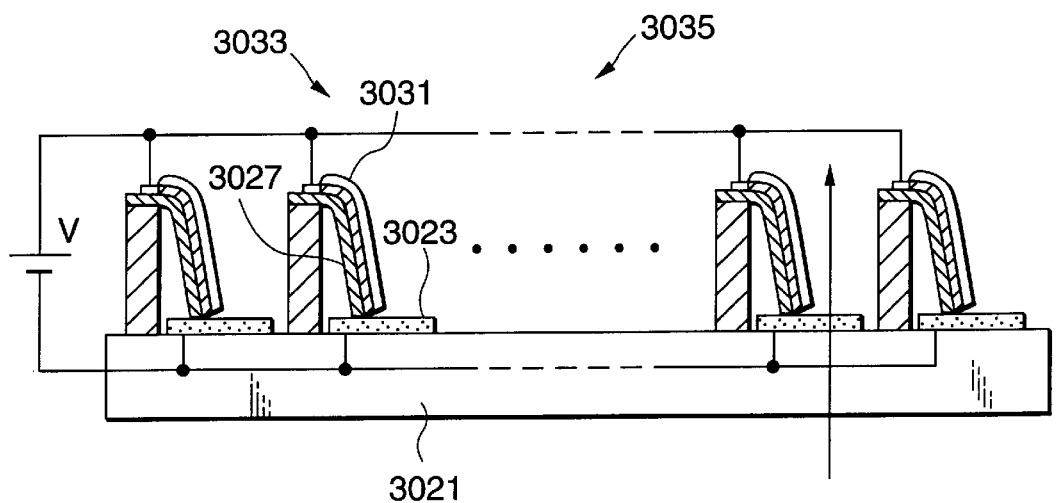
FIG. 60 is a cross sectional view showing a state in which the array-type light modulator shown in FIG. 59 is being operated.

FIG. 59 is a cross sectional view showing the array-type light modulator according to the nineteenth embodiment. FIG. 60 is a cross sectional view showing a state of the operation of the array-type light modulator shown in FIG. 59.

A plurality of substrate-side transparent electrodes 3023 which are transparent with respect to a UV ray are formed on a substrate 3021 which is transparent with respect to a UV ray. Insulating supporters 3025 corresponding to the substrate-side transparent electrodes 3023 are disposed on the substrate 3021. Ends of flexible thin films 3027 in parallel with the substrate 3021 are secured to the top ends of the insulating supporters 3025. An end of each of the flexible thin films 3027 is secured to the supporter 3025 so that the flexible thin films 3027 are formed into cantilever structures.

The flexible thin films 3027 are covered with light-insulating films 3029 which have substantially the same areas. Moreover, film-side transparent electrodes 3031 which are transparent with respect to a UV ray are provided for the flexible thin films 3027. The film-side transparent electrodes 3031 are formed opposite to the substrate-side transparent electrodes 3023.

The light-insulating films 3029 and the film-side transparent electrodes 3031 may be formed by members having the two functions. In this case, the light-insulating films 3029 are made of a conductive material which absorbs or reflects UV rays. Specifically, any one of the following structures may be employed: a thin metal film made of aluminum or chrome which reflects UV rays; a single structure made of a semiconductor, such as polysilicon which absorbs UV rays; an insulating film made of a silicon oxide or a silicon nitride; a structure obtained by evaporating a metal material on a thin semiconductor film made of, for example, polysilicon; and a composite structure obtained by evaporating a filter in the form of a dielectric multilayer film.

The substrate-side transparent electrode 3023, the insulating supporter 3025, the light-insulating film 3029 and the film-side transparent electrode 3031 constitute one light modulator 3033. The light modulators 3033 are arranged one- or two-dimensionally on the substrate 3021. The light modulators 3033 are provided for a plurality of regions m obtained by dividing region S of one pixel. That is, one pixel is composed of a plurality of light modulators 3033. It is able to be explained that this embodiment has a structure in which a plurality of the light modulators each of which is described as the fifth embodiment are arranged one- or two-dimensionally in each pixel.

In the light modulators 3033 provided for the regions m and corresponding to one pixel, the substrate-side transparent electrodes 3023 are connected to one another. Moreover, the film-side transparent electrodes 3031 are connected to one another. That is, the light modulators 3033 in one pixel are operated similarly.

An array-type light modulator 3035 having the light modulators 3033 structured as described above is disposed on a flat light source (not shown). When no voltage is applied between the substrate-side transparent electrodes 3023 and the film-side transparent electrodes 3031, the flexible thin films 3027 oppose and parallel the substrate 3021. Therefore, UV rays allowed to pass through the substrate-side transparent electrodes 3023 are absorbed or reflected by the light-insulating films 3029, as shown in FIG. 59.

When voltages are applied between the substrate-side transparent electrodes 3023 and the film-side transparent electrodes 3031, electrostatic stress acting between the foregoing electrodes causes the flexible thin films 3027 to be moved to the substrate 3021. Thus, the flexible thin films 3027 are folded, as shown in FIG. 60. That is, light is not intercepted by the light-insulating films 3029. Since the substrate-side transparent electrodes 3023 are connected to one another and the film-side transparent electrodes 3031 are connected to one another in the light modulators 3033 in one pixel, the light modulators are operated identically in one pixel. As a result, UV rays allowed to pass through the substrate 3021 and the substrate-side transparent electrodes 3023 move forward, and then emitted from the light modulators 3033. When the applied voltage is again made to be zero, the flexible thin films 3027 are restored to the original positions shown in FIG. 59 by dint of the elastic forces.

As described above, the array-type light modulator 3035 has the structure that the region S of one pixel are divided into the plural regions m. Moreover, the light modulator 3033 is provided for each of the regions m. In the light modulators 3033 on one pixel, the substrate-side transparent electrodes 3023 are connected to one another. Moreover, the film-side transparent electrodes 3031 are connected to one another. As a result, the size of each light modulator 3033 can be reduced.

When the size of the pixel of the panel is, for example, about 300 µm×300 µm and one pixel is vertically divided into 10×10=100 light modulators 3033, the size of each light modulator 33 can be reduced to 1/10 or smaller.

When reduction in the size of the light modulator 3033 is permitted, the following effects can be obtained.

That is, one pixel is divided into a plurality of regions and the size of each of the light modulators 3033 is reduced correspondingly. Therefore, greater design freedom of the light modulator can be obtained. In the above-mentioned structure, the height of the insulating supporter 3025 can be reduced to about 30 µm. As a result a thin film process can easily be performed.

When the insulating supporters 3025 are formed, usual RIE etching can satisfactorily be performed after the film forming process has been performed.

Since the thickness of each film can be reduced, throughput can be enlarged and thus cost reduction is permitted.

Moreover, voltage required to be applied to deflect the flexible thin films 3027 can be lowered. As a result, the cost of the operation circuit can be reduced.

Since the requirement amount of displacement of the flexible thin films 3027 can be reduced, response time can be shortened. Moreover, fatigue can be prevented and lifetime can be elongated.

The array-type light modulator 3035 may be employed to form an essential portion of an array-type exposing device. The array-type exposing device is constituted by disposing a flat light source (not shown) to be opposite to the array-type light modulator 3035. The flat light source may be a light source which emits, for example, UV rays. As a result, UV rays emitted from the flat light source can be modulated by the array-type light modulator 3035 so as to expose an ultraviolet-ray sensitive material to UV rays.

The array-type light modulator 3035 may be employed to form an essential portion of an array-type exposing device for exposing a visible-ray sensitive material or an infrared-ray sensitive material. The array-type exposing device incorporates a flat light source disposed opposite to the array-type light modulator 3035 Moreover, a fluorescent member (not shown) is disposed opposite to the flat light source such that the array-type light modulator 3035 is interposed. The array-type exposing device structured as described above is able to convert the wavelength of a light modulator emitted from the array-type light modulator 3035 into a visible ray or an infrared ray by the fluorescent member so that the visible-ray sensitive material or the infrared-ray sensitive material is exposed to light.

The array-type light modulator 3035 may be employed to form an essential portion of a flat-type display unit. The flat-type display unit incorporates a flat light source disposed opposite to the array-type light modulator 3035. Moreover, a fluorescent member (not shown) is disposed opposite to the flat light source such that the array-type light modulator 3035 is interposed. The flat-type display unit structured as described above is able to cause the fluorescent member to perform display with light by dint of a light beam emitted from the array-type light modulator 3035. Therefore, when voltages in accordance with image information are applied to the light modulators 3033 corresponding to the pixels, a required image can be formed.

An array-type light modulator according to a twentieth embodiment of the present invention will now be described.

Figure 61:
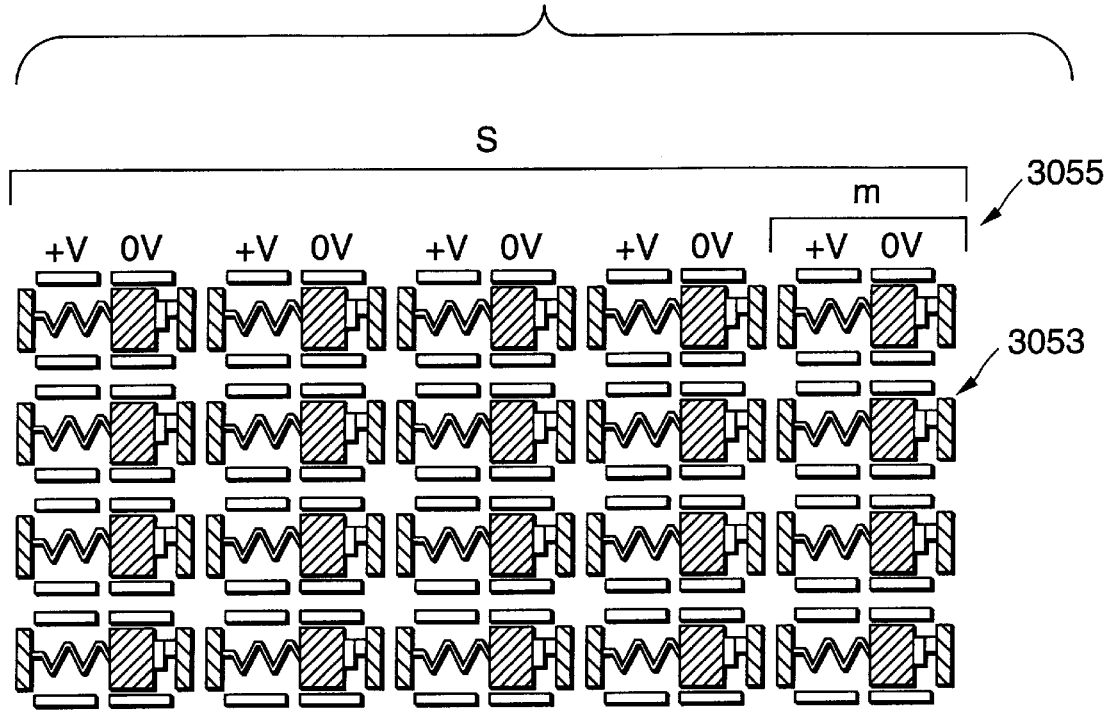
FIG. 61 is a plan view showing an array-type light modulator according to a twentieth embodiment of the present invention.

FIG. 61 is a plan view showing the array-type light modulator according to the twentieth embodiment. As shown in the figure, the array-type light modulator 3055 has the structure that the region S of one pixel are divided into the plural regions m and the light modulator 3053 are provided for the regions m. It is able to be explained that this embodiment has a structure in which a plurality of the light modulators each of which is described as the first modification of the fourteenth embodiment shown in FIG. 43 are arranged one- or two-dimensionally in each pixel. Thus, the way of operation of the present light modulator is the same as that of the fourteenth embodiment and detailed explanation is omitted. The opposite electrodes 3041 of the light modulator 3053 in one pixel are connected to one another and the electrode light insulating plates 3049 of the same are connected to one another. Therefore, the size of each of the light modulating portions 3053 can be reduced.

As a result, the following effects can be obtained similarly to the array-type light modulator 3035.

(1) The thin film process can easily be performed.
(2) A usual RIE etching can be performed.
(3) The thickness of each film which must be formed can be reduced, causing the cost to be reduced.
(4) Voltage which must be applied can be lowered, causing the cost of the operation circuit to be reduced.
(5) Response time can be shortened and lifetime can be elongated.

Similarly to the array-type light modulator 3035, the array-type light modulator 3055 may constitute an array-type exposing device and a flat-type display unit.

An array-type light modulator according to a twenty-first embodiment of the present invention will now be described.

It is able to be explained that this embodiment has a structure in which a plurality of the light modulators each of which is described as the first modification of the fourth embodiment shown in FIG. 11 are arranged one- or two-dimensionally in each pixel. Thus, the way of operation of the present light modulator is the same as that of the fourth embodiment and detailed explanation is omitted.

A method of operating the array-type light modulator 3081 will now be described.

Figure 62:
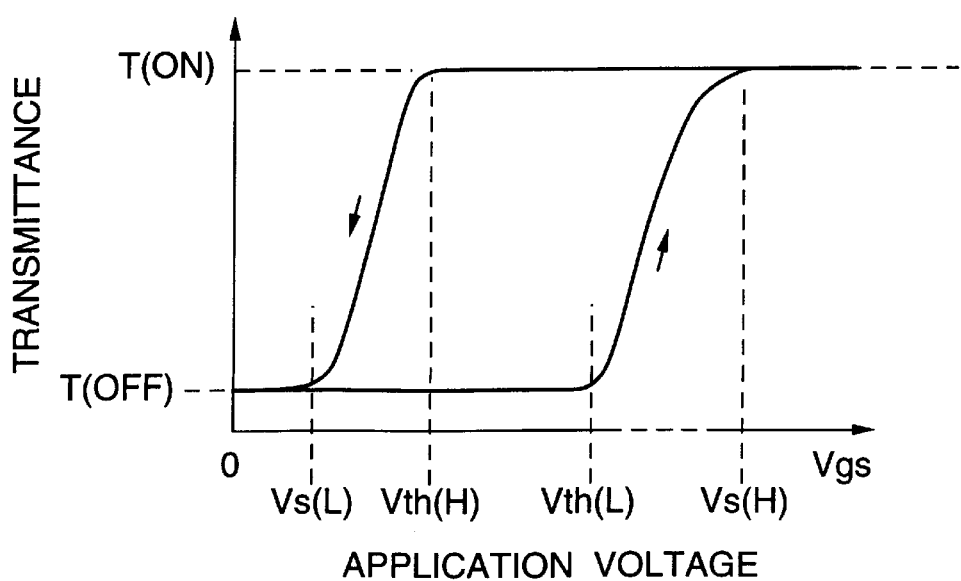
FIG. 62 is a hysteresis graph showing a relationship of light transmittance of a diaphragm incorporated in an array-type light modulator according to a twenty-first embodiment of the present invention and voltage applied thereto.

Prior to describing the operation method, the characteristic of the diaphragm 65 (see FIG. 11) between applied voltages and transmittance of light will now be described. FIG. 62 is a hysteresis graph showing the characteristics of the applied voltages and light transmittance.

When the diaphragm 65 which is a flexible thin film is deformed and elastically restored by electrostatic stress, the relationship between applied voltage $V_{gs}$ and displacement of the diaphragm 3065 has a hysteresis characteristic. Therefore, also the relationship between the applied voltage $V_{gs}$ and light transmittance T has a hysteresis characteristic as shown in FIG. 62.

The foregoing hysteresis characteristic causes the light modulator 3079 in an OFF state to maintain an OFF (light shielded) state when $V_{gs}$ is $V_{th}(L)$ or lower. If $V_{gs}$ is $V_s(H)$ or higher, the light modulator 3079 is made transition to an ON (light transmissive) state. When the Vgs is $V_{th}(H)$ or higher, the light modulator 3079 maintains the ON state. When $V_{gs}$ is $V_s(L)$ or lower, the light modulator 3079 is made to transition to the OFF state. That is, if $V_{gs}$ satisfies the range from $V_{th}(H)$ and $V_{th}(L)$, the light modulator 3079 is able to realize two states, that is, T (ON) and T (OFF) in accordance with the hysteresis of $V_{gs}$. If the polarity of $V_{gs}$ is negative, the characteristic is made to be symmetric to the above-mentioned characteristic with respect to the axis of to ordinate.

FIG. 63 is a plan view showing an array-type light modulator having light modulators disposed in a matrix configuration. In this embodiment, the light modulators 3079 are disposed at intersections Tr(1, 1), Tr(1, 2), Tr(2, 1) and Tr(2, 2) of a matrix of two rows and two columns so that array-type light modulator 3081 is constituted. The light modulators 3079 are disposed to correspond to regions in one pixel.

The electrodes 3071 of the light modulator 3079 disposed on the same row are connected to one another so as to be scan electrodes. The scan electrodes are applied with potential $V_g$. The electrodes 3061 of the light modulators 3079 disposed on the same column are connected to one another so as to be signal electrodes. The signal electrodes are applied with potential $V_b$. Therefore, the voltage $V_{gs}$ which is applied to each light modulator 3079 between the electrodes 61 and 71 is $(V_b-V_g)$.

To operate the array-type light modulator 3081, the electrodes 3071 are row-sequentially scanned in accordance with scan signals. Then, data signals corresponding to the scanned electrodes 3071 are supplied to the electrodes 61.

The scan electrodes are supplied with three types of signals (voltages) which are a reset signal, a selection signal and a non-selection signal.

The reset signal turns off (shields light) of each of the light modulators 3079 on the row regardless of the previous state of the light modulators 3079. The voltage of each of the scan electrodes at this time is $V_g(r)$.

The selection signal is a signal for writing data on the row. Simultaneously with the foregoing signal, the state of the light modulators 3079 is made to be ON (light is transmitted) or OFF (light is shielded) in accordance with the voltage applied to the signal electrodes. The voltage applied to the scan electrodes at this time is $V_g(S)$.

The non-selection signal is a signal indicating non-selection. The state of the light modulators 3079 is not changed regardless of the voltage of the signal electrodes. The previous state is maintained. The voltage of the scan electrodes at this time is $V_g(ns)$.

On the other hand, the signal electrodes are supplied with two types of signals (voltages) which are an ON signal and an OFF signal.

The ON signal turns on (transmits light) the light modulators 3079 on the selected row. The voltage of the signal electrodes at this time is $V_b(on)$.

The OFF signal turns off (light is shielded) of the light modulators 3079 on the selected row. Since an assumption is made that the light modulators 3079 are reset immediately before the supply of the signal, a signal for maintaining a previous state (OFF state) may be supplied when the state of the light modulator 3079 is turned off (light is shielded). The voltage of the signal electrodes at this time is $V_b(off)$.

When the combination of the voltage of the scan electrodes and that of the signal electrodes is varied, the voltage $V_{gs}$, between the electrodes of the light modulators 3079 can be varied to six levels below. In accordance with the characteristic between the voltage $V_{gs}$ between the electrodes and the transmittance, specific conditions are realized.

$$V_{gs}(r\text{—on})=V_b(on)-V_{g(r)} \leq V_s(L)$$

$$V_{gs}(r\text{—off})=V_b(off)-V_g(r) \leq V_s(L)$$

$$V_{gs}(s\text{—on})=V_b(on)-V_g(s) \geq V_s(H)$$

$$V_{gs}(s\text{—Off})=V_b(off)-V_g(s) \leq V_{th}(L)$$

$$V_{gs}(ns\text{—on})=V_b(on)-V_g(ns) \leq V_{th}(L)$$

$$V_{gs}(ns\text{—off})=V_b(off)-V_g(ns) \geq V_{th}(H)$$

The above-mentioned conditions are as shown in FIG. 64.

FIG. 64 is a table showing voltages $V_{gs}$ between electrodes of the light modulator units derived from combinations of voltages $V_g$ of scan electrodes and voltages $V_b$ of signal electrodes.

For example, which the voltage $V_g$ of the scan electrodes is reset $V_g$ (r) and the voltage $V_b$ of the signal electrode is ON, that is, $V_b(on)$, the voltage $V_g$(indicated by a this slid line 3085 shown in the drawing) which is a value between $V_s(H)$ and $V_{th}(L)$ is subtracted from the voltage $V_g$(indicated by a this solid line 3083 in the drawing) of the signal electrode which is higher than $V_s$ (H). A result of the subtraction (indicated by a thick solid line 3087 shown in the drawing) is smaller than $V_s(L)$.

That is, the following relationship is satisfied:

$$V_{gs}(r\text{—on}) \leq V_s(L)$$

Performing similar process, six levels of voltages are determined.

Then, a method of writing data on matrices two-dimensionally arranged in the light modulators 3079 by using the relationship between the voltage $V_{gs}$ between the electrodes and the transmittance will now be described.

Figure 65:
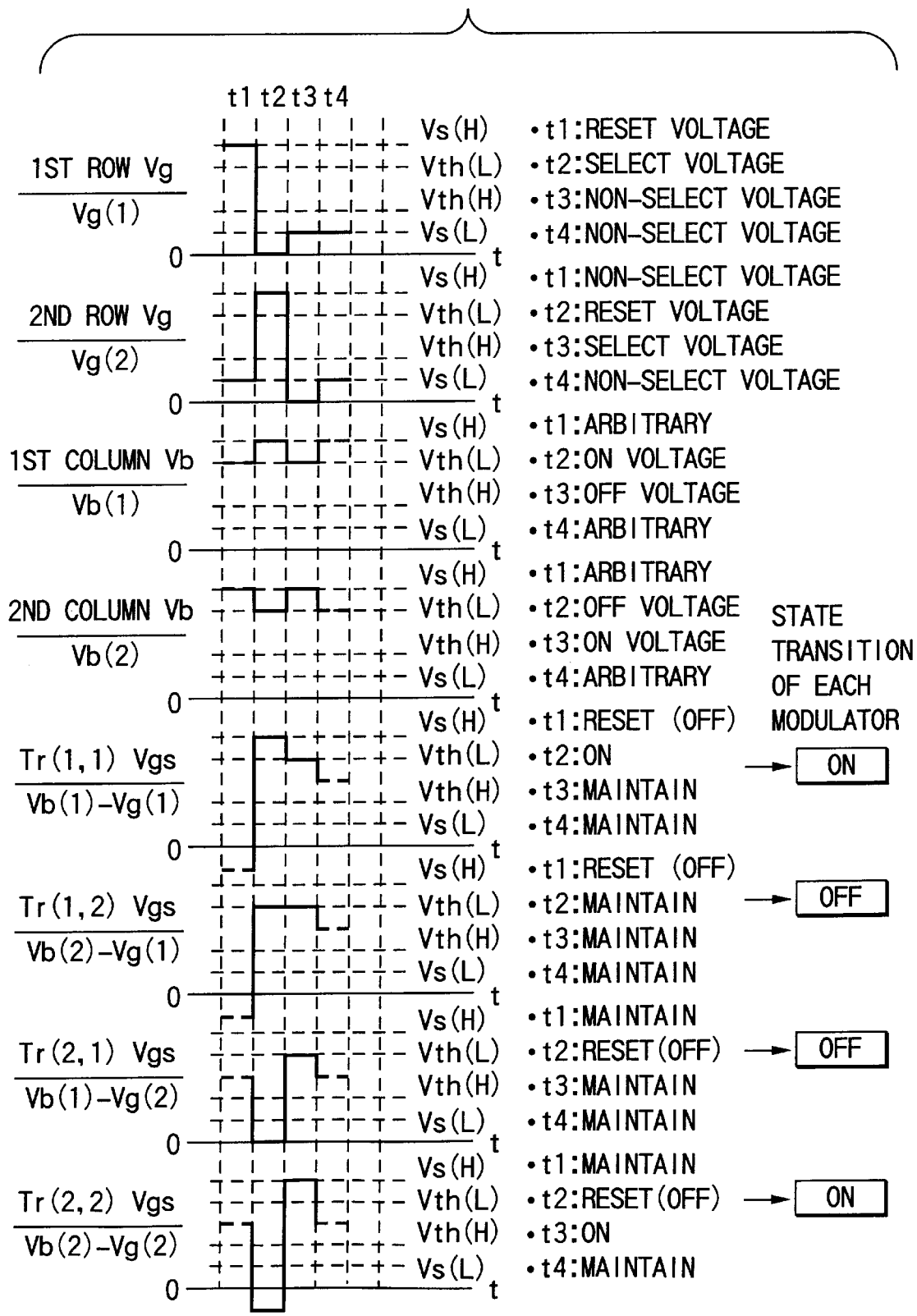
FIG. 65 is a diagram showing a method of writing data by applying voltages having different waveforms to light modulator units arranged in the matrix configuration.

FIG. 65 is a diagram showing the method of writing data by applying voltages having different waveforms to the light modulators arranged in the matrix configuration.

The matrix for writing data has a structure as shown in FIG. 63 and composed of two rows and two columns. The following ON data and OFF data are written on each light modulator 3079 in the matrix:

Tr(1, 1)→ON
Tr(1, 2)→OFF
Tr(2, 1)→OFF
Tr(2, 2)→ON

Voltages having waveforms as shown in FIG. 65 are applied to the matrix.

For example, $V_s(1)$ on the first row is applied with the following voltages:

t1: reset voltage
t2: select voltage
t3: non-select voltage
t4: non-select voltage $V_b(1)$ on the first column is applied with the following voltages:

t1: arbitrary
t2: ON voltage
t3: OFF voltage
t4: arbitrary

Thus, required data is row-sequentially written on each light modulator 3079.

That is, for example, $V_{gs}$: $V_b(1)-V_g(1)$ in a case of the matrix Tr(1, 1) on the first row and the first column, The following states are realized:

t1: reset voltage (OFF)
t2: ON
t3: state is maintained
t4: state is maintained

Therefore, the state of ON at t2 is maintained (memorized), causing the light modulator 3079 of the matrix Tr(1, 1) is brought to the "ON" state. Similarly, the other matrices are brought to the following states: the matrix Tr(1, 2) is brought to the "OFF" state, Tr(2, 1) is brought to the "OFF" state and Tr(2, 2) is brought to the "ON" state.

An array-type light modulator according to a first modification of the twenty-first embodiment will now be described.

When the flexible thin film is deformed or elastically restored by the electrostatic force, the relationship between the applied voltage Vgs and the displacement of the flexible thin film has a hysteresis characteristic. Therefore, also the relationship between the applied voltage Vgs and the light transmittance T has a hysteresis characteristic, as shown in FIG. 62.

With the foregoing hysteresis characteristic, in a state in which a light modulator is turned off (light is shielded), the turned-off state is maintained when Vgs is not higher than Vth (L). When Vgs is not lower than Vth (H), the turned-on state is maintained. When Vgs is not lower than Vth(H), the light modulator maintains the turned-on state. When Vgs is not higher than Vs (L), the light modulator is saturated to the turned-off state. When Vgs has the negative polarity, a positive characteristic is realized which is symmetrical with respect to the ordinate axis.

A structure having the above-mentioned hysteresis characteristic encounters a fact that a state of the flexible thin film in a state before the writing operation exerts an influence on the next operation. Therefore, to accurately perform the writing operation with satisfactory repeatability, it is preferable that a resetting operation, that is, an equilibrium state (a turned-off state) is realized before the writing operation is performed. Then, the writing operation is performed to realize a required transmittance. If the resetting operation is simply performed before the writing operation, the scanning time for each row, however, is elongated excessively. Therefore, the number of rows of the matrix cannot be enlarged. With the operating method of obtaining gradation by time division, there arises a problem in that the number of gradation levels cannot be enlarged.

It might therefore be feasible to obtain a quick response characteristic by increasing the rigidity of each fluorescent portion of the light modulator. However, the operating voltage is raised, causing the operating circuit to bear a heavier load. As a result, cost and size reductions are inhibited.

However, as described above, the resetting scan of the light modulator is performed, and then the writing scan for selecting the displacement operation of the device or the maintaining of the previous state is performed. Therefore, exertion of an influence of the state before the writing scan on a next operation owing to the hysteresis characteristic of the device can be prevented. Therefore, a stable writing scan can be performed.

The hysteresis characteristic of the device enables the two-dimensional light modulator array of the active matrix arrangement to be operated without contradiction. The description "without contradiction" means that ON or OFF of the pixels on the writing selected scanning lines is determined and pixels on non-selected scanning lines maintain the states written when selection has been performed.

Figure 66:
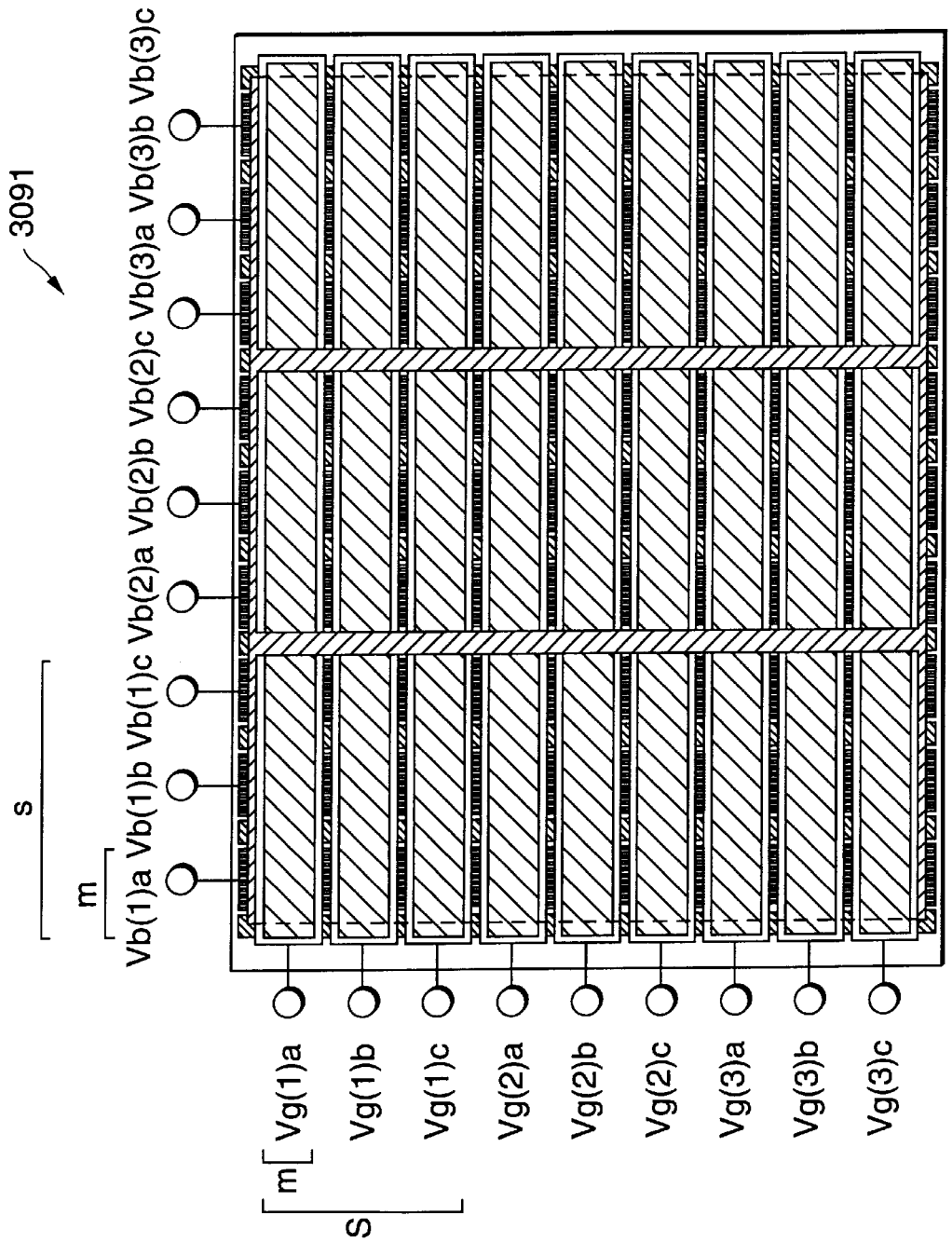
FIG. 66 is a plan view showing a simple matrix according to a first modification of the twenty-first embodiment.

FIG. 66 is a plan view showing a simple matrix according to first modification of the twenty-first embodiment.

In this modification, region S of one pixel is divided into nine, that is, 3×3, regions. A light modulator 3079 is provided for each region m. Each light modulator 3079 in one pixel are connected to three different scan electrodes $V_g(1)$ a, $V_g(1)$ b and $V_g(1)$ c connected to one pixel and three different signal electrodes $V_b(1)$ a, $V_g(1)$ b and $V_b(1)$ c.

That is, the light modulators 3079 provided for one pixel can independently be operated when the above-mentioned voltages are applied to the scan electrodes and the signal electrodes.

Since the array-type light modulator 3091 according to this modification enables the size of each light modulator 3079 to be reduced, the thin film process can easily be performed. The voltage required to deflect the flexible thin films 3027 can be lowered. Since the amount of displacement required for the flexible thin films 3027 can be reduced, the response time can be shortened.

Moreover, even if the light modulator 3079 of a type which can be brought to binary states is employed, division of the area of one pixel enables nine gradation levels to be realized by one pixel.

The array-type light modulator 3091 is structured to combine the foregoing gradation expressing method with another gradation expressing method (for example, a field-inside time division gradation) to express more gradation levels. If a ternary or higher mode is employed, a multilevel gradation, for example, expression such that areas and light modulators are weighted, can be realized.

Also the array-type light modulator 3091 is able to constitute an array-type exposing device and a flat-type display unit similarly to the array-type light modulator 3035.

An array-type light modulator according to a twenty-second embodiment of the present invention will now be described.

Figures 67, 68:
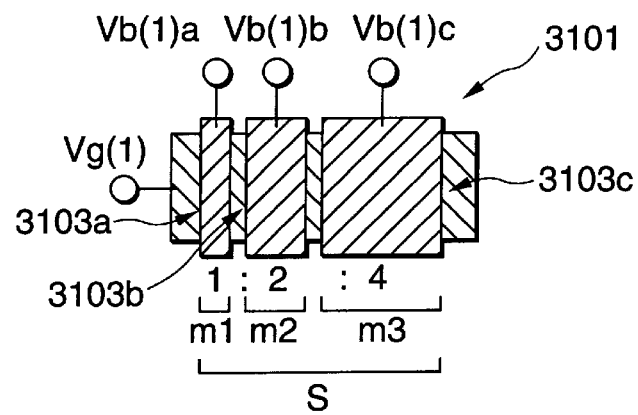
FIG. 67 is a plan view showing an array-type light modulator according to a twenty-second embodiment of the present invention.
FIG. 68 is a table showing transmitted light intensity values derived from combinations of states of respective light modulator unit of the array-type light modulator shown in FIG. 67.

FIG. 67 is a plan view showing the array-type light modulator according to the twenty-second embodiment.

The array-type light modulator 3101 according to this embodiment has a structure that region S of one pixel is divided into a plurality of regions m1, m2 and m3 having different areas. The area ratios of the regions m1, m2 and m3 is 1:2:4. The regions m1, m2 and m3 are provided with light modulators 103a, 103b and 103c corresponding to the areas. The scan electrode portions of the light modulators 3103a, 3103b and 3103c are applied with common scanning voltage $V_g(1)$. On the other hand, the signal electrode portions are applied with different signal voltages $V_b(1)$ a, $V_b(1)$ b and $V_b(1)$ c corresponding to the light modulators 3103a 3103b and 3103c.

Therefore, the array-type light modulator 3101 is able to vary the amount of light transmission by changing the combination of the ON and OFF operations of the light modulators 3103a, 3103b and 3103c. As a result, even if the state of each light modulator is changed binarily, amounts of light transmission of 8 gradient levels shown in FIG. 68 can be obtained.

Also the array-type light modulator 3101 is able to constitute an array-type exposing device and a flat-type display unit similarly to the array-type light modulator 3035.

An array-type light modulator according to a twenty-third embodiment of the present invention will now be described.

Figure 69:
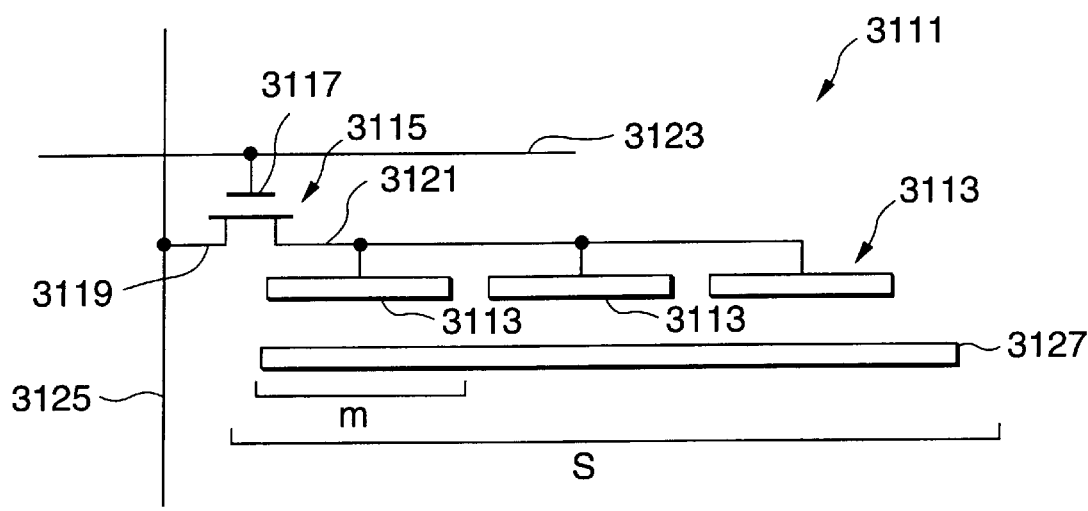
FIG. 69 is a diagram showing an equivalent circuit of a pixel portion of an array-type light modulator according to a twenty-third embodiment of the present invention.

FIG. 69 is an equivalent circuit diagram of a pixel portion according to the twenty-third embodiment.

An array-type light modulator 3111 according to this embodiment has a structure that a light modulator 3113 is provided for each of a plurality of regions m obtained by dividing region S of one pixel. Moreover, an active device (for example, a TFT) 3115 is provided to correspond to one pixel. The active device 3115 incorporates a gate electrode 3117, a drain electrode 3119 and a source electrode 3121.

Scanning-signal lines 3123 for the rows are connected to the gate electrode 3117. Image-signal lines 3125 for the columns are connected to the drain electrode 3119. A pair of opposite electrodes of each light modulator are commonly connected to the source electrode 3121. A common electrode 3127 is connected to the other opposite electrodes of each light modulator 3113.

That is, the array-type light modulator 3111 has a structure that one active device 3115 is able to commonly control the plural light modulator 3113 in one pixel.

The scanning-signal lines 3123 connected to the gate electrode 3117 of the array-type light modulator 3111 structured as described above, is applied with a voltage which electrically conducts the active device 3115. When a required image signal is supplied to the image-signal lines 3125 connected to the drain electrode 3119, the drain electrode 3119 and the source electrode 3121 are electrically conducted with each other. Therefore, the image signal is applied to either of the opposite electrodes of the light modulator 3113. As a result, the voltage of either one of the opposite electrodes and that of the other opposite electrodes connected to the common electrode 3127 commonly operate each of the light modulator 3113 in each pixel.

The foregoing array-type light modulator 3111 is able to maintain the state of the light modulator 3113 even if the active device 3115 is made to be non-conductive to scan another row. Therefore, an active matrix operation in which each of the light modulators 3113 is commonly operated for each pixel can be performed.

Also the array-type light modulator 3111 is able to constitute an array-type exposing device and a flat-type display unit similarly to the array-type light modulator 3035.

An array-type light modulator according to a twenty-fourth embodiment of the present invention will now be described.

Figure 70:
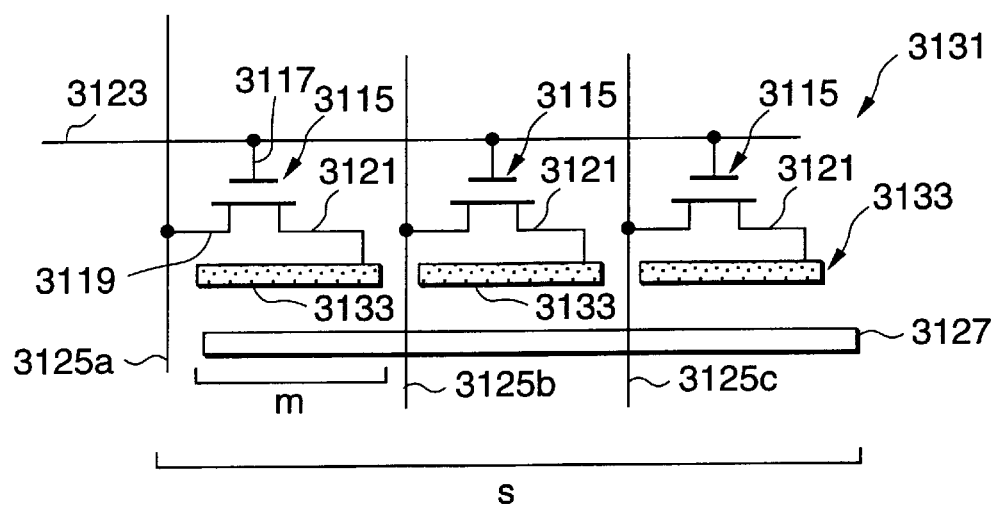
FIG. 70 is a diagram showing an equivalent circuit of a pixel portion of an array-type light modulator according to a twenty-fourth embodiment of the present invention.

FIG. 70 is an equivalent circuit diagram of a pixel portion of the twenty-fourth embodiment.

An array-type light modulator 3131 according to this embodiment has a structure that a light modulator 3133 is provided for each of plural regions m obtained by dividing region S of one pixel. A plurality of active devices 3115 corresponding to the light modulators 133 are provided for one pixel.

A scanning-signal line 3123 for each row is commonly connected to the gate electrode 3117 of each active device 3115. Different image-signal lines 3125a, 3125b and 3125c are connected to a drain electrode 3119 of each active device 3115. Either one of opposite electrodes of each light modulator 3133 is connected to a source electrode 3121 of each active device 3115. A common electrode 3127 is connected to another opposite electrode of each light modulator 3133.

That is, the array-type light modulator 3131 has a structure that one pixel can be controlled by the plural active devices 3115 and the light modulators 3133 connected to the active devices 3115.

The different image-signal lines 3125a, 3125b and 3125c connected to the drain electrode 3119 of the array-type light modulator 3131 structured as described above are supplied with required image signals. As a result, the voltage of either one of the opposite electrodes and that of the other opposite electrode connected to the common electrode 3127 differently operate the light modulators 3133 in one pixel.

The array-type light modulator 3131 is able to perform an active matrix operation using the active devices 3115 such that the plural light modulators 3133 divided in one pixel can individually be operated. As a result, a change of the combination of the operations of the light modulators 3133 enables amounts of light transmission for a plurality of gradation levels to be obtained in one pixel.

Also the array-type light modulator 3131 is able to constitute an array-type exposing device and a flat-type display unit similarly to the array-type light modulator 3035.

An active matrix operation method for the array-type light modulator 4131 having the foregoing active matrix structure will now be described.

An active-matrix operation method will now be described in a case where the array-type light modulator 4131 has no hysteresis characteristic.

Figure 71:
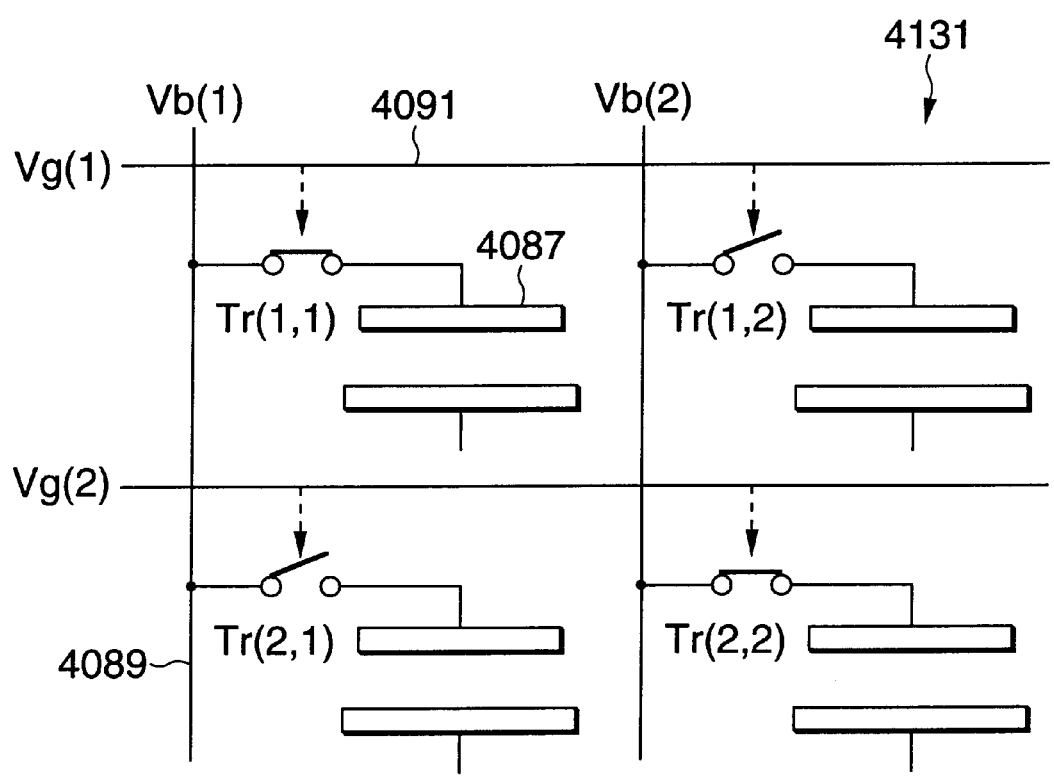
FIG. 71 is a diagram showing an equivalent circuit of a pixel portion of active matrix arrangement.
Figure 72:
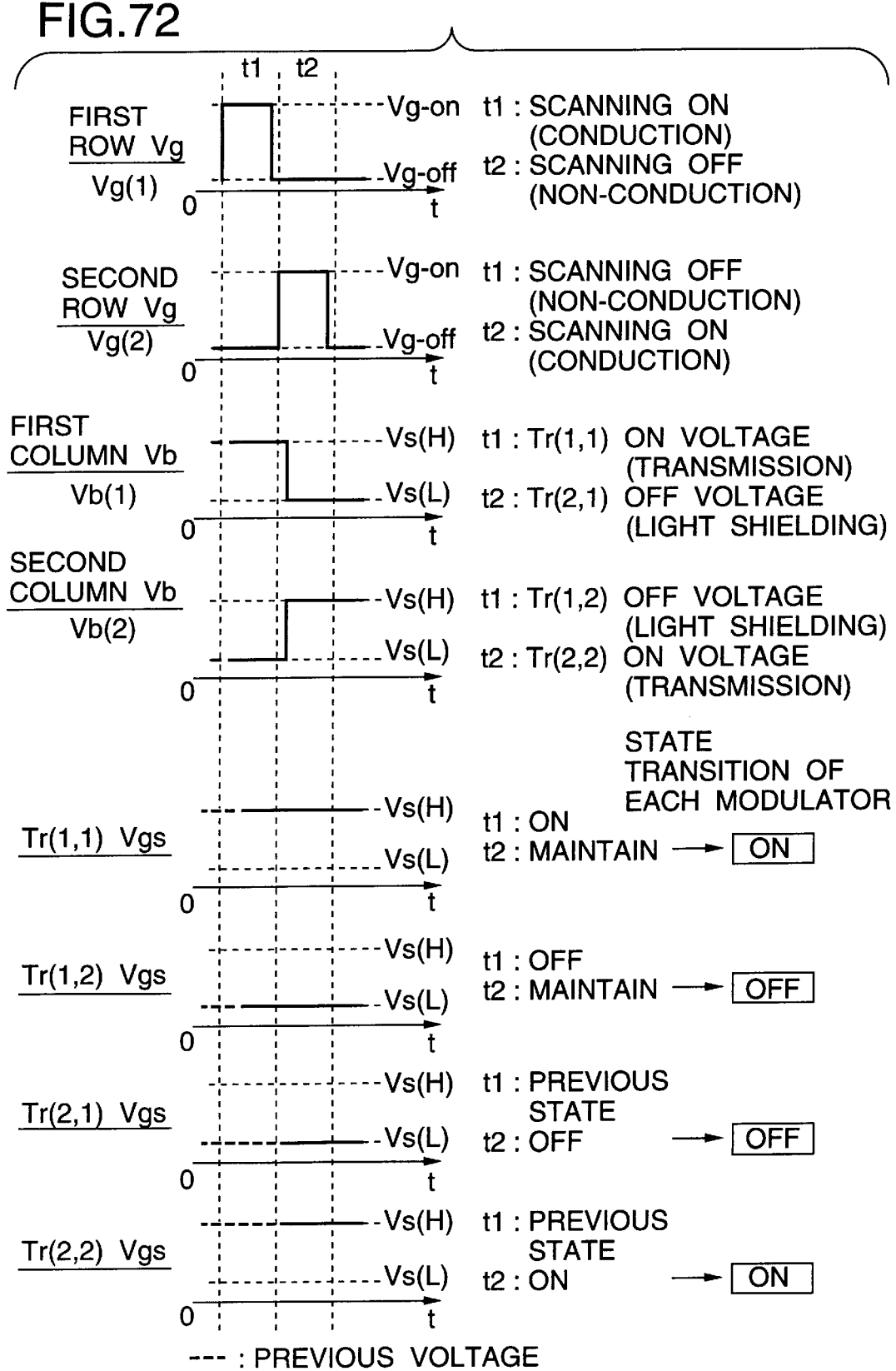
FIG. 72 is a diagram showing a data writing method in which voltages having various waveforms are applied to respective light modulator units in matrix arrangement.

FIG. 71 is an equivalent circuit of a semiconductor active matrix having a two-row and two-column configuration. FIG. 72 is a diagram showing a method of writing data by applying voltages having different waveforms to the light modulating portions of the semiconductor active matrix. The characteristics of voltage Vgs to be applied to the light modulator and the light transmittance T are the same as the characteristics described with reference to FIG. 62.

A specific operating method of writing the following potentials to the pixel electrodes disposed on two rows and two columns shown in FIG. 20 will now be described.

Tr(1, 1)→ON
Tr(1, 2)→OFF
Tr(2, 1)→OFF
Tr(2, 2)→ON

Pixel electrodes 4087, which are Tr(1, 1), Tr(1, 2) or Tr(2, 1), Tr(2, 2) disposed on the same row are connected to a common scanning signal line 4091 to which potential Vg is applied. Pixel electrodes, which are Tr(1, 1), Tr(2, 1) or Tr(1, 2), Tr(2, 2), disposed on the same column are connected to a common image signal line 4089 to which potential Vb is applied.

To operate the active matrix device structured as described above, pixel electrodes Tr(1, 1), Tr(1, 2) or Tr(2, 1), Tr(2, 2) are scanned in a row sequential manner. In synchronization with this, data signals associated with the scanned pixel electrodes are supplied to pixel electrodes Tr(1, 1), Tr(2, 1) or Tr(1, 2), Tr(2, 2) disposed on the column.

At this time, voltages having the waveforms as shown in FIG. 72 are applied to the matrix.

For example, Vg (1) on the first row is applied with the following voltages:
 t1: scanning-ON (conduction) voltage
 t2: scanning-OFF (non-conduction) voltage
Vg (2) on the second row is applied with the following voltages:
 t1: scanning-OFF (non-conduction) voltage
 t2: scanning-ON (conduction) voltage
Vb (1) on the first column is applied with the following voltages:
 t1: ON (transmission) voltage to Tr(1, 1)
 t2: OFF (light shielding) voltage to Tr(2, 1)
Vb (2) on the second column is applied with the following voltages:
 t1: OFF (light shielding) voltage to Tr(1, 2)
 t2: ON (transmission) voltage to Tr(2, 2)
Thus, potential Vgs at Tr(1, 1) is made to be Vs (H) at t1. As a result, the state of the pixel is made to be ON. The ON state is maintained from t2.

Potential Vgs at Tr(1, 2) is made to be Vs (L) at t1. As a result, the state of the pixel is made to be OFF. The OFF state is maintained from t2.

Potential Vgs at Tr(2,1) is made to be Vs (L) at t1. As a result, the state of the pixel is made to be OFF. The OFF state is maintained from t2.

Potential Vgs at Tr(2, 2) is made to be Vs (H) at t1. As a result, the state of the pixel is made to be ON. The ON state is maintained from t2.

As a result, the writing operation intended in FIG. 71 can be executed as planned.

As described above, the scanning gate electrodes are turned on (made conductive). In synchronization with this, ON (transmission) or OFF (light shielding) potential is applied from the data signal electrode. If the scanning gate electrode is turned off (made non-conductive), the potential of the pixel electrode can be maintained if the light modulator is a capacitive device.

An active matrix operation method for the array-type light modulator 131 having the above-mentioned active matrix structure will now be described, the method being employed when the array-type light modulator 4131 has the hysteresis characteristic shown in FIG. 62.

The operation of the active matrix structure will now be described which is performed when the following binary data is written on the pixels on two rows and two columns as shown in FIG. 71.
 Tr(1, 1)→ON
 Tr(1, 2)→OFF
 Tr(2, 1)→OFF
 Tr(2, 2)→ON
FIG. 73 is a diagram showing operating voltages Vg and Vb for the active matrix structure shown in FIG. 71.

Figure 73:
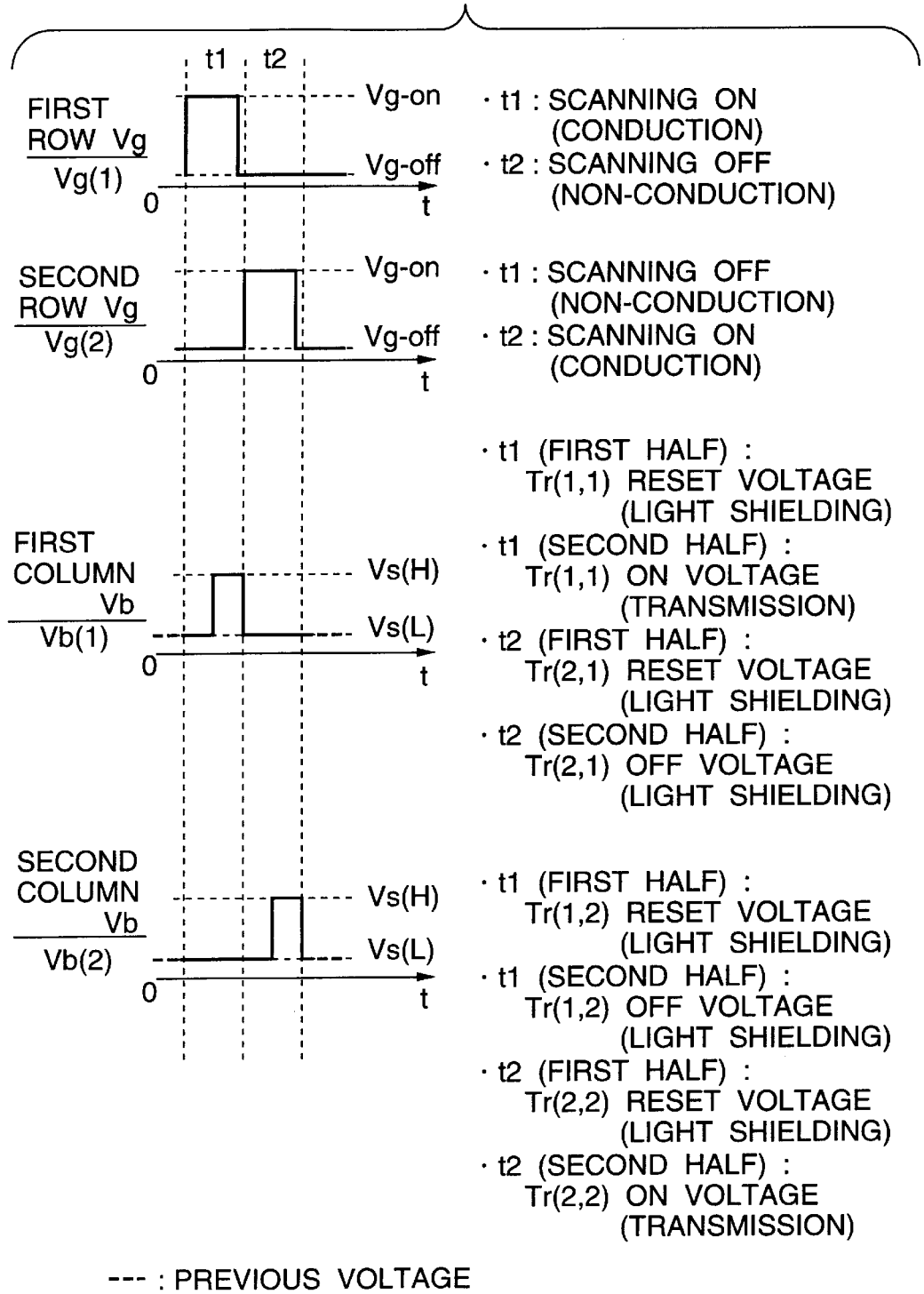
FIG. 73 is a diagram showing voltage applied to the respective light modulator units.

In the foregoing case, the following voltages are applied as shown in FIG. 73:
Vg on the first row
 t1: scanning ON (conduction)
 t2: scanning OFF (non-conduction)
Vg on the second row
 t1: scanning OFF (non-conduction)
 t2: scanning ON (conduction)
Vb on the first column
 First Half of t1: Tr(1, 1) is applied with reset (light shielding) voltage
 Second Half of t1: Tr(1, 1) is applied with ON (transmission) voltage
 First Half of t2: Tr(2, 1) is applied with reset (light shielding) voltage
 Second Half of t2: Tr(2, 1) is applied with OFF (light shielding) voltage
Vb on the second column
 First Half of t1: Tr(1, 2) is applied with reset (light shielding) voltage
 Second Half of t1: Tr(1, 2) is applied with OFF (light shielding) voltage
 First Half of t2: Tr(2, 2) is applied with reset (light shielding) voltage
 Second Half of t2: Tr(2, 2) is applied with ON (transmission) voltage.

As described above, the scanning gate electrodes are turned on (made conductive) with Vg-on in the row sequential manner. In synchronization with this, ON (transmission) or OFF (light shielding) potential is supplied from the data signal electrode. Then, if the scanning gate electrode is turned off (made non-conductive), the potential of the pixel can be maintained.

Figure 74:
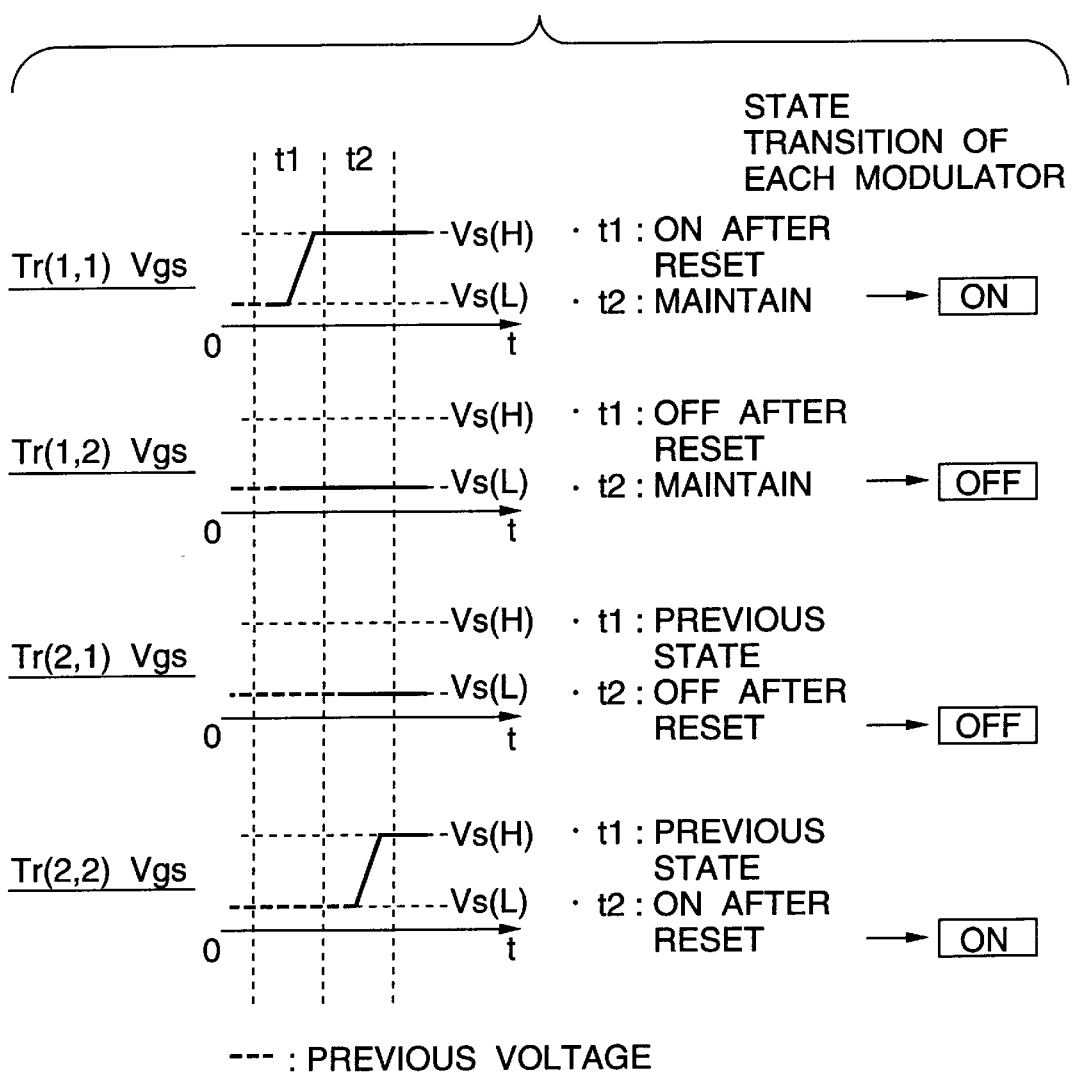
FIG. 74 is a diagram showing voltage applied to electrodes of the respective light modulator units.

The results shown in FIGS. 73 and 74 are as follows: Tr(1, 1) is "ON", Tr(1, 2) is "OFF", Tr(2, 1) is "OFF" and Tr(2, 2) is "ON".

As a result, if the light modulator has the hysteresis characteristic, the writing operation intended in FIG. 71 can be executed as planned without contradiction.

An operation method with which the resetting period and the writing period are independently scanned is enabled to perform a similar active matrix operation.

The foregoing active matrix operation is structured such that voltage having a predetermined level is applied when writing scan is performed to control binary values "ON" and "OFF". The present invention is not limited to the foregoing method. An operation method may be employed in which the voltage level, which must be applied, is set to an arbitrary level to perform multi-level gradation control.

As has been described above, the exposing device according to the present invention comprises a light modulator unit disposed on a flat light source for emitting a UV ray and arranged to modulate a light beam emitted from the flat light source by an electro-mechanical operation. As a result, an exposing device can be obtained which does not use a laser beam which raises the cost of the apparatus, which requires only low operation voltage, and with which the cost can be reduced.

The laminate structure is constituted such that the signal electrode is formed on the light guide plate and the transparent flexible thin film is caused to oppose the signal electrode such that a gap is interposed. Moreover, a scan electrode opposing the signal electrode is provided for the flexible thin film. Therefore, an array structure can easily be formed. Thus, an exposing device which can be manufactured at a low cost can be obtained. Since light transmitted from the light guide plate is allowed to pass through only the pair of the transparent electrodes interposing the gap, the efficiency of using light can be improved.

Since the plurality of the elongated and parallel signal electrodes and the scan electrodes are disposed opposite to one another in the perpendicular direction into a lattice configuration, high speed digital multi-exposure can be performed. As a result, high speed exposure can be realized.

The image recording apparatus according to the present invention is able to perform digital multi-exposure. Therefore, line control can be performed such that the exposing device and the image forming member are relatively moved. As a result, high speed exposure can be performed. Thus, the recording speed can be raised.

Accordingly, the flat display unit of the present invention has the structure comprising: the light modulators disposed in one-dimensional or two-dimensional matrix configuration on the flat light source for emitting an ultraviolet ray and arranged to modulate a light beam emitted from the flat light source; and the fluorescent members which are excited by light beams emitted from the light modulator section and which are disposed opposite to the light modulator unit. Therefore, the necessity for a high vacuum can be eliminated and a large area unit can be realized with a low cost.

The transparent signal electrode is provided on the substrate. Moreover, the transparent flexible thin film is made to be opposite to the signal electrode such that a gap is interposed. Thus, the scan electrode opposing the signal electrode is provided for the flexible thin film. Thus, the laminate structure is formed. Therefore, an array structure can easily be formed. Since light transmitted from the light conducting plate is allowed to pass through only the pair of the transparent electrodes which interpose the gap, the efficiency of using light can be improved.

The plural and parallel signal electrodes and scan electrodes are disposed opposite to one another in the lattice configuration in the perpendicular direction. Therefore, images formed by dint of emission of fluorescent members can be obtained in intersection of the opposite electrodes as a unit. As a result, high quality images can easily be obtained. Moreover, the image forming operation can be raised.

Accordingly, the array-type exposing device of the present invention has the structure that the light modulator incorporates the opening having an area smaller than the area of one pixel or smaller than the area of each of a plurality of regions obtained by dividing one pixel; and the light converging member for converging light emitted from the flat light source to the opening of the light modulator is provided. Therefore, in a case of the light modulator which modulates light by a deflecting operation of the flexible thin film using electrostatic stress, the size of the light modulating mechanism can be reduced. Thus, high speed exposure can be performed.

Since the size of the mechanism can be reduced, the position of the mechanism is not considerably limited. As a result, design freedom of the light modulator can be enhanced.

Since light is converged by the light converging member, efficient and bright exposure can be performed even if the area of the opening is very small.

The array-type exposing device according to the present invention has the structure that light emitted from the flat light source is modulated by the two-dimensional array-type light modulator. Then, the wavelength of modulated light is converted by the fluorescent member. Thus, exposure of a visible ray and an infrared ray can be performed. Also the above-mentioned array-type exposing device realizes high speed exposure, improvement in the design freedom and efficient exposure.

The flat display unit according to the present invention has the structure that the light modulator incorporates the opening having an area smaller than the area of one pixel or smaller than the area of each of a plurality of regions obtained by dividing one pixel; and the light converging member for converging light emitted from the flat light source to the opening of the light modulator is provided. Light emitted from the flat light source is modulated by the two-dimensional array-type light modulator. Modulated light is used to cause the fluorescent member to perform display with light. Therefore, only low voltage is required to perform high speed display, improve design freedom and realize satisfactory light using efficiency.

According to the array-type light modulator, the array-type exposing device and the flat-type display unit of the present invention have the structure that the light modulator is provided for each of the plural regions obtained by dividing one pixel. Therefore, the size of the light modulator can be reduced. Thus, greater design freedom of the light modulator can be obtained. For example, the height of the supporters can be shortened. Therefore, the thin film process can easily be performed. Since the amount of displacement for the flexible thin film can be reduced, the response time can be shortened and a high speed operation can be performed.

The method of operating an array-type light modulator in an array-type exposing device and the flat display is structured such that a light modulating portion is provided for each of regions obtained by dividing one pixel into a plurality of sections to operate each of the light modulating portions in a different manner. Therefore, if each light modulating portion is in a binary mode, multi-level gradation control can be performed in units of one pixel.

After the resetting scan for elastically restoring the light modulator has been performed, a writing scan for selecting the displacing operation of the device or maintaining of the state is performed. Therefore, if the light modulator has the hysteresis characteristic, the light modulator can stably be operated without contradiction.

What is claimed is:

1. An array-type exposing device for exposing an image forming body incorporated in an image forming apparatus, comprising:

a flat light source for emitting a UV ray; and a light modulator unit disposed above the flat light source so as to be associated with at least one unit area derived by dividing each of pixels on the image, the light modulator unit modulating the UV ray by electro-mechanical operation to expose the image forming body.

2. The array-type exposing device as set forth in claim 1, wherein the light modulator unit includes:

a first electrode disposed above the flat light source;

a second electrode disposed opposite to the first electrode such that at least a gap is interposed;

a flexible thin film, which is transparent with respect to UV rays, interposed between the first and second electrodes and to be elastically deflected by Coulomb force generated when an electric field is applied therebetween.

3. The array-type exposing device as set forth in claim 2, wherein the first electrode includes a plurality of band-like electrodes arranged in parallel with each other, the second electrode includes a plurality of band-like electrodes arranged in parallel with each other so as to be perpendicular to the first electrode, and at least one of intersections of the first and second electrodes is associated with one pixel of said pixels of the image.

4. The array-type exposing device as set forth in claim 2, wherein the light modulator unit includes at least one active device associated with one pixel of the image, in which the first electrode is connected to a drain electrode thereof, the second electrode is connected to a common electrode, an image signal line corresponding to each column of the image connected to a source electrode thereof and an image signal line corresponding to each row of the image is connected to a gate electrode thereof.

5. The array-type exposing device as set forth in claim 2, wherein the light modulator unit includes at least one active device associated with one pixel of said pixels of the image, in which the first electrode is connected to a source electrode thereof, the second electrode is connected to a common electrode, an image signal line corresponding to each column of the image connected to a drain electrode thereof and an image signal line corresponding to each row of the image is connected to a gate electrode thereof.

6. The array-type exposing device as set forth in claim 2, wherein the flat light source includes a UV lamp and a light guide plate for guiding the UV ray emitted from the UV lamp, and the flexible thin film allows the guided UV ray to transmit when the flexible thin film is deflected and approached to the light guide plate sufficiently by the application of the electric field.

7. The array-type exposing device as set forth in claim 6, wherein the flexible thin film includes a light diffusion layer.

8. The array-type exposing device as set forth in claim 2, wherein the electric field is applied to deflect the flexible thin film so that an optical interference effect of a multilayer film is generated so the UV ray can be modulated.

9. The array-type exposing device as set forth in claim 8, wherein the light modulator unit includes a film member disposed opposite to the flexible thin film, both of the flexible thin film and the film member have a reflectivity with respect to UV rays, and the electric field is applied to change an optical length between the flexible thin film and the film member so the UV ray can be modulated.

10. The array-type exposing device as set forth in claim 8, wherein a spacer having a high relative dielectric constant is disposed between the first and the second electrodes.

11. The array-type exposing device as set forth in claim 2, wherein the light modulator unit includes a transparent substrate provided on an emission face thereof, the transparent substrate having a black mask provided at that portion corresponding to a boundary of adjacent pixels.

12. The array-type exposing device as set forth in claim 11, wherein the transparent substrate is a fiber plate.

13. The array-type exposing device as set forth in claim 11, wherein the transparent substrate includes a distributed refractive index lens.

14. The array-type exposing device as set forth in claim 2, wherein the light modulator unit has a sealed structure, and a rare gas is enclosed therein.

15. The array-type exposing device as set forth in claim 2, wherein the deflected amount of the flexible thin film is controlled continuously.

16. The array-type exposing device as set forth in claim 2, wherein the light modulator unit includes:

an opening formed on an emission face thereof, the opening having an area smaller than the unit area; and a light converging member for converging the UV ray emitted from the flat light source to the opening.

17. The array-type exposing device as set forth in claim 16, wherein the flexible thin film includes a shading member for shading the UV ray at a focal point of the light converging member when the electric field is applied.

18. The array-type exposing device as set forth in claim 16, wherein the flexible thin film includes an opening for allowing the UV ray to pass through at a focal point of the light converging member when the electric field is applied.

19. The array-type exposing device as set forth in claim 18, wherein the opening is a through hole and any other portion of the flexible thin film is an opaque body.

20. The array-type exposing device as set forth in claim 18, wherein a shading member for shading only a component on an optical axis of the UV ray passing through the opening is arranged at one of an incident face side and the emission face side of the light modulator unit.

21. The array-type exposing device as set forth in claim 16, wherein a collimator member is disposed between the opening and the light converging member, the collimator member for collimating the UV ray such that the UV ray has an area substantially equal to that of the opening.

22. The array-type exposing device as set forth in claim 16, wherein a fiber plate is disposed between the opening and the light converging member.

23. The array-type exposing device as set forth in claim 1, wherein the light modulator unit includes:

a first electrode disposed above the flat light source;

a second electrode disposed opposite to the first electrode such that at least a gap is interposed;

a shading member, which is opaque with respect to UV rays, interposed between the first and second electrodes and to be moved to release the shading by Coulomb force generated when an electric field is applied therebetween.

24. The array-type exposing device as set forth in claim 23, wherein the shading member is moved in a direction substantially similar to an optical axis of the UV ray when the electric field is applied.

25. The array-type exposing device as set forth in claim 23, wherein the shading member is moved in a direction substantially perpendicular to an optical axis of the UV ray when the electric field is applied.

26. The array-type exposing device as set forth in claim 23, wherein the movement amount of the shading member is controlled continuously.

27. The array-type exposing device as set forth in claim 23, wherein the light modulator unit includes:

an opening formed on an emission face thereof, the opening having an area smaller than the unit area; and a light converging member for converging the UV ray emitted from the flat light source to the opening.

28. The array-type exposing device as set forth in claim 1, wherein the flat light source includes a low-pressure mercury lamp for emitting a UV ray having 254 nm of a central wave length and a light guide plate for guiding the UV ray.

29. The array-type exposing device as set forth in claim 1, wherein the flat light source includes a low-pressure mercury lamp inside of which a fluorescent material emitting a 300–400 nm of UV ray is applied and a light guide plate for guiding the UV ray.

30. The array-type exposing device as set forth in claim 1, wherein the UV ray emitted from the flat light source is collimated.

31. The array-type exposing device as set forth in claim 1, wherein the flat light source includes a UV lamp, a reflection plate provided around the UV lamp and a light guide plate for guiding the UV ray, and the reflection plate reflects the UV ray such that the incident UV ray is guided in the light guide plate with an angle higher than a total reflection angle.

32. The array-type exposing device as set forth in claim 1, wherein the flat light source is a device emitting the UV ray.

33. The array-type exposing device as set forth in claim 1, wherein the flat light source is a flat light source unit including a UV lamp and a light guide plate for guiding the UV ray, and the flat light source unit is separately provided from the light modulator unit.

34. The array-type exposing device as set forth in claim 1, wherein the flat light source is a flat light source unit including a UV lamp and a light guide plate for guiding the UV ray, and the first electrode is disposed on the light guide plate.

35. The array-type exposing device as set forth in claim 1, wherein when one pixel of said pixels is divided into plural unit areas, the light modulator units provided in the respective unit areas are connected to a common electrode for allowing operations of the respective light modulator units to be the same with regard to each of the pixels.

36. The array-type exposing device as set forth in claim 35, wherein when one pixel of said pixels is divided into plural unit areas, the light modulator units provided in the respective unit areas are arranged into a simple matrix structure and controlled by simple matrix driving, and wherein a predetermined voltage is applied to the respective light modulator units to select performing one of the light modulation and maintaining a previous state thereof.

37. The array-type exposing device as set forth in claim 36, wherein the light modulator units have a hysteresis characteristic, and wherein a reset operation for setting back an electromechanical operation is performed before a state selecting operation.

38. The array-type exposing device as set forth in claim 35, wherein when one pixel of said pixels is divided into plural unit areas, the light modulator units provided in the respective unit areas are arranged into an active matrix structure and controlled by active matrix driving, and wherein a predetermined voltage is applied to the respective light modulator units to select performing one of the light modulation and maintaining a previous state thereof.

39. The array-type exposing device as set forth in claim 38, wherein the light modulator units have a hysteresis characteristic, and wherein a reset operation for setting back an electromechanical operation is performed before a state selecting operation.

40. The array-type exposing device as set forth in claim 1, wherein when one pixel of said pixels is divided into plural unit areas, the light modulator units provided in the respective unit areas are connected to different electrodes for allowing operations of the respective light modulator units to be different from each other with regard to each of the pixels.

41. The array-type exposing device as set forth in claim 40, wherein when one pixel of said pixels is divided into plural unit areas, the light modulator units provided in the respective unit areas are arranged into a simple matrix structure together with active devices and controlled by simple matrix driving, and wherein a predetermined voltage is applied to the respective light modulator units to select performing one of the light modulation and maintaining a previous state thereof.

42. The array-type exposing device as set forth in claim 41, wherein the light modulator units have a hysteresis characteristic, and wherein a reset operation for setting back an electromechanical operation is performed before a state selecting operation.

43. The array-type exposing device as set forth in claim 40, wherein when one pixel of said pixels is divided into plural unit areas, the light modulator units provided in the respective unit areas are arranged into an active matrix structure together with active devices and controlled by active matrix driving, and wherein a predetermined voltage is applied to the respective light modulator units to select performing one of the light modulation and maintaining a previous state thereof.

44. The array-type exposing device as set forth in claim 43, wherein the light modulator units have a hysteresis characteristic, and wherein a reset operation for setting back an electromechanical operation is performed before a state selecting operation.

45. The array-type exposing device as set forth in claim 1, wherein one pixel is divided into plural unit areas having different areas from each other.

46. A flat-type display comprising:

a flat light source for emitting a UV ray;

a light modulator unit disposed above the flat light source so as to be associated with at least one unit area derived by dividing each of pixels on the image, the light modulator unit modulating the UV ray by electromechanical operation to expose the image forming body; and a fluorescent member unit disposed opposite to the light modulator unit, the fluorescent member unit including a fluorescent member excited by the UV ray emitted from the light modulator unit.

47. The flat-type display as set forth in claim 46, wherein the light modulator unit includes:

a first electrode disposed above the flat light source;

a second electrode disposed opposite to the first electrode such that at least a gap is interposed;

a flexible thin film, which is transparent with respect to UV rays, interposed between the first and second electrodes and to be elastically deflected by Coulomb force generated when an electric field is applied therebetween.

48. The flat-type display as set forth in claim 47, wherein the first electrode includes a plurality of band-like electrodes arranged in parallel with each other, the second electrode includes a plurality of band-like electrodes arranged in parallel with each other so as to be perpendicular to the first electrode, and at least one of intersections of the first and second electrodes is associated with one pixel of the image.

49. The flat-type display as set forth in claim 47, wherein the light modulator unit includes at least one active device associated with one pixel of the image, in which the first electrode is connected to a drain electrode thereof, the second electrode is connected to a common electrode, an image signal line corresponding to each column of the image connected to a source electrode thereof and an image signal line corresponding to each row of the image is connected to a gate electrode thereof.

50. The flat-type display as set forth in claim 47, wherein the light modulator unit includes at least one active device associated with one pixel of said pixels of the image, in which the first electrode is connected to a source electrode thereof, the second electrode is connected to a common electrode, an image signal line corresponding to each column of the image connected to a drain electrode thereof and an image signal line corresponding to each row of the image is connected to a gate electrode thereof.

51. The flat-type display as set forth in claim 47, wherein the flat light source includes a UV lamp and a light guide plate for guiding the UV ray emitted from the UV lamp, and the flexible thin film allows the guided UV ray to transmit when the flexible thin film is deflected and approached to the light guide plate sufficiently by the application of the electric field.

52. The flat-type display as set forth in claim 51, wherein the flexible thin film includes a light diffusion layer.

53. The flat-type display as set forth in claim 47, wherein the electric field is applied to deflect the flexible thin film so that an optical interference effect of a multilayer film is generated so the UV ray can be modulated.

54. The flat-type display as set forth in claim 53, wherein the light modulator unit includes a film member disposed opposite to the flexible thin film, both of the flexible thin film and the film member have a reflectivity with respect to UV rays, and the electric field is applied to change an optical length between the flexible thin film and the film member so the UV ray can be modulated.

55. The flat-type display as set forth in claim 53, wherein a spacer having a high relative dielectric constant is disposed between the first and the second electrodes.

56. The flat-type display as set forth in claim 47, wherein the fluorescent member unit includes a black mask provided at a portion corresponding to a boundary of adjacent pixels.

57. The flat-type display as set forth in claim 47, wherein a fluorescent member includes a film member provided on a face thereof facing the light modulator unit, the film member being transparent with respect to UV rays and opaque with respect to visible rays.

58. The flat-type display as set forth in claim 47, wherein a fluorescent member includes a film member provided on a face thereof emitting the excited rays, the film member being transparent with respect to visible rays and opaque with respect to UV rays.

59. The flat-type display as set forth in claim 47, wherein the light modulator unit has a sealed structure, and a rare gas is enclosed therein.

60. The flat-type display as set forth in claim 47, wherein the deflected amount of the flexible thin film is controlled continuously.

61. The flat-type display as set forth in claim 47, wherein the light modulator unit includes:

an opening formed on an emission face thereof, the opening having an area smaller than the unit area; and a light converging member for converging the UV ray emitted from the flat light source to the opening.

62. The flat-type display as set forth in claim 61, wherein the flexible thin film includes a shading member for shading the UV ray at a focal point of the light converging member when the electric field is applied.

63. The flat-type display as set forth in claim 61, wherein the flexible thin film includes an opening for allowing the UV ray to pass through at a focal point of the light converging member when the electric field is applied.

64. The flat-type display as set forth in claim 63, wherein a shading member for shading only a component on the optical axis of the UV ray passing through the opening is arranged at one of an incident face side and the emission face side of the light modulator unit.

65. The flat-type display as set forth in claim 61, wherein the opening is a through hole and any other portion of the flexible thin film is an opaque body.

66. The flat-type display as set forth in claim 61, wherein a collimator member is disposed between the opening and the light converging member, the collimator member for collimating the UV ray such that the UV ray has an area substantially equal to that of the opening.

67. The flat-type display as set forth in claim 61, wherein a fiber plate is disposed between the opening and the light converging member.

68. The flat-type display as set forth in claim 46, wherein the light modulator unit includes:

a first electrode disposed above the flat light source;

a second electrode disposed opposite to the first electrode such that at least a gap is interposed;

a shading member, which is opaque with respect to UV rays, interposed between the first and second electrodes and to be moved to release the shading by Coulomb force generated when an electric field is applied therebetween.

69. The flat-type display as set forth in claim 68, wherein the shading member is moved in a direction substantially similar to an optical axis of the UV ray when the electric field is applied.

70. The flat-type display as set forth in claim 68, wherein the shading member is moved in a direction substantially perpendicular to an optical axis of the UV ray when the electric field is applied.

71. The flat-type display as set forth in claim 68, wherein the movement amount of the shading member is controlled continuously.

72. The flat-type display as set forth in claim 68, wherein the light modulator unit includes:

an opening formed on an emission face thereof, the opening having an area smaller than the unit area; and a light converging member for converging the UV ray emitted from the flat light source to the opening.

73. The flat-type display as set forth in claim 46, wherein the flat light source includes a low-pressure mercury lamp for emitting a UV ray having 254 nm of a central wave length and a light guide plate for guiding the UV ray.

74. The flat-type display as set forth in claim 46, wherein the flat light source includes a low-pressure mercury lamp inside of which a fluorescent material emitting a 300–400 nm of UV ray is applied and a light guide plate for guiding the UV ray.

75. The flat-type display as set forth in claim 46, wherein the UV ray emitted from the flat light source is collimated.

76. The flat-type display as set forth in claim 46, wherein the flat light source includes a UV lamp, a reflection plate provided around the UV lamp and a light guide plate for guiding the UV ray, and the reflection plate reflects the UV ray such that the incident UV ray is guided in the light guide plate with an angle higher than a total reflection angle.

77. The flat-type display as set forth in claim 46, wherein the flat light source is a device emitting the UV ray.

78. The flat-type display as set forth in claim 46, wherein the flat light source is a flat light source unit including a UV lamp and a light guide plate for guiding the UV ray, and the flat light source unit is separately provided from the light modulator unit.

79. The flat-type display as set forth in claim 46, wherein the flat light source is a flat light source unit including a UV lamp and a light guide plate for guiding the UV ray, and the first electrode is disposed on the light guide plate.

80. The flat-type display as set forth in claim 46, wherein when one pixel of said pixels is divided into plural unit areas, the light modulator units provided in the respective unit areas are connected to a common electrode for allowing operations of the respective light modulator units to be the same with regard to each of the pixels.

81. The flat-type display as set forth in claim 80, wherein when one pixel of said pixels is divided into plural unit areas, the light modulator units provided in the respective unit areas are arranged into a simple matrix structure and controlled by simple matrix driving, and wherein a predetermined voltage is applied to the respective light modulator units to select performing one of the light modulation and maintaining a previous state thereof.

82. The flat-type display as set forth in claim 81, wherein the light modulator units have a hysteresis characteristic, and wherein a reset operation for setting back an electro-mechanical operation is performed before a state selecting operation.

83. The flat-type display as set forth in claim 80, wherein when one pixel of said pixels is divided into plural unit areas, the light modulator units provided in the respective unit areas are arranged into a simple matrix structure together with active devices and controlled by simple matrix driving, and wherein a predetermined voltage is applied to the respective light modulator units to select performing one of the light modulation and maintaining a previous state thereof.

84. The flat-type display as set forth in claim 46, wherein when one pixel of said pixels is divided into plural unit areas, the light modulator units provided in the respective unit areas are connected to different electrodes for allowing operations of the respective light modulator units to be different from each other with regard to each of the pixels.

85. The flat-type display as set forth in claim 84, wherein when one pixel of said pixels is divided into plural unit areas, the light modulator units provided in the respective unit areas are arranged into an active matrix structure and controlled by active matrix driving, and wherein a predetermined voltage is applied to the respective light modulator units to select performing one of the light modulation and maintaining a previous state thereof.

86. The flat-type display as set forth in claim 85, wherein the light modulator units have a hysteresis characteristic, and wherein a reset operation for setting back an electro-mechanical operation is performed before a state selecting operation.

87. The flat-type display as set forth in claim 86, wherein the light modulator units have a hysteresis characteristic, and wherein a reset operation for setting back an electro-mechanical operation is performed before a state selecting operation.

88. The flat-type display as set forth in claim 84, wherein when one pixel of said pixels is divided into plural unit areas, the light modulator units provided in the respective unit areas are arranged into an active matrix structure together with active devices and controlled by active matrix driving, and wherein a predetermined voltage is applied to the respective light modulator units to select performing one of the light modulation and maintaining a previous state thereof.

89. The flat-type display as set forth in claim 88, wherein the light modulator units have a hysteresis characteristic, and wherein a reset operation for setting back an electro-mechanical operation is performed before a state selecting operation.

90. The flat-type display as set forth in claim 46, wherein one pixel of said pixel is divided into plural unit areas having different areas from each other.

* * * * *